(12) United States Patent
Shen et al.

(10) Patent No.: US 11,875,674 B2
(45) Date of Patent: *Jan. 16, 2024

(54) METHODS AND SYSTEMS FOR TRUSTED MANAGEMENT OF TRAFFIC VIOLATION DATA USING A DISTRIBUTED LEDGER

(71) Applicant: Hayden AI Technologies, Inc., Oakland, CA (US)

(72) Inventors: Bo Shen, Fremont, CA (US); Bryan John Shea, Chicago, IL (US); Stuart Montagu McKee, Woodinville, WA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,648

(22) Filed: Mar. 1, 2023

(65) Prior Publication Data
US 2023/0260397 A1 Aug. 17, 2023

Related U.S. Application Data

(63) Continuation of application No. 17/805,296, filed on Jun. 3, 2022, now Pat. No. 11,727,795.
(Continued)

(51) Int. Cl.
*H04L 9/32* (2006.01)
*G08G 1/017* (2006.01)
(Continued)

(52) U.S. Cl.
CPC ....... *G08G 1/0175* (2013.01); *G06F 21/6254* (2013.01); *G06V 10/82* (2022.01);
(Continued)

(58) Field of Classification Search
CPC .... G08G 1/0175; G06V 10/82; G06V 20/625; G06V 2201/07; G06V 2201/08;
(Continued)

(56) References Cited

U.S. PATENT DOCUMENTS 9,715,711 B1 7/2017 Konrardy et al.
10,296,794 B2 5/2019 Ratti
(Continued)

FOREIGN PATENT DOCUMENTS

| KR | 100812397 | 3/2008 |
|---|---|---|
| WO | WO 2020/177767 | 9/2020 |
| WO | WO 2023/154609 | 8/2023 |

OTHER PUBLICATIONS

"Consulting services in Computer Vision and AI," accessed on May 8, 2023, online.
(Continued)

*Primary Examiner* — Stephen T Gundry
(74) *Attorney, Agent, or Firm* — Levine Bagade Han LLP

(57) ABSTRACT

Disclosed herein are methods and systems for managing traffic violation or enforcement data using a distributed ledger. The distributed ledger provides a transparent chain of custody/evidence related to all digital interactions with traffic violation or enforcement data. The distributed ledger can be audited for data accuracy and integrity by nodes making up the system each time one of the nodes interacts with the traffic violation or enforcement data. For example, a digital evidence package related to a traffic violation event can be generated by a node within the system and a package digest can be logged in the distributed ledger beginning with the creation of the digital evidence package and each time that the digital evidence package is processed, modified, or reviewed by nodes within the system.

20 Claims, 14 Drawing Sheets

Related U.S. Application Data

(60) Provisional application No. 63/267,853, filed on Feb. 11, 2022.

(51) Int. Cl.
| | | |
|---|---|---|
| *G06V 20/62* | (2022.01) | |
| *G06V 10/82* | (2022.01) | |
| *G06F 21/62* | (2013.01) | |
| *H04L 9/00* | (2022.01) | |

(52) U.S. Cl.
CPC .......... *G06V 20/625* (2022.01); *H04L 9/3236* (2013.01); *H04L 9/50* (2022.05); *G06Q 2220/00* (2013.01); *G06V 2201/07* (2022.01); *G06V 2201/08* (2022.01)

(58) Field of Classification Search
CPC ..... H04L 9/50; H04L 9/3236; G06F 21/6254; G06Q 2220/00
See application file for complete search history.

(56) References Cited

U.S. PATENT DOCUMENTS

| | | | |
|---|---|---|---|
| 10,360,738 | B1 | 7/2019 | Ferguson |
| 10,360,793 | B1 | 7/2019 | Costantini et al. |
| 11,003,919 | B1 | 5/2021 | Ghadiok et al. |
| 11,164,014 | B1 | 11/2021 | Ghadiok et al. |
| 11,322,017 | B1 | 5/2022 | Ghadiok et al. |
| 11,323,489 | B1* | 5/2022 | Panwar ............... H04L 63/0428 |
| 11,361,558 | B2 | 6/2022 | Seo |
| 11,457,040 | B1 | 9/2022 | Sole et al. |
| 11,727,795 | B1 | 8/2023 | Shen et al. |
| 2002/0141618 | A1 | 10/2002 | Ciolli et al. |
| 2003/0189499 | A1 | 10/2003 | Stricklin et al. |
| 2011/0267469 | A1* | 11/2011 | Mom ..................... G08G 1/054 348/149 |
| 2017/0103468 | A1 | 4/2017 | Orsini et al. |
| 2017/0177898 | A1 | 6/2017 | Dillenberger |
| 2019/0280861 | A1 | 9/2019 | Smith et al. |
| 2020/0082470 | A1 | 3/2020 | Sharma |
| 2020/0293361 | A1* | 9/2020 | Falk ........................ G06F 9/466 |
| 2020/0380091 | A1 | 12/2020 | Bansal et al. |
| 2021/0042869 | A1* | 2/2021 | Zheng ................... H04L 9/3239 |
| 2021/0166145 | A1 | 6/2021 | Omari et al. |
| 2021/0304218 | A1* | 9/2021 | Bahrami ................. H04L 63/08 |
| 2021/0327262 | A1 | 10/2021 | Liu |
| 2021/0358066 | A1* | 11/2021 | Abusaad ............... G06Q 50/26 |
| 2021/0392111 | A1* | 12/2021 | Sole .................... H04L 63/0236 |
| 2021/0409915 | A1 | 12/2021 | Singla et al. |
| 2022/0021728 | A1* | 1/2022 | Kelly ..................... H04L 67/06 |
| 2022/0023742 | A1* | 1/2022 | Tran ....................... H04N 23/60 |
| 2022/0040557 | A1* | 2/2022 | Tran ........................ G06F 1/163 |
| 2022/0050921 | A1* | 2/2022 | LaFever .................. H04L 63/20 |
| 2022/0070279 | A1* | 3/2022 | Pang ..................... H04L 67/133 |
| 2022/0116736 | A1* | 4/2022 | Williams ............. A61B 5/4833 |
| 2022/0121860 | A1* | 4/2022 | Ghadiok ................ G01C 22/02 |
| 2022/0122090 | A1* | 4/2022 | Patne .................... H04L 9/3297 |
| 2022/0138667 | A1* | 5/2022 | Cain, Jr. ............. G06F 21/6245 705/330 |
| 2022/0147491 | A1* | 5/2022 | Blackshear ........... H04L 9/3236 |
| 2022/0147745 | A1* | 5/2022 | Ghadiok .............. G06V 20/588 |
| 2022/0150257 | A1* | 5/2022 | Simons ................. H04L 9/0618 |
| 2022/0164338 | A1* | 5/2022 | Blackshear ............... H04L 9/32 |
| 2022/0172207 | A1* | 6/2022 | Cella ...................... G06N 3/049 |
| 2022/0198055 | A1* | 6/2022 | Deshmukh ........... G06F 16/137 |
| 2022/0230131 | A1 | 7/2022 | Benayoun et al. |
| 2022/0238012 | A1 | 7/2022 | Ghadiok et al. |
| 2022/0247769 | A1 | 8/2022 | Erlingsson |
| 2022/0247771 | A1 | 8/2022 | Higgins et al. |
| 2022/0253430 | A1 | 8/2022 | Paul et al. |
| 2022/0335123 | A1 | 10/2022 | Patne et al. |
| 2022/0335340 | A1 | 10/2022 | Moustafa et al. |
| 2022/0335824 | A1 | 10/2022 | Carson et al. |
| 2022/0351525 | A1 | 11/2022 | Carson et al. |
| 2022/0368682 | A1 | 11/2022 | Verzun et al. |
| 2023/0260396 | A1 | 8/2023 | Shen et al. |

OTHER PUBLICATIONS

"Safety Vision Announces Smart Automated Bus Lane Enforcement (SABLETM) Solution," *Safety Vision*, Oct. 11, 2022, online.

Clearlane, "Automated Bus Lane Enforcement System", *SafeFleet*, 2021, online.

Clearlane, "The Safe Fleet Automated Bus Lane Enforcement (ABLE)", *SafeFleet*, 2021, online.

Evanko, K. "Siemens Mobility launches first-ever mobile bus lane enforcement solution in New York," *Siemens Mobility*, Dec. 17, 2019, Munich, Germany.

Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.

Huval, B. et al. "An Empirical Evaluation of Deep Learning on Highway Driving," *Stanford University*, pp. 1-7 accessed on Apr. 17, 2015, online.

Liu, X. "Vehicle-Related Scene Understanding Using Deep Learning," *School of Engineering, Computer and Mathematical Sciences, Auckland University of Technology*, 2019, online.

Nehemiah, A. et al. "Deep Learning for Automated Driving with MATLAB," *NVIDIA Technical Blog*, <https://developer.nvidia.com/blog/deep-learning-automated-driving-matlab/> accessed on Jun. 4, 2023, online.

Safe Fleet. "Whitepaper: Vendor Interoperability for ABLE," *Safe Fleet*, pp. 1-6, Apr. 2023, online.

Spencer, B. et al. "NYC extends Brooklyn bus lane enforcement," *ITS International*, Feb. 27, 2020, online.

Sullivan, T. "Transit Bus Surveillance Solutions," *New York City Transit/MTA Bus*, Jun. 21, 2019, Charlotte, North Carolina, USA.

Wu, C. et al. "Adjacent Lane Detection and Lateral Vehicle Distance Measurement Using Vision-Based Neuro-Fuzzy Approaches," *Journal of Applied Research and Technology*, vol. 11, pp. 251-258, Apr. 2023.

* cited by examiner

CARRIER VEHICLE 110

MUNICIPAL FLEET VEHICLE

SEMI-AUTONOMOUS VEHICLE

AUTONOMOUS VEHICLE

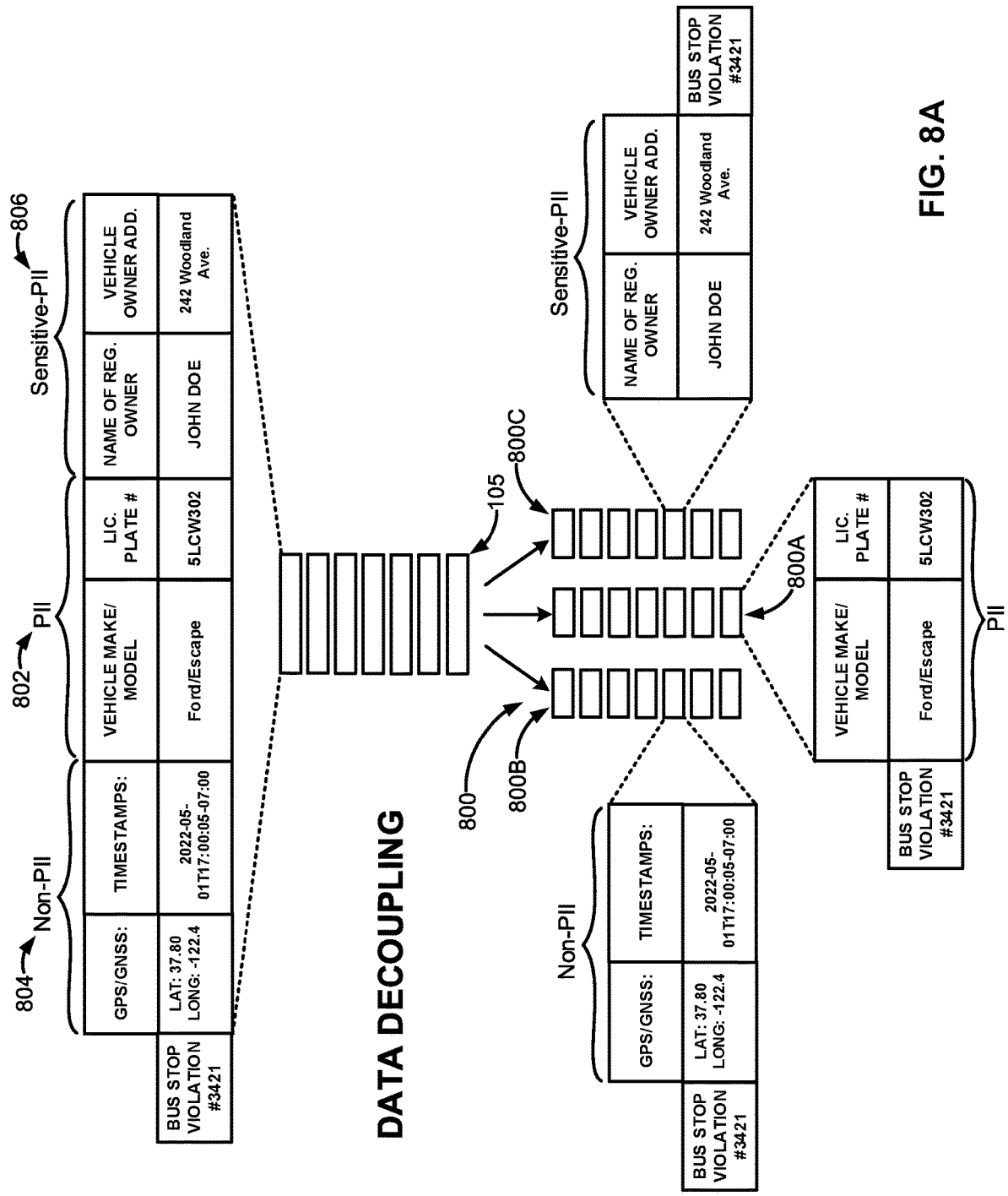

METHODS AND SYSTEMS FOR TRUSTED MANAGEMENT OF TRAFFIC VIOLATION DATA USING A DISTRIBUTED LEDGER

CROSS-REFERENCE TO RELATED APPLICATION

This application is a continuation of U.S. patent application Ser. No. 17/805,296 filed on Jun. 3, 2022, which claims the benefit of U.S. Provisional Patent Application No. 63/267,853 filed on Feb. 11, 2022, the contents of which are incorporated herein by reference in their entireties.

TECHNICAL FIELD

This disclosure relates generally to the field of computer-based traffic enforcement and more specifically, to methods and systems for trusted and security-focused management of traffic violation or traffic enforcement data using a distributed ledger.

BACKGROUND

Traditional traffic enforcement technology and approaches are often unsuited for today's risk-prone digital environment. For example, most traditional traffic violation management systems only encrypt digital evidence packages created in connection with a traffic violation event but do not track the authenticity or integrity of such packages as they are passed around from internal devices within a system or external devices connected to the system. FIG. 1A illustrates one embodiment of a traditional system for managing traffic violation data or traffic enforcement data. The traditional system has many security gaps or seams that can be exploited by threat actors intending to compromise the integrity, confidentiality, or availability of such digital evidence packages. For example, once a digital evidence package is created, the contents of such a package must often be reviewed by reviewers within multiple government agencies or private contractors tasked with such reviews. This places the digital evidence package at a high risk of being exposed to digital threats or hacks as well as being exposed to simple human error during the review or transmission of the digital evidence package.

Therefore, improved methods and systems are needed for managing the secure handling of digital evidence packages containing traffic violation data or traffic enforcement data that maintain the authenticity, integrity, and confidentiality of the contents of such digital evidence packages. Moreover, such a solution should be scalable and reliable and can take advantage of municipal assets already deployed in the field.

SUMMARY

Disclosed are improved methods, systems, and apparatus for managing traffic violation data using a distributed ledger. The distributed ledger can also be referred to as a distributed data chain. The methods and systems disclosed herein can provide a transparent chain of custody/evidence related to all digital interactions with traffic violation data (e.g., digital evidence packages) by logging such interactions in the distributed ledger. The distributed ledger can be audited for data accuracy and integrity by nodes (e.g., computing devices, servers, etc.) making up the system each time one of the nodes interacts with the traffic violation data. For example, a digital evidence package related to a traffic violation event can be generated by a node within the system and a package digest (also referred to as a digital fingerprint, a digital signature, or a message digest) can be logged in the distributed ledger beginning with the creation of the digital evidence package and each time that the digital evidence package is processed, modified, or reviewed by the node or another node within the system. The methods and systems can also comprise built-in data privacy features or processes that maintain the confidentiality of data contained within the digital evidence packages through data sharding techniques such as data decoupling and data detracing. Moreover, the methods and systems disclosed herein can reduce the number of checkpoints for processing the digital evidence package which further reduces the likelihood that a security event related to the distributed ledger turns into a security incident. The methods and systems disclosed herein can also narrow access to the digital evidence packages by human operators to reduce the likelihood that credentials are comprised by threat actors in order to gain access to the digital evidence packages.

In some embodiments, a method of managing traffic enforcement data is disclosed. The method comprises: generating, at a first node of a plurality of nodes, a digital evidence package related to a traffic violation; generating, at the first node, a first package digest of the digital evidence package using a hash function; inserting the first package digest as a ledger entry in a distributed ledger, wherein the distributed ledger is synchronized across the plurality of nodes; transmitting the digital evidence package from the first node to a second node of the plurality of nodes; validating, at the second node, the digital evidence package received from the first node based on the first package digest added to the distributed ledger; and modifying the digital evidence package at the second node resulting in a modified digital evidence package only if the digital evidence package is validated based on the first package digest added to the distributed ledger.

In some embodiments, the method further comprises generating, at the second node, a second package digest of the modified digital evidence package using the hash function; updating the distributed ledger to add the second package digest as another ledger entry in the distributed ledger; and transmitting the modified digital evidence package to a third node of the plurality of nodes.

In some embodiments, inserting the first package digest in the distributed ledger further comprises calling, at the first node, an insertion application programming interface (API) to cause each node to insert or add the first package digest as a ledger entry in an instance of the distributed ledger maintained by each node.

In some embodiments, the method further comprises validating, at the third node, the modified digital evidence package received from the second node based on the second package digest added to the distributed ledger; reviewing the modified digital evidence package at the third node resulting in a reviewed digital evidence package only if the modified digital evidence package is validated based on the second package digest added to the distributed ledger; and generating, at the third node, a third package digest of the reviewed digital evidence package using the hash function and adding the third package digest as an additional ledger entry in the distributed ledger.

In some embodiments, the method further comprises transmitting the reviewed digital evidence package to a web server configured to present certain contents from the reviewed digital evidence package to an infractor via a review website; validating, at the web server, the reviewed digital evidence package received from the third node based on the third package digest added to the distributed ledger; and presenting at least some contents of the reviewed digital evidence package to the infractor via the review website only if the reviewed digital evidence package is validated based on the third package digest added to the distributed ledger.

In some embodiments, the first node can be a mobile device. The method can further comprise capturing one or more images or videos of the traffic violation, and wherein the digital evidence package comprises at least one of the one or more images or videos captured by the mobile device.

In some embodiments, the first node can be a perception device. The method can further comprise capturing one or more images or videos of the traffic violation, and wherein the digital evidence package comprises at least one of the one or more images or videos captured by the perception device.

In some embodiments, the perception device is mounted or otherwise coupled to a carrier vehicle, and wherein at least one of the one or more images or videos of the traffic violation is captured by the perception device while the carrier vehicle is in motion.

In some embodiments, the perception device is configured to generate the first package digest of the digital evidence package while the carrier vehicle is in motion.

In some embodiments, the second node is a server configured to post-process one or more images or video frames included as part of the digital evidence package as part of modifying the digital evidence package, and wherein post-processing the one or more images or video frames further comprises applying an obfuscating filter of a preconfigured privacy filter level to an object automatically detected in the one or more images or videos and overlaying data or information related to the traffic violation on the one or more images or video frames included as part of the digital evidence package.

In some embodiments, the method can further comprise inserting at least part of the digital evidence package as another ledger entry in the distributed ledger.

In some embodiments, the method further comprises splitting, at one of the nodes with access to the digital evidence package, the digital evidence package into personal identifiable information (PII), non-PII, and sensitive-PII; generating a PII digest of the PII, a non-PII digest of the non-PII, and a sensitive-PII digest of the sensitive-PII; and inserting the PII digest as a ledger entry in a PII micro-ledger, inserting the non-PII digest as a ledger entry in a non-PII micro-ledger, and inserting the sensitive-PII digest in a sensitive-PII micro-ledger.

In some embodiments, the PII digests stored as part of the PII micro-ledger, the non-PII digests stored as part of the non-PII micro-ledger, and the sensitive-PII digests stored as part of the sensitive-PII can be accessible to all nodes of the plurality of nodes.

The method can further comprise terminating, at one of the nodes, a connection between a key and a paired value of the key in at least one of the PII micro-ledger, the non-PII micro-ledger, and the sensitive-PII micro-ledger by applying the hash function or another hash function to the key concatenated with an attribute that is not the paired value of the key.

In some embodiments, the hash function is a message digest algorithm or a secure hashing algorithm.

In some embodiments, the digital evidence package comprises data or information concerning a location of the traffic violation, a timestamp recorded by the first node, and a license plate number of a vehicle automatically detected by a license-plate recognition neural network running on the first node.

In some embodiments, the method further comprises generating, at the second node or the third node, a package delete digest to document a deletion of the digital evidence package; and adding the package delete digest as another ledger entry in the distributed ledger, wherein the distributed ledger is terminated after receiving the package delete digest.

Also disclosed is a system for managing traffic enforcement data. The system comprises: a first node including one or more processors programmed to: generate a digital evidence package related to a traffic violation, generate a first package digest of the digital evidence package using a hash function, and insert or add the first package digest as a ledger entry in a distributed ledger, wherein the distributed ledger is synchronized across a plurality of nodes including the first node; and a second node including one or more processors programmed to: receive the digital evidence package from the first node, wherein the plurality of nodes comprises the second node, validate the digital evidence package based on the first package digest added to the distributed ledger, and modify the digital evidence package resulting in a modified digital evidence package only if the digital evidence package is validated based on the first package digest added to the distributed ledger.

In some embodiments, the one or more processors of the second node are further programmed to: generate a second package digest of the modified digital evidence package using the hash function; update the distributed ledger to add the second package digest as another ledger entry in the distributed ledger; and transmit the modified digital evidence package to a third node of the plurality of nodes.

In some embodiments, the system comprises a third node comprising one or more processors programmed to: receive the modified digital evidence package from the second node, wherein the plurality of nodes comprises the third node; validate the modified digital evidence package received from the second node based on the second package digest added to the distributed ledger; review the modified digital evidence package at the third node resulting in a reviewed digital evidence package only if the modified digital evidence package is validated based on the second package digest added to the distributed ledger; and generate a third package digest of the reviewed digital evidence package using the hash function and adding the third package digest as an additional ledger entry in the distributed ledger.

In some embodiments, the system comprises a web server comprising one or more server processors programmed to: receive the reviewed digital evidence package from the third node, wherein the web server is accessible to an alleged infractor via a review website; validate the reviewed digital evidence package received from the third node based on the third package digest added to the distributed ledger; and present at least some contents of the reviewed digital evidence package to the infractor via the review website only if the reviewed digital evidence package is validated based on the third package digest added to the distributed ledger.

In some embodiments, the first node is a perception device configured to capture one or more images or videos of the traffic violation, and wherein the one or more images or videos are included as part of the digital evidence package.

In some embodiments, the first node is a mobile device configured to capture one or more images or videos of the traffic violation, and wherein the one or more images or videos are included as part of the digital evidence package.

In some embodiments, the perception device is mounted or otherwise coupled to a carrier vehicle, and wherein at least one of the one or more images or videos of the traffic violation is captured by the perception device while the carrier vehicle is in motion.

In some embodiments, the perception device is configured to generate the first package digest of the digital evidence package while the carrier vehicle is in motion.

In some embodiments, the one or more processors of the second node are further programmed to insert or add at least part of the digital evidence package as another ledger entry in the distributed ledger.

In some embodiments, the one or more processors of the second node are further programmed to: split the digital evidence package into personal identifiable information (PII), non-PII, and sensitive-PII; generate a PII digest of the PII, a non-PII digest of the non-PII, and a sensitive-PII digest of the sensitive-PII; and insert or add the PII digest as a ledger entry in a PII micro-ledger, insert or add the non-PII digest as a ledger entry in a non-PII micro-ledger, and insert or add the sensitive-PII digest in a sensitive-PII micro-ledger.

In some embodiments, the PII digests stored as part of the PII micro-ledger, the non-PII digests stored as part of the non-PII micro-ledger, and the sensitive-PII digests stored as part of the sensitive-PII are accessible to all nodes of the plurality of nodes.

In some embodiments, the one or more processors of the second node are further programmed to terminate a connection between a key and a paired value of the key in at least one of the PII micro-ledger, the non-PII micro-ledger, and the sensitive-PII micro-ledger by applying the hash function or another hash function to the key concatenated with an attribute that is not the paired value of the key.

Also disclosed are one or more non-transitory computer-readable media comprising instructions stored thereon, that when executed by one or more processors, cause the one or more processors to perform operations comprising: generating, at a first node of a plurality of nodes, a digital evidence package related to a traffic violation; generating, at the first node, a first package digest of the digital evidence package using a hash function; inserting the first package digest as a ledger entry in a distributed ledger, wherein the distributed ledger is synchronized across the plurality of nodes; transmitting the digital evidence package from the first node to a second node of the plurality of nodes; validating, at the second node, the digital evidence package received from the first node based on the first package digest added to the distributed ledger; and modifying the digital evidence package at the second node resulting in a modified digital evidence package only if the digital evidence package is validated based on the first package digest added to the distributed ledger.

In some embodiments, the one or more non-transitory computer-readable media further comprises instructions stored thereon, that when executed by the one or more processors, cause the one or more processors to perform operations including: generating, at the second node, a second package digest of the modified digital evidence package using the hash function; updating the distributed ledger to add the second package digest as another ledger entry in the distributed ledger; transmitting the modified digital evidence package to a third node of the plurality of nodes; validating, at the third node, the modified digital evidence package received from the second node based on the second package digest added to the distributed ledger; reviewing the modified digital evidence package at the third node resulting in a reviewed digital evidence package only if the modified digital evidence package is validated based on the second package digest added to the distributed ledger; and generating, at the third node, a third package digest of the reviewed digital evidence package using the hash function and adding the third package digest as an additional ledger entry in the distributed ledger In some embodiments, the one or more non-transitory computer-readable media further comprises instructions stored thereon, that when executed by the one or more processors, cause the one or more processors to perform operations including: transmitting the reviewed digital evidence package to a web server configured to present certain contents from the reviewed digital evidence package to an infractor via a review website; validating, at the web server, the reviewed digital evidence package received from the third node based on the third package digest added to the distributed ledger; and presenting at least some contents of the reviewed digital evidence package to the infractor via the review website only if the reviewed digital evidence package is validated based on the third package digest added to the distributed ledger.

In some embodiments, the one or more non-transitory computer-readable media further comprises instructions stored thereon, that when executed by the one or more processors, cause the one or more processors to capture, at the first node, one or more images or videos of the traffic violation, wherein the first node is a perception device coupled to a carrier vehicle, wherein the one or more images are captured while the carrier vehicle is in motion, and wherein the digital evidence package comprises at least one of the one or more images or videos captured by the perception device.

In some embodiments, the one or more non-transitory computer-readable media further comprises instructions stored thereon, that when executed by the one or more processors, cause the one or more processors to insert or add at least part of the digital evidence package as another ledger entry in the distributed ledger; split, at one of the nodes with access to the digital evidence package, the digital evidence package into personal identifiable information (PII), non-PII, and sensitive-PII; generate a PII digest of the PII, a non-PII digest of the non-PII, and a sensitive-PII digest of the sensitive-PII; and insert or add the PII digest as a ledger entry in a PII micro-ledger, insert or add the non-PII digest as a ledger entry in a non-PII micro-ledger, and insert or add the sensitive-PII digest in a sensitive-PII micro-ledger.

BRIEF DESCRIPTION OF THE DRAWINGS

FIG. 8A is a schematic diagram illustrating an example of data decoupling to maintain the confidentiality of traffic violation data.

DETAILED DESCRIPTION

Figure 1A:
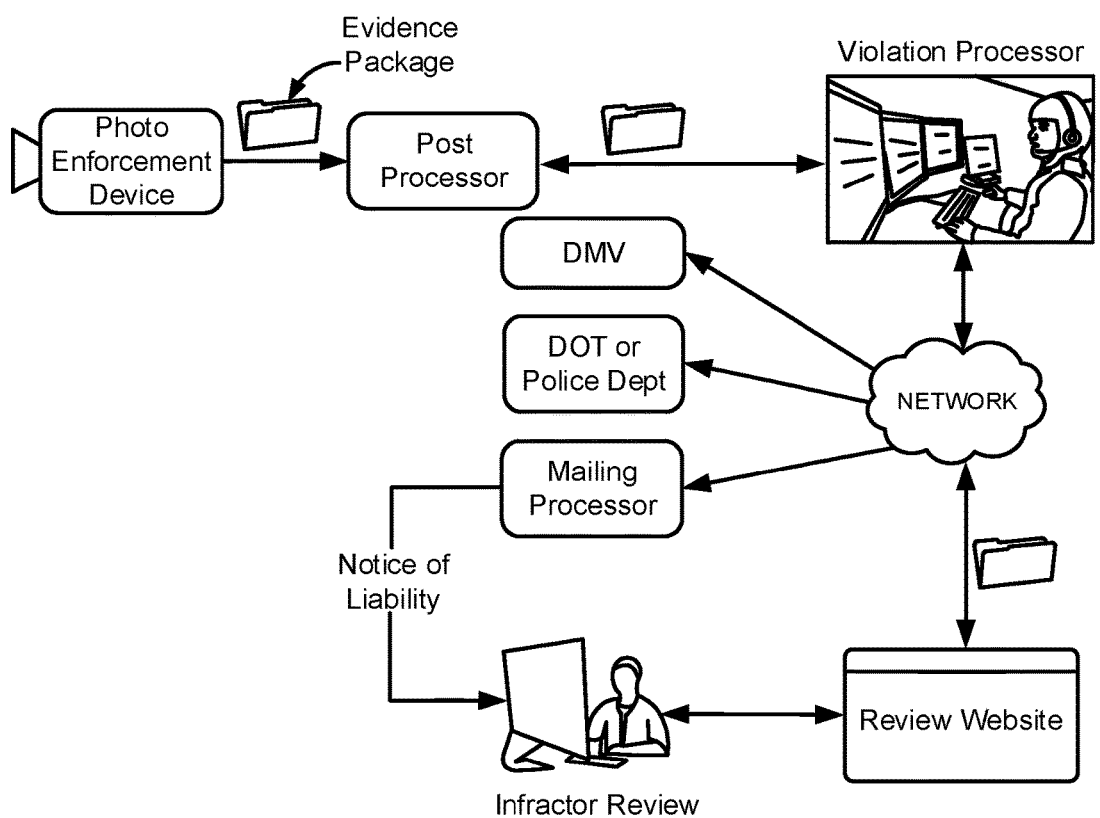
FIG. 1A illustrates a traditional system for managing traffic violation or enforcement data that lacks data authenticity tracking and is prone to security risks.
Figure 1B:
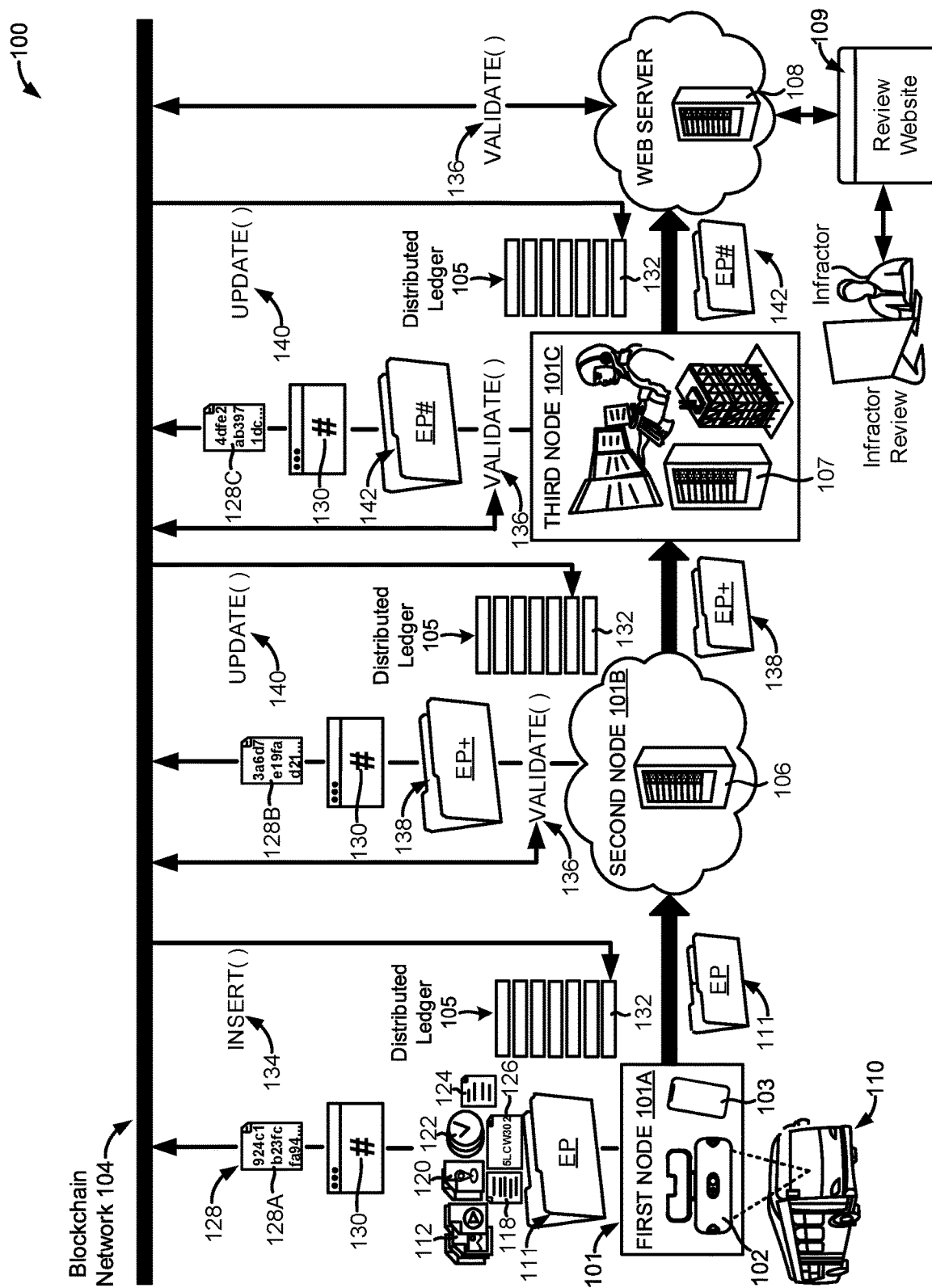
FIG. 1B illustrates one embodiment of a system for trusted management of traffic violation data or traffic enforcement data using a distributed ledger.

FIG. 1B illustrates one embodiment of a system 100 for trusted management of traffic violation data or traffic enforcement data using a distributed ledger 105. The system 100 can comprise a plurality of nodes 101 communicatively coupled to one another via one or more networks. The nodes 101 can form a blockchain network 104 with each of the nodes 101 participating in the blockchain and having access to the distributed ledger 105.

The blockchain network 104 can operate under a blockchain framework or a set of blockchain protocols. The blockchain network 104 can be decentralized. In some embodiments, the blockchain framework can be a permissioned blockchain framework.

For example, the blockchain framework can be the open-source Hyperledger Fabric blockchain framework maintained by the Linux Foundation. In other embodiments, the blockchain framework can be another type of enterprise-grade permissioned blockchain framework.

In some embodiments, the system 100 can comprise at least three nodes 101 or peer nodes including a first node 101A, a second node 101B, and a third node 101C.

In other embodiments, the system 100 can comprise only two nodes 101 (e.g., the first node 101A and the second node 101B) or more than three nodes 101.

In these embodiments, the first node 101A can be a portable computing device configured to capture evidence of a traffic violation involving a vehicle 114. The vehicle 114 can be operated by or registered to an infractor at the time of the violation.

For example, the first node 101A can be a perception device 102 mounted or otherwise coupled to a carrier vehicle 110 or a mobile device 103 used by a user to capture evidence of a traffic violation involving the vehicle 114.

The mobile device 103 can be or refer to a personal communication device such as a smartphone carried by a user of the system 100. In other embodiments, the mobile device 103 can be another type of personal communication device or personal computing device such as a tablet computer, a laptop computer, or a pair of smart eyeglasses or sunglasses that can record videos or images and communicate with other nodes 101 of the system 100.

Although FIG. 1B only illustrates one instance of a perception device 102 and one instance of a mobile device 103 serving as the first node 101A, it is contemplated by this disclosure and it should be understood by one of ordinary skill in the art that the system 100 can comprise a plurality of first nodes 101A including a plurality of perception devices 102 and a plurality of mobile devices 103.

The second node 101B can comprise or be a server 106 configured to process or post-process the evidence captured by the first node 101A relating to the traffic violation. In certain embodiments, the second node 101B can be tasked with or be responsible for enhancing the evidence captured by the first node 101A and making such evidence presentable to other nodes 101 downstream of the second node 101B.

In some embodiments, the server 106 can comprise or refer to one or more virtual servers or virtualized computing resources. For example, the server 106 can refer to a virtual server or cloud server hosted and delivered by a cloud computing platform (e.g., Amazon Web Services®, Microsoft Azure®, or Google Cloud®). In other embodiments, the server 106 can refer to one or more stand-alone servers such as a rack-mounted server, a blade server, a mainframe, a dedicated desktop or laptop computer, one or more processors or processor cores therein, or a combination thereof.

The mobile devices 103 and the perception devices 102 can communicate with the server 106 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 106 and the plurality of mobile devices 103 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The mobile devices 103 and the perception devices 102 can transmit data and files over-the-air to the server 106 and receive data and files over-the-air from the server 106 via secure connections. The secure connections can be real-time bidirectional connections secured using one or more encryption protocols such as a secure sockets layer (SSL) protocol, a transport layer security (TLS) protocol, or a combination thereof. Additionally, data or packets transmitted over the secure connection can be encrypted using a Secure Hash Algorithm (SHA) or another suitable encryption algorithm. Data or packets transmitted over the secure connection can also be encrypted using an Advanced Encryption Standard (AES) cipher.

The third node 101C can comprise or be a server 107 configured or otherwise used to review the processed/post-processed evidence received from the second node 101B. For example, the server 107 can be a server of a governmental agency (e.g., a department of motor vehicles or a department of transportation) responsible for reviewing and making decisions on traffic violations. In other embodiments, the server 107 can be a server of a third-party entity (e.g., a violation processor) hired by a governmental agency to review and make decisions on traffic violations.

In some embodiments, the server 107 can comprise one or more stand-alone servers such as a rack-mounted server, a blade server, or a mainframe computer maintained or otherwise controlled by a governmental agency or a third-party entity hired by the governmental agency. In other embodiments, the server 10 can comprise or refer to one or more virtual servers or virtualized computing resources. For example, the server 107 can refer to a virtual server or cloud server hosted and delivered by a cloud computing platform (e.g., Amazon Web Services®, Microsoft Azure®, or Google Cloud®).

In certain embodiments, the same server (e.g., the server 106) configured to process or post-process the evidence received from the perception device(s) 102 or mobile device(s) 103 can also be the server configured or otherwise used to review and make decisions on traffic violations. In these embodiments, the second node 101B and the third node 101C can be combined into one node and the operations/tasks performed by these two separate nodes 101 can be performed by one node.

The system 100 can also comprise a web server 108 configured to provide or present the evidence of the traffic violation to the infractor. The web server 108 can be configured to provide or present the evidence of the traffic violation to the infractor via a review website 109. In other embodiments, the web server 108 can be configured to provide or present evidence of the traffic violation to the infractor via a mobile application or a desktop software application.

As will be discussed in more detail in the following sections, the review website 109 (or the mobile application/desktop application) can be configured to only present the evidence of the traffic violation to the infractor if the authenticity and chain-of-custody of the evidence have been validated.

In some embodiments, the web server 108 can comprise or refer to a virtual server or cloud server hosted and delivered by a cloud computing platform (e.g., Amazon Web Services®, Microsoft Azure®, or Google Cloud®). In other embodiments, the web server 108 can comprise or refer to one or more stand-alone servers such as a rack-mounted server, a blade server, or a mainframe computer.

In certain embodiments, the same server (e.g., the web server 108) configured to provide or present the evidence of the traffic violation to the infractor can also be the same server configured or otherwise used to review and make decisions concerning the traffic violation. In these embodiments, the web server 108 and the third node 101C can be combined into one node and the operations/tasks performed by the web server 108 and the third node 101C can be performed by the one node.

In further embodiments, the web server 108 configured to provide or present the evidence of the traffic violation to the infractor can also be the same server configured or otherwise used to review and make decisions concerning the traffic violation and process/post-process the evidence received from the perception device(s) 102 or mobile device(s) 103. In these embodiments, the web server 108, the third node 101C, and the second node 101B can be combined into one node and the operations/tasks performed by the web server 108, the third node 101C, and the second node 101B can be performed by the one node.

One technical problem faced by the applicant is how to securely manage the handling of digital evidence concerning traffic violations. This is especially important in computing environments where the digital evidence must be processed or inspected by multiple computing devices and passed between such computing devices. One technical solution discovered and developed by the applicant is the system 100 and accompanying methods disclosed herein where all digital interactions with traffic violation data are logged in a distributed ledger 105 maintained by all nodes 101 of the system 100. The distributed ledger 105 can be continuously audited and validated for data authenticity and integrity by the various nodes 101 of the system 100.

As previously discussed, a first node 101A (e.g., a perception device 102 or a mobile device 103) can generate a digital evidence package 111 related to a traffic violation involving a vehicle 114. As will be discussed in more detail in relation to FIG. 1C, the vehicle 114 can commit a traffic violation by being parked or otherwise stopped in a restricted area 116 such as a bus lane, a bike lane, or a no-stopping zone.

The digital evidence package 111 (represented in FIG. 1B as "EP") can comprise images or videos 112 (or at least a segment of a video 112) captured by the first node 101A showing the vehicle 114 committing the traffic violation, a geolocation 120 of the vehicle 114 as calculated or estimated by the first node 101A, timestamps 122 recorded or generated by the first node 101A marking the time of the traffic violation, certain metadata 118 concerning the traffic violation or the type of violation, vehicle attributes 124 of the vehicle 114 detected by the first node 101A, and a license plate number 126 of the vehicle 114 automatically detected by the first node 101A.

For example, the first node 101A (e.g., the perception device 102 or the mobile device 103) can take or capture images or videos 112 of the vehicle 114 committing the traffic violation. The first node 101A can also determine the geolocation 120 of the vehicle 114 using, in part, positioning data obtained from a positioning unit (e.g., a GPS unit) of the first node 101A. The first node 101A can also record or generate a plurality of timestamps 122 marking the time of the traffic violation.

Moreover, the first node 101A can generate metadata 118 concerning the traffic violation. For example, when the first node 101A is a mobile device 103, the mobile device 103 can generate metadata 118 associated with the images or videos 112 captured by the mobile device 103. In some embodiments, the metadata 118 can also comprise data or information concerning the location of the vehicle 114, the time of the traffic violation, and a violation type 608 (see FIG. 6B).

The first node 101A can pass images or video frames from the captured videos to a plurality of deep learning models running on the first node 101A. For example, the first node 101A can pass images or video frames from the captured videos to an object-detection neural network and a license plate-recognition (LPR) neural network (see FIG. 3A) running on the first node 101A. The first node 101A can obtain as outputs, predictions concerning the objects shown in the images or video frames.

For example, the first node 101A can identify an object shown in an image or video frame as a car, a truck, a bus, a bicycle, etc. The perception device 102 can also obtain as an output from the object-detection neural network predictions concerning a set of vehicle attributes 124 such as a color and/or make and model of the vehicle 114 shown in the images or video frames.

The first node 101A can also pass the images or video frames from the captured videos to an LPR neural network running on the first node 101A. By feeding images or video frames into the LPR neural network, the first node 101A can obtain as an output from the LPR neural network, a prediction concerning the license plate number 126 of the vehicle 114.

The first node 101A can compile or generate the digital evidence package 111 for transmission to other node(s) 101 of the system 100 such as the second node 101B. However, in order to maintain the authenticity and integrity of the digital evidence package 111, the first node 101A can generate a package digest 128 (also referred to as a message digest) of the digital evidence package 111 using a hash function 130. For purposes of this disclosure, the package digest 128 generated by the first node 101A can be referred to as a first package digest 128A.

The package digest 128 can be a fixed-size numeric representation of the contents of the digital evidence package 111 computed by the hash function 130. In some embodiments, the package digests 128 generated by the nodes 101 of the system 100 can be 256-bit digests.

In other embodiments, the package digests 128 generated by the nodes 101 of the system 100 can be 128-bit digests. In further embodiments, the package digests 128 generated by the nodes 101 of the system 100 can be 224-bit digests, 384-bit digests, or 512-bit digests.

In some embodiments, the digital evidence package 111 or the contents of the digital evidence package 111 are first encrypted before the package digest 128 is generated. That is the package digest 128 is generated using the encrypted contents of the digital evidence package 111.

In alternative embodiments, the package digest 128 can be generated using the raw or unencrypted contents of the digital evidence package 111.

The hash function 130 can be a non-reversible or one-way cryptographic hashing function. A non-reversible or one-way hashing function is needed so that any modifications or alterations of the contents of the digital evidence package 111 would result in a different package digest 128. In some embodiments, the hash function 130 can be the MD6 hash function.

In other embodiments, the hash function 130 can be a hashing function from the SHA-2 family of functions where the hashing functions are named after their output digest lengths. These include the SHA-224 hash function, the SHA-256 hash function, the SHA-384 hash function, or the SHA-512 hash function. Below are two examples of package digests 128 generated using an MD6 and a SHA-2 hash function, respectively:

MD6:
92482c8b2e4cfc2769a9062c3345e16b929eb3cf340-
20731416e75a804bfba9db1f25dabc6905e0
6c169c16c3236da36de8982faa39efc1446bdbfabb7ec2cac
SHA-2:
4b2533579678daacf10ba9f58b3b5827a4faba7227df-
92d3037a956b9d126dcd54615bb0e23d86
fc02b30e83a93d3dab051f55de191e11d495d81c3-
005e8b054

One technical problem faced by the applicants is how to maintain the integrity and authenticity of digital evidence packages 111 while also keeping storage costs at a reasonable level. This is important since digital evidence packages 111 often contain large files (e.g., several megabytes or gigabytes in size) such as video files captured by the first node 101A. One technical solution discovered and developed by the applicants is to apply the hash function 130 to the digital evidence package 111 so that a package digest 128 of a fixed size is created and the package digest 128 is stored as part of the distributed ledger 105.

In some embodiments, the package digest 128 itself can be encrypted in order to produce a digital signature. For example, the package digest 128 can be encrypted using a public key of an asymmetric key pair to produce the digital signature with the private key used for decryption. The package digest 128 can be encrypted before being transmitted to the blockchain network 104 for insertion into a distributed ledger 105.

In some embodiments, each node 101 of the blockchain network 104 can maintain its own instance of the distributed ledger 105. In other embodiments, only the first node 101A and the second node 101B can maintain their own instances of the distributed ledger 105. In certain embodiments, the distributed ledgers 105 or all instances of the distributed ledger 105 can be synchronized across the blockchain network 104 such that any updates or ledger entries 132 added to one instance of the distributed ledger 105 is also added to all other instances of the distributed ledger 105 on the blockchain network 104.

In some embodiments, the first node 101A can call one or more application programming interfaces (APIs) to insert or add the first package digest 128A as a ledger entry 132 in the distributed ledger 105. For example, the first node 101A can call an insert API 134 to cause each node 101 to insert, add, or log the first package digest 128A as a ledger entry 132 in the distributed ledger 105. In certain embodiments, an ordering node (not shown) in the blockchain network 104 can facilitate the synchronization of the distributed ledgers 105 among the various peer nodes 101.

In certain embodiments, a new distributed ledger 105 can be created each time a digital evidence package 111 is generated. In these and other embodiments, the first package digest 128A can serve as the first ledger entry of the distributed ledger 105 or the first block of the blockchain.

In some embodiments, only package digests 128 are inserted or otherwise added to the distributed ledger 105.

In other embodiments, the package digests 128 along with the digital evidence package 111 can be added as ledger entries 132 to the distributed ledger 105. In certain embodiments, at least part of the digital evidence package 111 can be added as a ledger entry 132 in the distributed ledger 105. In these embodiments, the digital evidence package 111 can be stored as part of the distributed ledger 105 for redundancy purposes such that if one or more of the nodes 101 of the system 100 go off-line, the system 100 can still recover or retrieve a copy of the digital evidence package 111.

As will be discussed in more detail in relation to FIG. 8A, the data/information contained within the digital evidence package 111 can be categorized or grouped according to their sensitivity. For example, the data/information contained within the digital evidence package 111 can be categorized or grouped into personal identifiable information (PII), non-PII, and sensitive-PII. In some embodiments, each of the PII, the non-PII, and the sensitive-PII can be stored in its own distributed micro-ledger 800. For example, one of the nodes 101 of the system 100 having access to the digital evidence package 111 can call a split API to split the distributed ledger 105 into multiple distributed micro-ledgers 800. The node 101 can then generate digests of the PII, the non-PII, and the sensitive-PII using a hash function (e.g., the hash function 130) and insert or add the digests as ledger entries into the micro-ledgers 800.

Referring back to FIG. 1B, the first node 101A can transmit the digital evidence package 111 to the second node 101B. The first node 101A can transmit the digital evidence package 111 to the second node 101B after or around the same time that the first package digest 128A is added as a ledger entry 132 to the distributed ledger 105.

The digital evidence package 111 can be transmitted over one or more secure network channels or secure connections. As will be discussed in more detail in relation to FIG. 3B, the digital evidence package 111 can be encrypted using a symmetric encryption algorithm such as the Advanced Encryption Standard (AES) with 256-bit keys (also referred to as AES-256) prior to transmission.

The second node 101B can validate the digital evidence package 111 received from the first node 101A based on the first package digest 128A stored as part of the distributed ledger 105. The second node 101B can validate the digital evidence package 111 by querying the other nodes 101 of the blockchain network 104. For example, the second node 101B can validate the digital evidence package 111 by applying the same hash function 130 used by the first node 101A to the digital evidence package 111 received from the first node 101A to generate an unverified instance of the first package digest. The second node 101B can then call a validate API 136 to compare the unverified instance of the first package digest against the first package digest 128A stored as part of the distributed ledger 105. For example, the second node 101B can call a validate API 136 to cause each node 101 to compare the unverified instance of the first package digest generated by the second node 101B against the first package digest 128A stored as part of its own instance of the distributed ledger 105. If the unverified instance of the first package digest generated by the second node 101B matches the first package digests 128A stored as part of the distributed ledgers 105, then the digital evidence package 111 received from the first node 101A is validated. At this point, the second node 101B can review and modify the contents of the digital evidence package 111.

The second node 101B is configured to only review and modify the contents of the digital evidence package 111 if the digital evidence package 111 received from the first node 101A is validated based on the first package digest 128A included as part of the distributed ledger 105. If the unverified instance of the first package digest generated by the second node 101B does not match the first package digests 128A stored as part of the distributed ledgers 105, the digital evidence package 111 received from the first node 101A is considered invalid and possibly subject to tampering.

As previously discussed, the second node 101B can be a server 106 configured to conduct post-processing on the images or video frames included as part of the digital evidence package 111. For example, the server 106 can conduct post-processing on the images or video frames by resizing, cropping, or rotating the images or video frames. Also, for example, the server 106 can combine multiple evidentiary images into one composite image or multiple evidentiary videos into one compilation video.

The server 106 can also overlay critical information 716 (see FIGS. 7A and 7B) concerning the traffic violation on one or more images or video frames included as part of the digital evidence package 111 received from the first node 101A. For example, the critical information 716 can include the location of the traffic violation and when the violation occurred. As a more specific example, the server 106 can overlay the critical information 716 based on the timestamp(s) 122 recorded by the first node 101A and the geolocation 120 of the vehicle 114 as determined by the first node 101A.

In some embodiments, the server 106 can also apply an obfuscating filter 708 (see FIG. 7A) or a blurring filter of a preconfigured filter level to objects automatically detected in the one or more images or videos 112 that are not the vehicle 114. This can be done to protect the privacy of other vehicles or pedestrians captured in the images or videos 112.

In some embodiments, the server 106 can also pass the images or video frames from the digital evidence package 111 to an LPR neural network 336 (see FIG. 3A) running on the server 106 to carry out further automatic license plate recognition on certain difficult to recognize license plates.

When the contents of the digital evidence package 111 received from the first node 101A have been modified by the second node 101B (for example, by conducting post-processing on the images or video frames within the evidence package), the resulting evidence package can be considered a modified digital evidence package 138 (represented in FIG. 1B as "EP+").

The second node 101B can then generate a second package digest 128B of the modified digital evidence package 138 using the same hash function 130. For example, the second package digest 128B can be a 128-bit digest, a 224-bit digest, a 256-bit digest, a 384-bit digest, or a 512-bit digest.

The second node 101B can update the distributed ledger 105 to add the second package digest 128B as another ledger entry 132 in the distributed ledger 105. For example, the second node 101B can call an update API 140 to cause each node 101 to insert, add, or log the second package digest 128B as a ledger entry 132 in its own instance of the distributed ledger 105. In certain embodiments, an ordering node (not shown) in the blockchain network 104 can facilitate the synchronization and update of the distributed ledgers 105 among the various peer nodes 101.

The second node 101B can then transmit the modified digital evidence package 138 to the third node 101C. The second node 101B can transmit the modified digital evidence package 138 to the third node 101C after or around the same time that the second package digest 128B is added as a ledger entry 132 to the distributed ledger 105.

The modified digital evidence package 138 can be transmitted over one or more secure network channels or secure connections. As will be discussed in more detail in relation to FIG. 3B, the modified digital evidence package 138 can be encrypted using a symmetric encryption algorithm such as AES-256 prior to transmission.

The third node 101C can validate the modified digital evidence package 138 received from the second node 101B based on the second package digest 128B stored as part of the distributed ledger 105. The third node 101C can validate the modified digital evidence package 138 by querying the other nodes 101 of the blockchain network 104. For example, the third node 101C can validate the modified digital evidence package 138 by applying the same hash function 130 used by the first node 101A and the second node 101B to the modified digital evidence package 138 received from the second node 101B to generate an unverified instance of the second package digest. The third node 101C can then call a validate API 136 to compare the unverified instance of the second package digest against the second package digest 128B stored as part of the distributed ledger 105. For example, the third node 101C can call the validate API 136 to cause each node 101 to compare the unverified instance of the second package digest generated by the third node 101C against the second package digest 128B stored as part of its own instance of the distributed ledger 105. If the unverified instance of the second package digest generated by the third node 101C matches the second package digests 128B stored as part of the distributed ledgers 105, then the modified digital evidence package 138 received from the second node 101B is validated. At this point, the third node 101C can review and modify the contents of the modified digital evidence package 138 to yield a reviewed digital evidence package 142.

The third node 101C is configured to only review and adjust the contents of the modified digital evidence package 138 if the modified digital evidence package 138 received from the second node 101B is validated based on the second package digest 128B included as part of the distributed ledger 105. If the unverified instance of the second package digest generated by the third node 101C does not match the second package digests 128B stored as part of the distributed ledgers 105, the modified digital evidence package 138 received from the second node 101B is considered invalid and possibly subject to tampering.

As previously discussed, the third node 101C can be a server 107 configured or otherwise used to review the processed/post-processed evidence received from the second node 101B. For example, the server 107 can be a server of a governmental agency (e.g., a department of motor vehicles or a department of transportation) responsible for reviewing and making decisions on traffic violations. In other embodiments, the server 107 can be a server of a third-party entity (e.g., a violation processor) hired by a governmental agency to review and make decisions on traffic violations.

For example, a violation reviewer such as an employee of the governmental agency or law enforcement personnel can interface with the server 107 via an online dashboard or web portal to approve or reject the traffic violation based on the evidence included as part of the modified digital evidence package 138. The violation reviewer can then add a review decision to the modified digital evidence package 138. In addition, the violation reviewer can also add certain data or information from a Department of Motor Vehicles database concerning the registered owner of the vehicle 114 to the modified digital evidence package 138. Moreover, the violation reviewer can cause a flag to be added to the modified digital evidence package 138 to indicate that the violation reviewer has validated certain vehicle registration information concerning the vehicle 114 captured in the images or videos 112.

When the violation reviewer has finished reviewing the contents of the modified digital evidence package 138 and has added additional data or information to the modified digital evidence package 138, the resulting evidence package can be considered a reviewed digital evidence package 142 (represented in FIG. 1B as "EP #").

The third node 101C can then generate a third package digest 128C of the reviewed digital evidence package 142 using the same hash function 130. For example, the third package digest 128C can be a 128-bit digest, a 224-bit digest, a 256-bit digest, a 384-bit digest, or a 512-bit digest.

The third node 101C can update the distributed ledger 105 to add the third package digest 128C as another ledger entry 132 in the distributed ledger 105. For example, the third node 101C can call the update API 140 to cause each node 101 to insert, add, or log the third package digest 128C as a ledger entry 132 in its own instance of the distributed ledger 105. In certain embodiments, an ordering node (not shown) in the blockchain network 104 can facilitate the synchronization and update of the distributed ledgers 105 among the various peer nodes 101.

The third node 101C can then transmit the reviewed digital evidence package 142 to a web server 108 configured to present certain contents from the reviewed digital evidence package 142 to an infractor via a review website 109. The third node 101C can transmit the reviewed digital evidence package 138 to the web server 108 after or around the same time that the third package digest 128C is added as a ledger entry 132 to the distributed ledger 105.

The reviewed digital evidence package 142 can be transmitted over one or more secure network channels or secure connections. As will be discussed in more detail in relation to FIG. 3B, the reviewed digital evidence package 142 can be encrypted using a symmetric encryption algorithm such as AES-256 prior to transmission.

The web server 108 can only allow the infractor (e.g., the registered owner of the vehicle 114) to view evidence of the traffic violation if the web server 108 determines that the reviewed digital evidence package 142 received from the third node 101C is valid. The web server 108 can validate the reviewed digital evidence package 142 received from the third node 101C based on the third package digest 128C stored as part of the distributed ledger 105. The web server 108 can validate the reviewed digital evidence package 142 by querying the other nodes 101 of the blockchain network 104. For example, the web server 108 can validate the reviewed digital evidence package 142 by applying the same hash function 130 used by the first node 101A, the second node 101B, and the third node 101C to the reviewed digital evidence package 142 received from the third node 101C to generate an unverified instance of the third package digest. The web server 108 can then call the validate API 136 to compare the unverified instance of the third package digest against the third package digests 128C stored as part of the distributed ledgers 105. For example, the web server 108 can call the validate API 136 to cause each node 101 to compare the unverified instance of the third package digest generated by the web server 108 against the third package digest 128C stored as part of its own instance of the distributed ledger 105. If the unverified instance of the third package digest generated by the web server 108 matches the third package digests 128C stored as part of the distributed ledgers 105, then the reviewed digital evidence package 142 received from the third node 101C is validated. At this point, the web server 108 can present certain contents from the reviewed digital evidence package 142 such as at least some of the images or clips of the videos captured by first node 101A to the infractor via the review website 109 since the contents of the reviewed digital evidence package 142 are now authenticated.

The web server 108 is configured to only allow the infractor to review the contents of the reviewed digital evidence package 142 if the reviewed digital evidence package 142 received from the third node 101C is validated based on the third package digest 128C included as part of the distributed ledger 105. If the unverified instance of the third package digest generated by the web server 108 does not match the third package digests 128C stored as part of the distributed ledgers 105, the reviewed digital evidence package 142 received from the third node 101C is considered invalid and the contents of the reviewed digital evidence package 142 are not shown to the infractor.

Another technical advantage of the blockchain network 104 disclosed herein is that the blockchain network 104 can create a federation with other blockchain networks such as the blockchain network of a government agency or department of transportation through a set of smart contracts to further enhance data security and privacy and improve efficiencies.

Figure 1C:
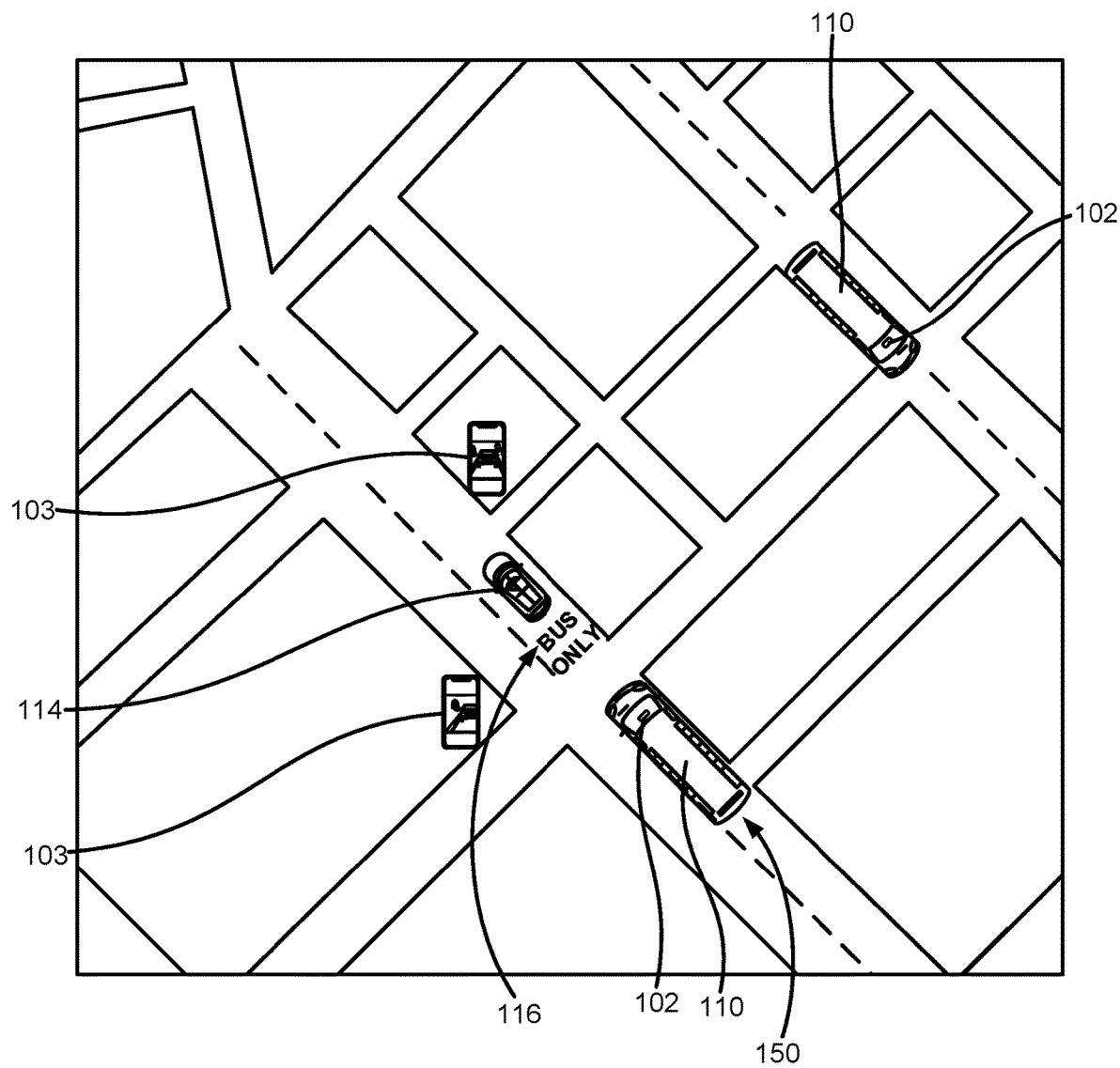
FIG. 1C illustrates a scenario where certain components of the system can detect a traffic violation involving a vehicle and generate one or more digital evidence packages related to the traffic violation.

FIG. 1C illustrates a scenario where certain components of the system 100 can detect a traffic violation involving a vehicle 114 and generate certain evidence related to the traffic violation. As shown in FIG. 1C, the vehicle 114 can be parked or otherwise stopped in a restricted area 116 (e.g., a bus lane) without the necessary credentials or permissions to do so. The restricted area 116 can also be a bike lane, a no parking or no stopping zone (e.g., a no-parking zone in front of a red curb or fire hydrant), or a restricted parking spot (e.g., a handicap parking spot). The restricted area 116 can also be a parking space where the time allotted for parking in the parking space has expired.

In other embodiments, the vehicle 114 can be committing a traffic violation by driving in a restricted area 116 during a period of time when non-exempt vehicles or non-governmental vehicles are not allowed to do so. For example, the vehicle 114 can be committing a traffic violation by driving in a bus lane during a period of time when only buses are allowed to do so.

The restricted area 116 can be marked by certain insignia, text, signage, road or curb coloration, or a combination thereof. In certain embodiments, the restricted area 116 can be designated or indicated in a private or public database (e.g., a municipal GIS database) accessible by the perception devices 102, the mobile devices 103, the server 106, or a combination thereof.

A plurality of carrier vehicles 110, each having a perception device 102 coupled to a windshield or dashboard of the carrier vehicle 110, can encounter the vehicle 114 as the carrier vehicles 110 traverse their usual carrier routes 150.

The carrier route 150 can be a preset route or daily route traversed by a carrier vehicle 110. For example, when the carrier vehicle 110 is a municipal bus, the carrier route 150 of the carrier vehicle 110 can be a bus route. As additional examples, the carrier route 150 can be a waste collection route when the carrier vehicle 110 is a garbage/recycling truck. Moreover, the carrier route 150 can be a street cleaning route when the carrier vehicle 110 is a street sweeper.

As shown in FIG. 1C, one of the carrier vehicles 110 can be driving behind the vehicle 114 (for example, in the same direction as the vehicle 114) as the carrier vehicle 110 encounters the vehicle 114 within the restricted area 116. In other embodiments not shown in FIG. 1C, the carrier vehicle 110 can be driving alongside the vehicle 114 in a lane adjacent to or near (but not adjacent to) the restricted area 116 occupied by the vehicle 114.

The perception devices 102 can be configured to continuously take or capture images or videos 112 of their surrounding environments (i.e., an environment outside of the carrier vehicle 110) as the carrier vehicles 110 traverse their carrier routes 150. In the scenario shown in FIG. 1C, one or more perception devices 102 can capture images or videos 112 of the vehicle 114 committing a traffic violation by being parked or driving within the restricted area 116 without the necessary credentials or permissions to do so.

In certain embodiments, the perception devices 102 can only begin capturing the images or videos 112 when the carrier vehicles 110 are within the boundaries of an enforcement zone. In other embodiments, the perception devices 102 can only begin capturing the images or videos 112 during an enforcement period.

Each of the perception devices 102 can begin capturing images or videos 112 of the vehicle 114 as the vehicle 114 enters the field of view of at least one video image sensor 208 (see FIG. 2A) of the perception device 102. The perception device 102 can periodically or continuously pass images or video frames from the videos 112 to a plurality of deep learning models including at least an object-detection neural network 303 and a license plate-recognition (LPR) neural network 307 (see FIG. 3A) running on the perception device 102. The perception device 102 can also apply certain computer vision tools or functions to the video frames to process or standardize the video frames before passing such video frames to the deep learning models.

By feeding images or video frames to the object-detection neural network 303, the perception device 102 can obtain as outputs, predictions concerning the objects shown in the images or video frames. For example, the perception device 102 can identify an object shown in an image or video frame as a car, a truck, a bus, a bicycle, etc. The perception device 102 can also obtain as an output from the object-detection neural network 303 predictions concerning a set of vehicle attributes 124 such as a color and/or make and model of the vehicle shown in the images or video frames. The vehicle attributes 124 can be used by the perception device 102 to make an initial determination as to whether the vehicle 114 shown in the video frames has the necessary permissions or credentials to be within the restricted area 116.

The perception device 102 can also pass the images or video frames to an LPR neural network 307 running on the perception device 102. In the example scenario shown in FIG. 1C, at least one image or video frame of the videos(s) 112 captured by the perception device 102 can show the license plate of the vehicle 114 from an overtaking angle (i.e., show the back license plate of the vehicle as the vehicle is driving away). By feeding images or video frames into the LPR neural network 307, the perception device 102 can obtain as an output from the LPR neural network 307, a prediction concerning the license plate number 126 of the vehicle 114.

The perception device 102 can then compare the recognized license plate number 126 against at least a license plate whitelist stored on the perception device 102. The license plate whitelist can be a digital repository of license plate numbers of vehicles that are allowed to drive or be stopped within the restricted area 116. For example, such vehicles can comprise public transportation vehicles or other municipal or governmental vehicles.

The perception device 102 can make an initial determination that the vehicle 114 traveling or otherwise stopped in front of the carrier vehicle 110 has committed a traffic violation by comparing the recognized license plate number 126 of the vehicle 114 against the license plate whitelist. As previously mentioned, the perception device 102 can also use the vehicle attributes 124 predicted by the object-detection neural network 303 as part of this initial determination.

The perception device 102 can also estimate a geolocation 120 of the vehicle 114 using, in part, positioning data obtained from a positioning unit 210 (see FIG. 2A) of the perception device 102. The perception device 102 can also determine the geolocation 120 of the vehicle 114 using, in part, inertial measurement data obtained from an IMU 206 and wheel odometry data 216 (see FIG. 2A) obtained from a wheel odometer of the carrier vehicle 110. For example, the perception device can estimate the geolocation 120 of the vehicle 114 by calculating a distance separating the vehicle 114 from the perception device 102 and adding such a separation distance to its own present location. As a more specific example, the perception device 102 can calculate the distance separating the vehicle 114 from the perception device 102 using images or video frames containing the license plate of the vehicle 114 and certain computer vision algorithms designed for distance calculation.

In alternative embodiments, the perception device 102 can simply use its own present location as the geolocation 120 of the vehicle 114 if the vehicle 114 is determined to be in close proximity to the carrier vehicle 110.

The perception device 102 can also record or generate a plurality of timestamps 122 marking the time of the traffic violation. The perception device 102 can mark the time using several timestamps 122 including a global positioning system (GPS) timestamp and a Network Time Protocol (NTP) timestamp. The perception device 102 can record timestamps 122 from multiple sources in case one of the timestamps 122 is inaccurate.

The perception device 102 can then compile or generate a digital evidence package 111 comprising data or information concerning the traffic violation committed by the vehicle 114 for transmission to another node 101 in the system 100 such as the post-processing server 106. The digital evidence package 111 can comprise at least some of the image(s) or at least part of the video(s) 112 captured by the perception device 102, the geolocation 120 of the vehicle 114 as estimated or calculated by the perception device 102, a plurality of timestamps 122 recorded by the perception device 102 during the traffic violation, and a license plate number 126 of the vehicle 114. In some embodiments, the digital evidence package 111 can also comprise vehicle attributes 124 of the vehicle 114 detected by the perception device 102 such as a color of the vehicle 114 and/or a make and model of the vehicle 114.

The perception device 102 can transmit the digital evidence package 111 to another node 101 in the system 100 such as the post-processing server 106. As previously discussed, the perception device 102 can also generate a package digest 128 of the digital evidence package 111 and call or invoke an insert API to insert or add the package digest 128 as an entry to the distributed ledger 105.

FIG. 1C also illustrates that a mobile device 103 having an instance of a mobile application 305 (see FIGS. 3A and 6A) running on the mobile device 103 can be used by a user of the mobile device 103 to take or capture images or videos 112 of the vehicle 114 committing a traffic violation. As previously discussed, the vehicle 114 can be committing a traffic violation by being parked or otherwise stopped in a restricted area 116 (e.g., a bus lane, bike lane, a no parking or no stopping zone, etc.). The vehicle 114 can also be committing a traffic violation by driving in a restricted area 116 during a period of time when non-exempt vehicles or non-governmental vehicles are not allowed to do so.

In some embodiments, a user can capture images or videos 112 of the vehicle 114 committing a traffic violation in real-time directly through the mobile application 305. In other embodiments, the same user or another user can upload previously captured images or videos 112 of the vehicle 114 committing a traffic violation through the mobile application 305.

Moreover, the user can use the mobile device 103 to capture images or videos 112 of the vehicle 114 from multiple viewing angles or vantage points so that multiple sides of the vehicle 114 are shown in the images or videos 112. As a more specific example, the user can use the mobile device 103 to capture images or videos 112 of the vehicle 114 from at least three viewing angles such that a front or rear of the vehicle 114 is shown along with the two sides of the vehicle 114.

Alternatively, the user can use the mobile device 103 to capture one or more images or videos 112 of the vehicle 114 from a single viewing angle or vantage point. For example, the user can use the mobile device 103 to capture one or more images or videos 112 of only one side of the vehicle 114 or only the front or rear of the vehicle 114.

In some embodiments, the mobile device 103 can automatically generate certain metadata 118 associated with the images or videos 112 captured by the mobile device 103. When the images or videos 112 are captured in real-time using the mobile application 305, the mobile device 103 can generate the metadata 118 once the images or videos 112 have been captured. When previously captured images or videos 112 are uploaded through the mobile application 305, the mobile device 103 can generate the metadata 118 once the images or videos 112 have been uploaded.

The metadata 118 can comprise data or information concerning a location 120 of the vehicle 114. The metadata 118 can also comprise at least one timestamp 122 logged or recorded by the mobile device 103 as the mobile device 103 is capturing the images or videos 112 of the vehicle 114. In some embodiments, the mobile device 103 can simply use its own present location as the location 120 of the vehicle 114 if the vehicle 114 is determined to be in close proximity to the mobile device 103. In other embodiments, the mobile device can estimate the location 120 of the vehicle 114 by calculating a distance separating the vehicle 114 from the mobile device 103 and adding such a separation distance to its own present location. As a more specific example, the mobile device 103 can calculate the distance separating the vehicle 114 from the mobile device 103 using images or video frames containing the license plate of the vehicle 114 and certain computer vision algorithms designed for distance calculation.

Moreover, the metadata 118 can also comprise certain predictions outputted by one or more deep learning models or neural networks running on the mobile device 103. For example, one or more processors of the mobile device 103 can pass images or video frames captured by the mobile device 103 to least an object-detection neural network 315 and a license plate-recognition (LPR) neural network 317 (see FIG. 3A) running on the mobile device 103. For example, one or more processors of the mobile device 103 can pass images or video frames to the object-detection neural network 315 to obtain predictions concerning the objects shown in the images or video frames. For example, the mobile device 103 can identify an object shown in an image or video frame as a car, a truck, a bus, a bicycle, etc. The mobile device 103 can also obtain as an output from the object-detection neural network 315 predictions concerning a set of vehicle attributes 124 such as a color, make and model, and vehicle type of the vehicle shown in the images or video frames. The vehicle attributes 124 can be used by the mobile device 103 to make an initial determination as to whether the vehicle 114 shown in the video frames has the necessary permissions or credentials to be within the restricted area 116.

The one or more processors of the mobile device 103 can also pass the images or video frames to an LPR neural network 317 running on the mobile device 103. By feeding video frames into the LPR neural network 317, the mobile device 103 can obtain as an output from the LPR neural network 317, a prediction concerning the license plate number 126 of the vehicle 114.

The one or more processors of the mobile device 103 can then compare the recognized license plate number 126 against at least a license plate whitelist 319 (see FIG. 3A) stored on the mobile device 103. The license plate whitelist 319 can be a digital repository of license plate numbers of vehicles that are allowed to drive or be stopped within the restricted area 116.

The mobile device 103 can also make an initial determination that the vehicle 114 has committed a traffic violation by comparing the recognized license plate number 126 of the vehicle 114 against the license plate whitelist 319. As previously mentioned, the mobile device 103 can also use the vehicle attributes 124 predicted by the object-detection neural network 315 as part of this initial determination.

The mobile device 103 can then compile or generate an evidence package 111 comprising data or information concerning the traffic violation committed by the vehicle 114 for transmission to another node 101 in the system 100 such as the second node 101B (e.g., the post-processing server 106). The evidence package 111 can comprise at least some of the image(s) or at least part of the video(s) 112 captured by the mobile device 103, the geolocation 120 of the vehicle 114 as estimated or calculated by the mobile device 103, a plurality of timestamps 122 recorded by the mobile device 103 marking the time of the traffic violation, and a license plate number 126 of the vehicle 114. In some embodiments, the digital evidence package 111 can also comprise vehicle attributes 124 of the vehicle 114 detected by the perception device 102 such as a color of the vehicle 114, a make and model of the vehicle 114, and a vehicle type of the vehicle 114.

The mobile device 103 can transmit the digital evidence package 111 to another node 101 in the system 100 such as the post-processing server 106. As previously discussed, the mobile device 103, serving as the first node 101A, can also generate a package digest 128 of the digital evidence package 111 and call or invoke an insert API to insert or add the package digest 128 as an entry to the distributed ledger 105.

Figure 2A:
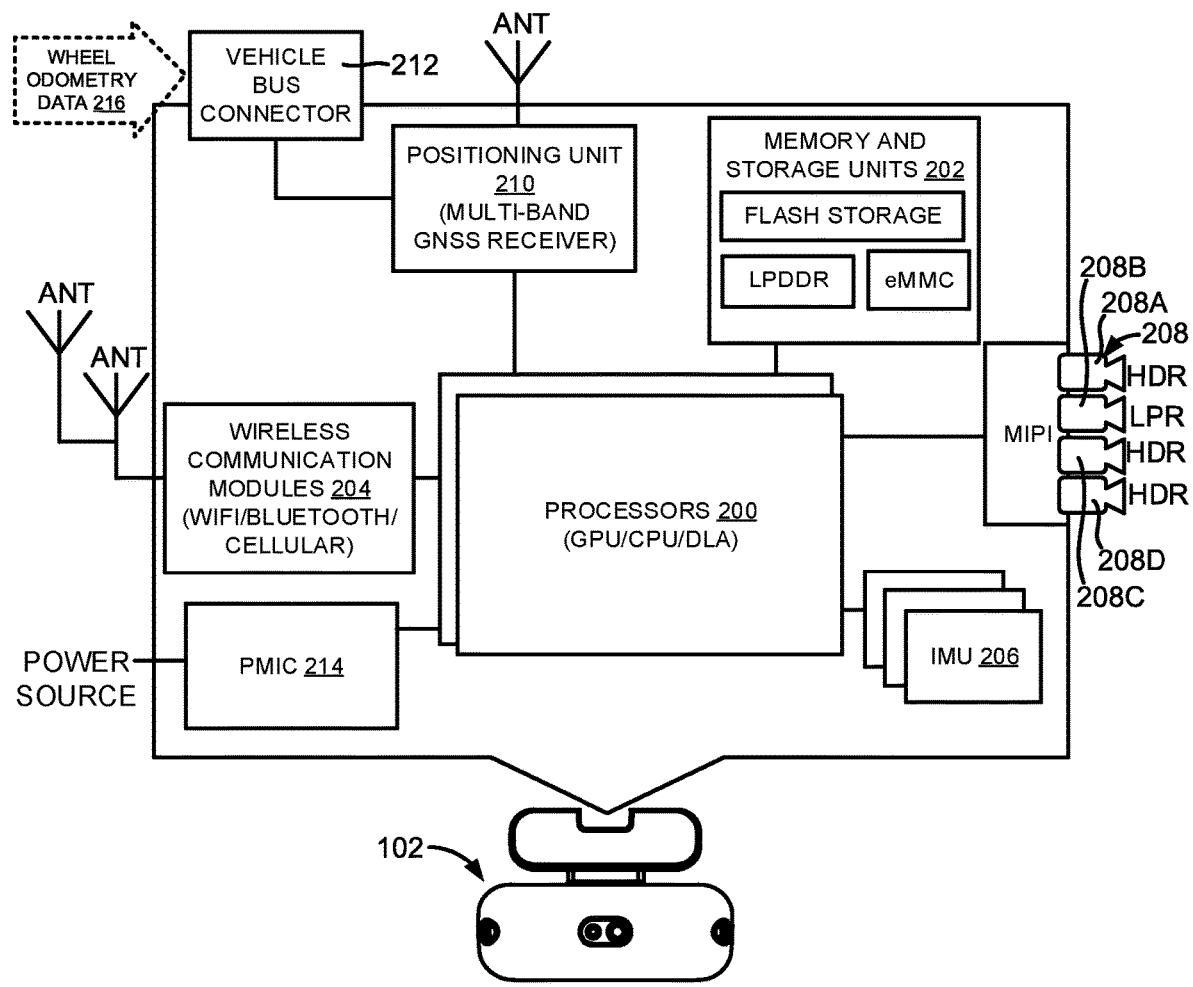
FIG. 2A illustrates one embodiment of a perception device of the system implemented as an apparatus configured to be mounted to a carrier vehicle.

FIG. 2A illustrates one embodiment of a perception device 102 of the system 100. For purposes of this disclosure, any references to the perception device 102 can also be interpreted as a reference to a specific component, processor, module, chip, or circuitry within the perception device 102.

As shown in FIG. 2A, the perception device 102 can comprise a plurality of processors 200, memory and storage units 202, wireless communication modules 204, inertial measurement units (IMUs) 206, and video image sensors 208. The perception device 102 can also comprise a positioning unit 210, a vehicle bus connector 212, and a power management integrated circuit (PMIC) 214. The components of the perception device 102 can be connected to one another via high-speed buses or interfaces.

The processors 200 can include one or more central processing units (CPUs), graphical processing units (GPUs), Application-Specific Integrated Circuits (ASICs), field-programmable gate arrays (FPGAs), or a combination thereof. The processors 200 can execute software stored in the memory and storage units 202 to execute the methods or instructions described herein.

For example, the processors 200 can refer to one or more GPUs and CPUs of a processor module configured to perform operations or undertake calculations at a terascale. As a more specific example, the processors 200 of the perception device 102 can be configured to perform operations at 21 tera operations (TOPS). The processors 200 of the perception device 102 can be configured to run multiple deep learning models or neural networks in parallel and process data from multiple high-resolution sensors such as the plurality of video image sensors 208. More specifically, the processor module can be a Jetson Xavier NX™ module developed by NVIDIA Corporation. The processors 200 can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially-designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the perception device 102.

The memory and storage units 202 can comprise volatile memory and non-volatile memory or storage. For example, the memory and storage units 202 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units 202 can comprise a 512 gigabyte (GB) SSD, an 8 GB 128-bit LPDDR4× memory, and 16 GB eMMC 5.1 storage device. Although FIG. 2A illustrates the memory and storage units 202 as separate from the processors 200, it should be understood by one of ordinary skill in the art that the memory and storage units 202 can be part of a processor module comprising at least some of the processors 200. The memory and storage units 202 can store software, firmware, data (including video and image data), tables, logs, databases, or a combination thereof.

The wireless communication modules 204 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the perception device 102 to communicate over a WiFi network such as a WiFi network provided by the carrier vehicle 110, a municipality, a business, or a combination thereof. The WiFi communication module can allow the perception device 102 to communicate over one or more WiFi (IEEE 802.11) commination protocols such as the 802.11n, 802.11ac, or 802.11ax protocol.

The Bluetooth® module can allow the perception device 102 to communicate with other perception devices 102 over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 204 can comprise a combined WiFi and Bluetooth® module.

Each of the IMUs 206 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs 206 can be a low-power 6-axis IMU provided by Bosch Sensortec GmbH.

The perception device 102 can comprise one or more video image sensors 208. In one example embodiment, the perception device 102 can comprise a plurality of video image sensors 208. As a more specific example, the perception device 102 can comprise four video image sensors 208 (e.g., a first video image sensor 208A, a second video image sensor 208B, a third video image sensor 208C, and a fourth video image sensor 208D). At least one of the video image sensors 208 can be configured to capture video at a frame rate of between 1 frame per second and 120 frames per second (FPS) (e.g., about 30 FPS). In other embodiments, at least one of the video image sensors 208 can be configured to capture video at a frame rate of between 20 FPS and 80 FPS.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 megapixels (MP)). The LPR camera can also capture video at a frame rate of between 1 frame per second and 120 FPS. In other embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light high-dynamic range (HDR) image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors provided by Sony Semiconductor Solutions Corporation.

The video image sensors 208 can be connected to the processors 200 via a high-speed camera interface such as a Mobile Industry Processor Interface (MIPI) camera serial interface.

In alternative embodiments, the video image sensors 208 can refer to built-in video image sensors of the carrier vehicle 110. For example, the video image sensors 208 can refer to one or more built-in cameras included as part of the carrier vehicle's Advanced Driver Assistance Systems (ADAS).

The perception device 102 can also comprise a high-precision automotive-grade positioning unit 210. The positioning unit 210 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 210 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 210 can be configured to receive signals from all four of the aforementioned satellite navigation systems or three out of the four satellite navigation systems. For example, the positioning unit 210 can be a ZED-F9K dead reckoning module provided by u-blox holding AG.

The positioning unit 210 can provide positioning data that can allow the perception device 102 to determine its own location at a centimeter-level accuracy. The positioning unit 210 can also provide positioning data that can be used by the perception device 102 to determine the location of the vehicle 114. For example, the perception device 102 can use positioning data concerning its own location to substitute for the location of the vehicle 114. The perception device 102 can also use positioning data concerning its own location to estimate or approximate the location of the vehicle 114.

In other embodiments, the perception device 102 can determine the location of the vehicle 114 by recognizing an object or landmark (e.g., a bus stop sign) near the vehicle 114 with a known geolocation associated with the object or landmark. In these embodiments, the perception device 102 can use the location of the object or landmark as the location of the vehicle 114. In further embodiments, the location of the vehicle 114 can be determined by factoring in a distance calculated between the perception device 102 and the vehicle 114 based on a size of the license plate shown in one or more video frames of the video captured by the perception device 102 and a lens parameter of one of the video image sensors 208 (e.g., a zoom factor of the lens).

FIG. 2A also illustrates that the perception device 102 can comprise a vehicle bus connector 212. For example, the vehicle bus connector 212 can allow the perception device 102 to obtain wheel odometry data 216 from a wheel odometer of the carrier vehicle 110 carrying the perception device 102. For example, the vehicle bus connector 212 can be a J1939 connector. The perception device 102 can take into account the wheel odometry data 216 to determine the location of the vehicle 114.

FIG. 2A illustrates that the perception device 102 can comprise a PMIC 214. The PMIC 214 can be used to manage power from a power source. In some embodiments, the perception device 102 can be powered by a portable power source such as a battery. In other embodiments, the perception device 102 can be powered via a physical connection (e.g., a power cord) to a power outlet or direct-current (DC) auxiliary power outlet (e.g., 12V/24V) of the carrier vehicle 110.

Figure 2B:
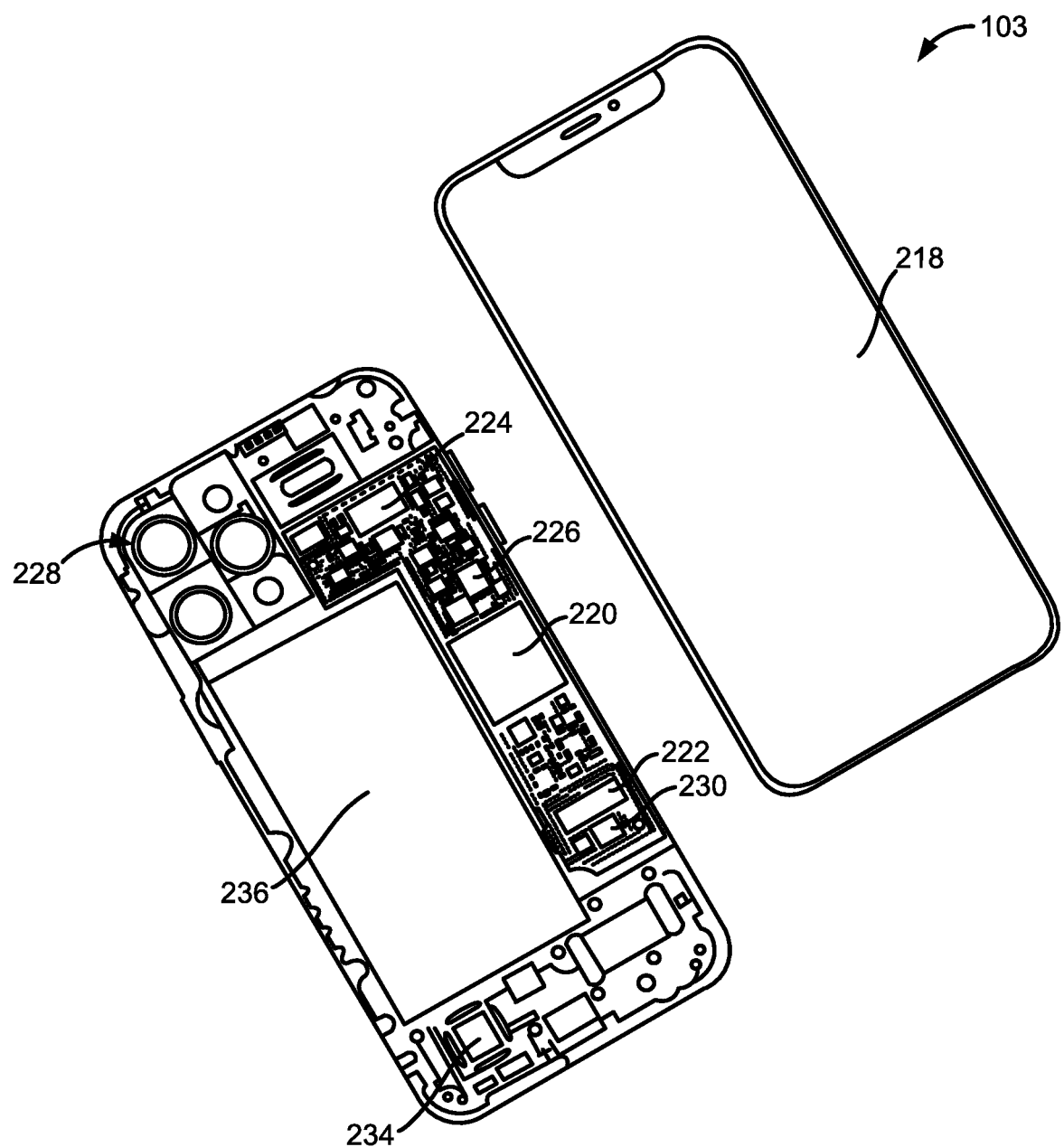
FIG. 2B illustrates one embodiment of a mobile device of the system implemented as a personal communication device such as a smartphone.

FIG. 2B illustrates one embodiment of a mobile device 103 of the system 100 with a display 218 of the mobile device 103 separated from the remainder of the mobile device 103 for ease of viewing. As shown in FIG. 2B, the mobile device 103 can be implemented as a personal communication or computing device such as a smartphone. In other embodiments, the mobile device 103 can be implemented as another type of personal communication or computing device such as a tablet computer, a laptop computer, or a pair of smart eyeglasses or sunglasses.

For purposes of this disclosure, any references to the mobile device 103 can also be interpreted as a reference to a specific component, processor, module, chip, or circuitry within the mobile device 103.

As shown in FIG. 2B, the mobile device 103 (e.g., the personal communication or computing device) can comprise one or more processors 220, memory and storage units 222, wireless communication modules 224, inertial measurement units (IMUs) 226, and video image sensors or cameras 228. The mobile device 103 can also comprise a positioning unit 230, a power management integrated circuit (PMIC) 234, and a portable power storage unit 236. The components of the mobile device 103 can be connected to one another via high-speed buses or interfaces.

The processors 220 can include one or more central processing units (CPUs), graphical processing units (GPUs), Application-Specific Integrated Circuits (ASICs), field-programmable gate arrays (FPGAs), or a combination thereof. The processors 220 can execute software stored in the memory and storage units 222 to execute the methods or instructions described herein.

For example, the processors 220 can refer to one or more CPUs of a processor module configured to perform operations or undertake calculations. The processors 220 of the mobile device 103 can be configured to run one or more deep learning models or neural networks and process data from multiple high-resolution sensors such as the plurality of video image sensors or cameras 228.

In some embodiments, the processors 220 can comprise tensor cores and a deep learning accelerator (DLA) or other specially-designed circuitry optimized for deep learning algorithms.

In certain embodiments, at least some of the processors 220 can be utilized for object detection and license plate recognition. Moreover, at least some of the processors 220 can also be utilized for simultaneous localization and mapping. The processors 220 can also be used to run other functions and maintain the operation of the mobile device 103.

The memory and storage units 222 can comprise volatile memory and non-volatile memory or storage. For example, the memory and storage units 222 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. Although FIG. 2A illustrates the memory and storage units 222 as separate from the processors 220, it should be understood by one of ordinary skill in the art that the memory and storage units 222 can be part of a processor module comprising at least some of the processors 220. The memory and storage units 222 can store software, firmware, data (including video and image data), tables, logs, databases, or a combination thereof.

The wireless communication modules 224 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards.

The WiFi communication module can allow the mobile device 103 to communicate over one or more WiFi (IEEE 802.11) commination protocols such as the 802.11n, 802.11ac, or 802.11ax protocol. The Bluetooth® module can allow the mobile device 103 to communicate with other mobile devices or client devices over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 224 can comprise a combined WiFi and Bluetooth® module.

Each of the IMUs 226 can comprise a 3-axis accelerometer, a 3-axis gyroscope, a 3-axis magnetometer, or a combination thereof. For example, the 3-axis accelerometer can be a 3-axis microelectromechanical system (MEMS) accelerometer and a 3-axis MEMS gyroscope. As a more specific example, the IMUs 226 can be IMUs provided by Bosch Sensortec GmbH.

The mobile device 103 can comprise one or more built-in video image sensors or cameras 228. As a more specific example, the mobile device 103 can comprise three or four video image sensors or cameras 228. At least one of the video image sensors or cameras 228 can be configured to capture video at a frame rate of between 1 frame per second and 120 frames per second (FPS) (e.g., about 30 FPS). In other embodiments, at least one of the video image sensors or cameras 228 can be configured to capture video at a frame rate of between 20 FPS and 80 FPS. Moreover, at least one of the video image sensors or cameras 228 can capture high dynamic range (HDR) images or videos. In some embodiments, the video image sensors 228 can be or comprise ultra-low-light CMOS image sensors.

The mobile device 103 can also comprise a high-precision positioning unit 230 having a global positioning system (GPS) receiver. The GPS receiver can receive GPS signals from a GPS satellite. The positioning unit 230 can provide positioning data that can allow the mobile device 103 to determine its own location at a high-level accuracy. The positioning unit 230 can also provide positioning data that can be used by the mobile device 103 to approximate the location of the vehicle 114. For example, the mobile device 103 can use positioning data concerning its own location to substitute for the location of the vehicle 114.

In other embodiments, the mobile device 103 can determine the location of the vehicle 114 by recognizing an object or landmark (e.g., a bus stop sign) near the vehicle 114 with a known geolocation associated with the object or landmark. In these embodiments, the mobile device 103 can use the location of the object or landmark as the location of the vehicle 114. In further embodiments, the location of the vehicle 114 can be determined by factoring in a distance calculated between the mobile device 103 and the vehicle 114 based on a size of the license plate shown in one or more video frames of the video captured by the mobile device 103 and a lens parameter of one of the video image sensors or cameras 228 (e.g., a zoom factor of the lens).

The mobile device 103 can also comprise a PMIC 234 and a portable power storage unit 236. The PMIC 234 can be used to manage power from a power source. In some embodiments, the mobile device 103 can be powered by a rechargeable battery (e.g., a lithium-ion battery) serving as the portable power storage unit 236.

The display 218 of the mobile device 103 can be a touchscreen display such as a liquid crystal display (LCD), an organic light-emitting diode (OLED) display, an active-matrix organic light-emitting diode (AMOLED) display, a super-AMOLED (S-AMOLED) display, a super LCD display (S-LCD), a thin film transistor (TFT) display, or a flexible instance of the aforementioned displays. In certain embodiments, the display 218 can be a retina display, a haptic touchscreen, or a combination thereof. For example, when the mobile device 103 is a smartphone, the display 218 can be the touchscreen display of the smartphone.

Similar to the perception device 102 shown in FIG. 2A, the mobile device 103 can also be positioned near a windshield or window of a vehicle of a user via a phone or tablet holder coupled to the windshield, window, dashboard, deck, mount, or body of the vehicle.

Figure 2C:
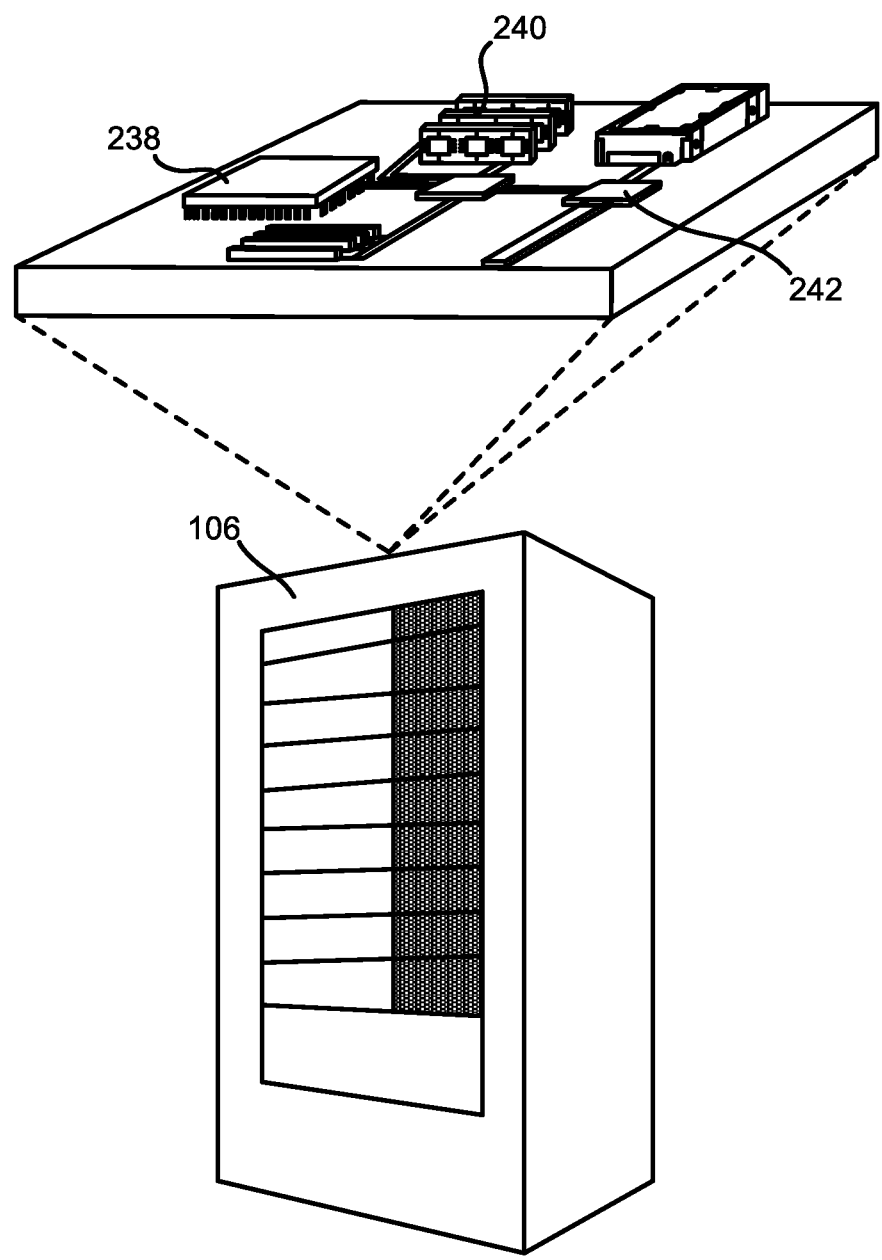
FIG. 2C illustrates one embodiment of a server of the system.

FIG. 2C illustrates one embodiment of the server 106 of the system 100. As previously discussed, the server 106 can comprise or refer to one or more virtual servers or virtualized computing resources. For example, the server 106 can refer to a virtual server or cloud server hosted and delivered by a cloud computing platform (e.g., Amazon Web Services®, Microsoft Azure®, or Google Cloud®). In other embodiments, the server 106 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 106 can also be interpreted as a reference to a specific component, processor, module, chip, or circuitry within the server 106.

For example, the server 106 can comprise one or more server processors 238, server memory and storage units 240, and a server communication interface 242. The server processors 238 can be coupled to the server memory and storage units 240 and the server communication interface 242 through high-speed buses or interfaces.

The one or more server processors 238 can comprise one or more CPUs, GPUs, ASICs, FPGAs, or a combination thereof. The one or more server processors 238 can execute software stored in the server memory and storage units 240 to execute the methods or instructions described herein. The one or more server processors 238 can be embedded processors, processor cores, microprocessors, logic circuits, hardware FSMs, DSPs, or a combination thereof. As a more specific example, at least one of the server processors 238 can be a 64-bit processor.

The server memory and storage units 240 can store software, data (including video or image data), tables, logs, databases, or a combination thereof. The server memory and storage units 240 can comprise an internal memory and/or an external memory, such as a memory residing on a storage node or a storage server. The server memory and storage units 240 can be a volatile memory or a non-volatile memory. For example, the server memory and storage units 240 can comprise nonvolatile storage such as NVRAM, Flash memory, solid-state drives, hard disk drives, and volatile storage such as SRAM, DRAM, or SDRAM.

The server communication interface 242 can refer to one or more wired and/or wireless communication interfaces or modules. For example, the server communication interface 242 can be a network interface card. The server communication interface 242 can comprise or refer to at least one of a WiFi communication module, a cellular communication module (e.g., a 4G or 5G cellular communication module), and a Bluetooth®/BLE or other-type of short-range communication module. The server 106 can connect to or communicatively couple with each of the mobile devices 103 and perception devices 102 via the server communication interface 242. The server 106 can transmit or receive packets of data using the server communication interface 242.

Figure 3A:
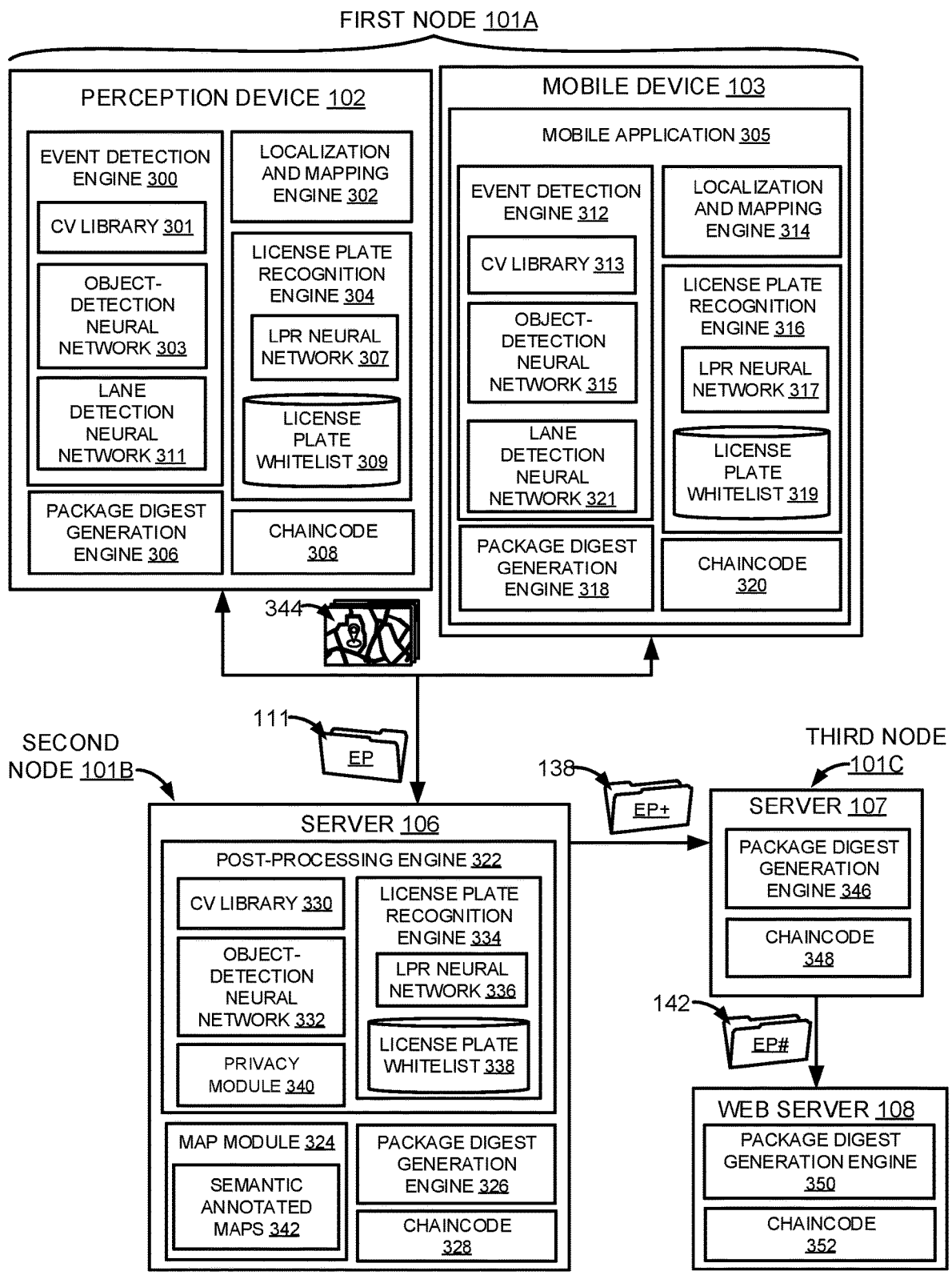
FIG. 3A illustrates certain modules and engines of certain components of the system.

FIG. 3A illustrates certain modules and engines of the first node 101A, the second node 101B, the third node 101C, and the web server 108. As previously discussed, the first node 101A can be a perception device 102 or a mobile device 103.

The perception device 102, when coupled to a carrier vehicle 110, can continuously capture images or videos 112 (see, e.g., FIG. 1B) of an external environment surrounding the perception device 102. For example, the video image sensors 208 of the perception device 102 can capture everything that is within a combined field of view 512 (see, e.g., FIG. 5C) of the video image sensors 208. The video image sensors 208 of the perception device 102 can capture images or videos 112 of the external environment surrounding the perception device 102 while the carrier vehicle 110 is in motion (e.g., while the carrier vehicle 110 is traversing its daily carrier route 150). For example, the video image sensors 208 of the perception device 102 can capture images or videos 112 of a vehicle 114 committing a traffic violation near the carrier vehicle 110.

The mobile device 103 can also be used to capture images or videos 112 of a vehicle 114 committing a traffic violation. For example, a user of the mobile device 103 can capture evidence of the vehicle 114 committing a traffic violation by opening a mobile application 305 (see FIG. 3A) running on the mobile device 103. In some embodiments, the mobile application 305 can be an Apple® iOS mobile application or an Android® mobile application. The user can apply a user input to one or more user interface icons (e.g., a report UI icon 602, see FIG. 6A) to capture images or videos 112 of the vehicle 114 committing a traffic violation. For example, the vehicle 114 can be parked or otherwise stopped in a restricted area 116 (see FIG. 1C) such as a bus lane or bike lane.

In some embodiments, the perception device 102 can comprise at least an event detection engine 300, a localization and mapping engine 302, a license plate recognition engine 304, a package digest generation engine 306, and chaincode 308 for running, implementing, or maintaining the distributed ledger 105.

Software instructions running on the perception device 102, including any of the engines and modules disclosed herein, can be written in the Java® programming language, C++ programming language, the Python® programming language, the Golang™ programming language, or a combination thereof.

In certain embodiments, the mobile device 103 can also comprise an event detection engine 312, a localization and mapping engine 314, a license plate recognition engine 316, a package digest generation engine 318, and chaincode 320 for running, implementing, or maintaining the distributed ledger 105. It is contemplated by this disclosure and it should be understood by one of ordinary skill in the art that the event detection engine 312, the localization and mapping engine 314, the license plate recognition engine 316, the package digest generation engine 318, the chaincode 320, or a combination thereof can be implemented as software modules or routines of the mobile application 305.

Software instructions running on the mobile device 103, including any of the engines and modules disclosed herein, can be written in the Objective-C programming language, Swift® programming language, Java® programming language, JavaScript programming language, Python® programming language, Kotlin® programing language, Golang™ programming language, C++ programming language, or a combination thereof.

The event detection engine 300 can retrieve or grab images or video frames from a shared camera memory (i.e., onboard/non-volatile memory) of the perception device 102. The shared camera memory can be configured for storing videos captured by the video image sensors 208. Since the video image sensors 208 are capturing approximately 30 video frames per second, the video frames are stored in the shared camera memory prior to being analyzed by the event detection engine 300. In some embodiments, the video frames can be grabbed using a video frame grab function such as the GStreamer tool.

The event detection engine 300 can then call a plurality of functions from a computer vision library 301 to read or otherwise obtain frames from the images or videos 112 captured by the perception device 102 and enhance the video frames by resizing, cropping, or rotating such frames. For example, the event detection engine 300 can crop and resize the video frame to optimize the video frame for analysis by one or more deep learning models or neural networks (e.g., convolutional neural networks) running on the perception device 102. For example, the event detection engine 300 can crop and resize the video frame to match the pixel width and height of the training video frames used to train a neural network running on the perception device 102. Also, for example, the event detection engine 300 can crop and resize the video frame such that the aspect ratio of the video frame matches the aspect ratio of the training video frames.

In some embodiments, the computer vision library 301 can be the OpenCV® library maintained and operated by the Open Source Vision Foundation. In other embodiments, the computer vision library 301 can be or comprise functions from the TensorFlow® software library, the SimpleCV® library, or a combination thereof.

The event detection engine 300 can then pass or feed images or video frames captured by the video image sensors 208 of the perception device 102 to an object-detection neural network 303 running on the perception device 102. By passing and feeding images or video frames to the object-detection neural network 303, the event detection engine 300 of the perception device 102 can obtain as outputs from the object-detection neural network 303 predictions concerning the objects shown in the images or video frames. For example, the event detection engine 300 can obtain, as outputs, an object class and a confidence score for the object detected.

In some embodiments, the object-detection neural network 303 can be configured or trained such that only certain vehicle-related objects are supported by the object-detection neural network 303. For example, the object-detection neural network 303 can be configured or trained such that the object classes supported only include cars, trucks, buses, etc. Also, for example, the object-detection neural network 303 can be configured or trained such that the object classes supported also include bicycles, scooters, and other types of wheeled mobility vehicles. In some embodiments, the object-detection neural network 303 can be configured or trained such that the object classes supported also comprise non-vehicle classes such as pedestrians, landmarks, street signs, fire hydrants, bus stops, and building façades.

In some embodiments, the object-detection neural network 303 can be configured to detect up to 60 objects per video frame. Although the object-detection neural network 303 can be configured to accommodate numerous object classes, one advantage of limiting the number of object classes is to reduce the computational load on the processors of the perception device 102, shorten the training time of the neural network, and make the neural network more efficient.

The object-detection neural network 303 can comprise a plurality of convolutional layers and fully connected layers trained for object detection (and, in particular, vehicle detection). In one embodiment, the object-detection neural network 303 can be an open-source neural network or convolutional neural network trained for object detection. For example, the object-detection neural network 303 can be a modified instance of the DetectNet deep neural network.

In other embodiments, the object-detection neural network 303 can be the You Only Look Once Lite (YOLO Lite) object detection model.

In some embodiments, the object-detection neural network 303 can also identify or predict certain attributes of the detected objects. For example, when the object identified is a vehicle, the object-detection neural network 303 can identify or predict a set of vehicle attributes 124 such as a vehicle such as the color of the vehicle, the make and model of the vehicle, and the vehicle type (e.g., whether the vehicle is a personal vehicle or a public service vehicle). The vehicle attributes 124 can be used by the event detection engine 300 to make an initial determination as to whether the vehicle 114 shown in the video frames is allowed occupy the restricted area 116.

The object-detection neural network 303 can be trained, at least in part, from video frames of videos captured by the perception device 102 or other perception devices 102 deployed in the same municipality or coupled to other carrier vehicles 110 in the same carrier fleet. The object-detection neural network 303 can be trained, at least in part, from video frames of videos captured by the perception device 102 or other perception devices at an earlier point in time. Moreover, the object-detection neural network 303 can be trained, at least in part, from video frames from one or more open-sourced training sets or datasets.

Similar to the perception device 102, the event detection engine 312 of the mobile device 103 can also call a plurality of functions from a computer vision library 313 to read or otherwise obtain frames from the images or videos 112 captured by the mobile device 103 and enhance the video frames by resizing, cropping, or rotating such frames. For example, the event detection engine 312 can crop and resize the video frame to optimize the video frame for analysis by one or more deep learning models or convolutional neural networks running on the mobile device 103. For example, the event detection engine 312 can crop and resize the video frame to match the pixel width and height of the training video frames used to train a neural network running on the mobile device 103. Also, for example, the event detection engine 312 can crop and resize the video frame such that the aspect ratio of the video frame matches the aspect ratio of the training video frames.

In some embodiments, the computer vision library 313 can be the OpenCV® library maintained and operated by the Open Source Vision Foundation. In other embodiments, the computer vision library 310 can be or comprise functions from the TensorFlow® software library, the SimpleCV® library, or a combination thereof.

The event detection engine 312 can pass or feed images or video frames captured by the cameras 228 of the mobile device 103 to an object-detection neural network 315 running on the mobile device 103. By passing and feeding images or video frames to the object-detection neural network 315, the event detection engine 312 of the mobile device 103 can obtain as outputs from the object-detection neural network 315 predictions concerning the objects shown in the images or video frames. For example, the event detection engine 312 can obtain, as outputs, an object class and a confidence score for the object detected.

The object-detection neural network 315 can comprise a plurality of convolutional layers and fully connected layers trained for object detection (and, in particular, vehicle detection). In one embodiment, the object-detection neural network 315 can be an open-source neural network or convolutional neural network trained for object detection. For example, the object-detection neural network 315 can be a modified instance of the DetectNet deep neural network.

In other embodiments, the object-detection neural network 315 can be the You Only Look Once Lite (YOLO Lite) object detection model.

In some embodiments, the object-detection neural network 315 can also identify or predict certain attributes of the detected objects. For example, when the object identified is a vehicle, the object-detection neural network 315 can identify or predict a set of vehicle attributes 124 such as a vehicle such as the color of the vehicle, the make and model of the vehicle, and the vehicle type (e.g., whether the vehicle is a personal vehicle or a public service vehicle). The vehicle attributes 124 can be used by the event detection engine 312 to make an initial determination as to whether the vehicle 114 shown in the video frames is allowed occupy the restricted area 116.

As shown in FIG. 3A, the perception device 102 can also comprise a license plate recognition engine 304. The license plate recognition engine 304 can be configured to recognize the license plate number 126 of the vehicle 114 in the images or video frames. For example, the license plate recognition engine 304 can pass video frames or images captured by a dedicated LPR camera of the perception device 102 (e.g., the second video image sensor 208B of FIGS. 2A, 5A, and 5D) to a license plate recognition (LPR) neural network 307 running on the perception device 102.

The LPR neural network 307 can be specifically trained to recognize license plate numbers 126 from video frames or images. Alternatively, or additionally, the license plate recognition engine 304 can also pass video frames or images captured by one of the HDR image sensors (e.g., the first video image sensor 208A, the third video image sensor 208C, or the fourth video image sensor 208D) to the LPR neural network 307 to recognize license plate numbers 126 from such video frames or images.

The video frames or images can show the license plate number 126 of the vehicle 114 from an overtaking angle (i.e., where the video frame or image shows the back license plate of the vehicle 114 as the vehicle 114 is driving away from a carrier vehicle 110) or an incoming angle (i.e., where the video frame or image shows the front license plate of the vehicle 114 as the vehicle 114 is driving toward the carrier vehicle 110).

In some embodiments, the LPR neural network 307 can be an open-source neural network trained for license plate recognition. In certain embodiments, the LPR neural network 307 can be a version of the OpenALPR™ license plate recognition model or a modified version of the OpenALPR™ license plate recognition model.

By feeding video frames or images into the LPR neural network 307, the perception device 102 can obtain as an output from the LPR neural network 307, a prediction concerning the license plate number 126 of the vehicle 114. The prediction can be in the form of an alphanumeric string representing the license plate number 126.

The perception device 102 can compare the recognized license plate number 126 against at least a license plate whitelist 309 stored on the perception device 102. The license plate whitelist 309 can be a digital repository of license plate numbers of vehicles that are allowed to be stopped, travel, or otherwise be in motion within the restricted area 116 such as public transportation vehicles and municipal or governmental vehicles.

The event detection engine 300 can make an initial determination that a vehicle captured in one of the images or videos 112 (e.g., a vehicle driving in front of or next to a carrier vehicle 110) has committed a traffic violation by comparing the recognized license plate number 126 of the vehicle 114 against at least the license plate whitelist 309. The event detection engine 300 can also use the vehicle attributes 124 predicted by the object-detection neural network 303 as part of this initial determination. For example, the event detection engine 300 can determine that a vehicle captured in the images or videos 112 is exempt based on a color of the vehicle or the make and model of the vehicle.

Once the event detection engine 300 has made an initial determination that the vehicle 114 has committed a traffic violation, the localization and mapping engine 302 can determine the geolocation 120 of the vehicle 114 based in part on the present location of the perception device 102 obtained from at least one of the positioning unit 210 (see, e.g., FIG. 2A) of the perception device 102, inertial measurement data obtained from the IMUs 206 of the perception device 102, and wheel odometry data 216 obtained from the wheel odometer of the carrier vehicle 110 carrying the perception device 102.

In some embodiments, the localization and mapping engine 302 can use its own present location to estimate the geolocation 120 of the vehicle 114. In other embodiments, a distance calculation engine of the localization and mapping engine 302 can estimate the geolocation 120 of the vehicle 114 by calculating a distance separating the vehicle 114 from the perception device 102 and adding such a separation distance to its own present location. As a more specific example, the distance calculation engine can calculate the distance separating the vehicle 114 from the perception device 102 using video frames containing the license plate of the vehicle 114 and certain computer vision algorithms (e.g., image depth analysis algorithms) designed for distance calculation.

In additional embodiments, the localization and mapping engine 302 can determine the geolocation 120 of the vehicle 114 by recognizing an object or landmark (e.g., a bus stop sign) near the vehicle 114 with a known geolocation associated with the object or landmark.

The perception device 102 can also record or generate at least a plurality of timestamps 122 marking the time when the vehicle 114 was detected committing the traffic violation. For example, the localization and mapping engine 302 of the perception device 102 can mark the time using a global positioning system (GPS) timestamp, a Network Time Protocol (NTP) timestamp, a local timestamp based on a local clock running on the perception device 102, or a combination thereof. The perception device 102 can record the timestamps 122 from multiple sources to ensure that such timestamps 122 are synchronized with one another in order to maintain the accuracy of such timestamps 122.

In some embodiments, the mobile device 103 can also comprise a license plate recognition engine 316 running on the mobile device 103. The license plate recognition engine 316 can be configured to recognize the license plate number 126 of the vehicle 114 in the images or video frames. For example, the license plate recognition engine 316 can pass video frames or images captured by a camera 228 of the mobile device 102 (see FIG. 2B) to a license plate recognition (LPR) neural network 317 running on the mobile device 103.

The LPR neural network 317 can be specifically trained to recognize license plate numbers 126 from video frames or images. The video frames or images can show the license plate number 126 of the vehicle 114 from an overtaking angle or an incoming angle.

In some embodiments, the LPR neural network 317 can be an open-source neural network trained for license plate recognition. In certain embodiments, the LPR neural network 317 can be a version of the OpenALPR™ license plate recognition model or a modified version of the OpenALPR™ license plate recognition model.

By feeding video frames or images into the LPR neural network 317, the mobile device 103 can obtain as an output from the LPR neural network 317, a prediction concerning the license plate number 126 of the vehicle 114. The prediction can be in the form of an alphanumeric string representing the license plate number 126.

The mobile device 103 can compare the recognized license plate number 126 against at least a license plate whitelist 319 stored on the mobile device 103. The license plate whitelist 319 can be a digital repository of license plate numbers of vehicles that are allowed to be stopped, travel, or otherwise be in motion within the restricted area 116 such as public transportation vehicles and municipal or governmental vehicles.

The event detection engine 312 can make an initial determination that a vehicle captured in one of the images or videos 112 has committed a traffic violation by comparing the recognized license plate number 126 of the vehicle 114 against at least the license plate whitelist 319. The event detection engine 312 can also use the vehicle attributes 124 predicted by the object-detection neural network 315 as part of this initial determination. For example, the event detection engine 312 can determine that a vehicle captured in the images or videos 112 is exempt based on a color of the vehicle or the make and model of the vehicle.

Once the event detection engine 312 has made an initial determination that the vehicle 114 has committed a traffic violation, the localization and mapping engine 314 can determine the geolocation 120 of the vehicle 114 based in part on the present location of the mobile device 103 obtained from the positioning unit 230 (see, e.g., FIG. 2B) of the mobile device 103.

In some embodiments, the localization and mapping engine 314 can use its own present location to estimate the geolocation 120 of the vehicle 114. In other embodiments, a distance calculation engine of the localization and mapping engine 314 can estimate the geolocation 120 of the vehicle 114 by calculating a distance separating the vehicle 114 from the mobile device 103 and adding such a separation distance to its own present location. As a more specific example, the distance calculation engine can calculate the distance separating the vehicle 114 from the mobile device 103 using video frames containing the license plate of the vehicle 114 and certain computer vision algorithms (e.g., image depth analysis algorithms) designed for distance calculation.

In additional embodiments, the localization and mapping engine 314 can determine the geolocation 120 of the vehicle 114 by recognizing an object or landmark (e.g., a bus stop sign) near the vehicle 114 with a known geolocation associated with the object or landmark.

The mobile device 103 can also record or generate at least a plurality of timestamps 122 marking the time when the vehicle 114 was detected committing the traffic violation. For example, the localization and mapping engine 302 of the perception device 102 can mark the time using a global positioning system (GPS) timestamp, a local timestamp based on a local clock running on the perception device 102, or a combination thereof. The perception device 102 can record the timestamps 122 from multiple sources to ensure that such timestamps 122 are synchronized with one another in order to maintain the accuracy of such timestamps 122.

In some embodiments, the perception device 102 can also pass or feed video frames to a lane detection neural network 311 running on the perception device 102. For example, the event detection engine 300 of the perception device 102 can pass or feed video frames to the lane detection neural network 311 running on the perception device 102. By passing and feeding video frames to the lane detection neural network 311, the event detection engine 300 can detect one or more roadway lanes shown in the video frames. For example, the lane detection neural network 311 can bound the lanes shown in the video frames in polygons 714 (see FIG. 7B). The lane detection neural network 311 can also output image coordinates associated with the polygons 714 bounding such lanes.

As will be discussed in more detail in relation to FIGS. 7A and 7B, the object-detection neural network 303 can bound a vehicle detected within a video frame with a vehicle bounding box 700. The object-detection neural network 303 can also output image coordinates associated with the vehicle bounding box 700. The image coordinates associated with the vehicle bounding box 700 can be compared with the image coordinates associated with the polygons 714 to determine an amount of overlap between the vehicle bounding box 700 and at least one of the polygons 714. This can be used by the event detection engine 300 to determine if the vehicle 114 detected within the images or video frames is stopped or otherwise in motion in a particular lane shown in the video frames.

Lane detection is needed when the restricted area 116 includes one or more lanes of a roadway but not all lanes of the roadway. For example, FIG. 7B illustrates a scenario where the restricted area 116 includes one lane 710 of a roadway 712 but not all lanes of the roadway 712.

The event detection engine 300 can translate the image coordinates of the vehicle bounding box 700 and the image coordinates of the polygons 714 into a uniform coordinate domain or shared coordinate domain before comparing the image coordinates of the vehicle bounding box 700 to the image coordinates of the polygons 714.

In some embodiments, the lane detection neural network 311 can be an open-source neural network or convolutional neural network trained for lane detection. For example, the lane detection neural network 311 can be the Segnet deep neural network or a modified version of the Segnet deep neural network.

In certain embodiments, the lane detection neural network 311 can be trained using an open-source dataset designed specifically for lane detection. For example, the dataset can be the CULane dataset. In other embodiments, the lane detection neural network 311 can also be trained using video frames obtained from deployed perception devices 102. Moreover, the lane detection neural network 311 can also be trained to detect lane markings. For example, the lane markings can comprise lane lines, text markings, markings indicating a crosswalk, markings indicating turn lanes, dividing line markings, or a combination thereof. In these embodiments, the lane detection neural network 311 can be trained using an open-source dataset designed specifically for detecting lane markings. As a more specific example, the dataset can be the Apolloscape dataset.

As will be discussed in more detail in relation to FIG. 7B, when the restricted area 116 comprises one lane 710 of a roadway 712 (but not all lanes of the roadway 712), the perception device 102 can detect the lane 710 by feeding or passing video frames capturing the roadway 712 into the lane detection neural network 311. The localization and mapping engine 302 of the perception device 102 can also use its own present location to determine where it is relative to the lane 710. If the video frames capture the vehicle 114 stopped or driving in the lane 710, the event detection engine 300 can determine that the vehicle 114 is within the lane 710 designated as the restricted area 116 based on the amount of overlap between the vehicle bounding box 700 bounding the vehicle 114 and the polygon 714 bounding the lane 710.

In some embodiments, the perception device 102 can also generate certain metadata 118 associated with the images or videos 112 captured by the mobile device 103. For example, the metadata 118 can comprise data or information concerning the geolocation 120 of the vehicle 114, one or more timestamps 122 marking the time of the traffic violation, or a combination thereof.

If the perception device 102 determines that the vehicle 114 has committed a traffic violation by being stopped or in motion within the restricted area 116, the perception device 102 can generate an evidence package 111 to be transmitted to the server 106. The evidence package 111 can comprise coordinate data (e.g., latitude and longitude in decimal degrees) concerning the geolocation 120 of the vehicle 114, the various timestamps 122 marking the time of the traffic violation, the license plate number 126 of the vehicle 114 recognized by the perception device 102, the vehicle attributes 124 detected by the object-detection neural network 303, and at least a portion of the images or videos 112 captured by the perception device 102.

In certain embodiments, the mobile device 103 can also pass or feed video frames to a lane detection neural network 321 running on the mobile device 103. For example, the event detection engine 312 of the mobile device 103 can pass or feed video frames to the lane detection neural network 321 running on the mobile device 103. By passing and feeding video frames to the lane detection neural network 321, the event detection engine 312 can detect one or more roadway lanes shown in the video frames. For example, the lane detection neural network 321 can bound the lanes shown in the video frames in polygons 714 (see FIG. 7B). The lane detection neural network 321 can also output image coordinates associated with the polygons 714 bounding such lanes.

As will be discussed in more detail in relation to FIGS. 7A and 7B, the object-detection neural network 315 can bound a vehicle detected within a video frame with a vehicle bounding box 700. The object-detection neural network 315 can also output image coordinates associated with the vehicle bounding box 700. The image coordinates associated with the vehicle bounding box 700 can be compared with the image coordinates associated with the polygons 714 to determine an amount of overlap between the vehicle bounding box 700 and at least one of the polygons 714. This can be used by the event detection engine 312 to determine if the vehicle 114 detected within the images or video frames is stopped or otherwise in motion in a particular lane shown in the video frames.

Lane detection is needed when the restricted area 116 includes one or more lanes of a roadway but not all lanes of the roadway. For example, FIG. 7B illustrates a scenario where the restricted area 116 includes one lane 710 of a roadway 712 but not all lanes of the roadway 712.

The event detection engine 312 can translate the image coordinates of the vehicle bounding box 700 and the image coordinates of the polygons 714 into a uniform coordinate domain or shared coordinate domain before comparing the image coordinates of the vehicle bounding box 700 to the image coordinates of the polygons 714.

In some embodiments, the lane detection neural network 321 can be an open-source neural network or convolutional neural network trained for lane detection. For example, the lane detection neural network 321 can be the Segnet deep neural network or a modified version of the Segnet deep neural network.

In certain embodiments, the lane detection neural network 321 can be trained using an open-source dataset designed specifically for lane detection. For example, the dataset can be the CULane dataset. Moreover, the lane detection neural network 321 can also be trained to detect lane markings. For example, the lane markings can comprise lane lines, text markings, markings indicating a crosswalk, markings indicating turn lanes, dividing line markings, or a combination thereof. In these embodiments, the lane detection neural network 321 can be trained using an open-source dataset designed specifically for detecting lane markings. As a more specific example, the dataset can be the Apolloscape dataset.

As will be discussed in more detail in relation to FIG. 7B, when the restricted area 116 comprises one lane 710 of a roadway 712 (but not all lanes of the roadway 712), the mobile device 103 can detect the lane 710 by feeding or passing video frames capturing the roadway 712 into the lane detection neural network 321. The localization and mapping engine 314 of the mobile device 103 can also use its own present location to determine where it is relative to the lane 710. If the video frames capture the vehicle 114 stopped or driving in the lane 710, the event detection engine 312 can determine that the vehicle 114 is within the lane 710 designated as the restricted area 116 based on the amount of overlap between the vehicle bounding box 700 bounding the vehicle 114 and the polygon 714 bounding the lane 710.

In some embodiments, the mobile application 305 running on the mobile device 103 can automatically generate certain metadata 118 associated with the images or videos 112 captured by the mobile device 103. The metadata 118 can comprise data or information concerning the geolocation 120 of the vehicle 114, one or more timestamps 122 marking the time of the traffic violation, and a violation type 608 (see FIG. 6B). When the images or videos 112 are captured in real-time using the mobile application 305, the mobile device 103 can generate the metadata 118 once the images or videos 112 have been captured. When previously captured images or videos 112 are uploaded through the mobile application 305, the mobile device 103 can generate the metadata 118 once the images or videos 112 have been uploaded.

If the mobile device 103 determines that the vehicle 114 has committed a traffic violation by being stopped or in motion within the restricted area 116, the mobile device 103 can generate an evidence package 111 to be transmitted to the server 106. The evidence package 111 can comprise coordinate data (e.g., latitude and longitude in decimal degrees) concerning the geolocation 120 of the vehicle 114, the various timestamps 122, the license plate number 126 recognized by the LPR neural network 307, the vehicle attributes 124 detected by the object-detection neural network 315, and at least a portion of the one or more images or videos 112 captured by the mobile device 103.

The mobile device 103 can further comprise a package digest generation engine 318, and certain chaincode 320 running on the mobile device 103 for implementing or maintaining the distributed ledger 105. Moreover, the perception device 102 can also comprise a package digest generation engine 306 and certain chaincode 308 running on the perception device 102 for implementing or maintaining the distributed ledger 105.

The package digest generation engine on the first node 101A (e.g., the package digest generation engine 306 or the package digest engine 318) can be configured to generate the first package digest 128A of the digital evidence package 111 using the hash function 130 (see FIG. 1B). As previously discussed, in some embodiments, the contents of the digital evidence package 111 can first be encrypted before the hash function 130 is used to generate the first package digest 128A. In other embodiments, the first package digest 128A can be generated using the raw or unencrypted contents of the digital evidence package 111.

The hash function 130 can be a non-reversible or one-way cryptographic hashing function. For example, the hash function 130 can be the MD6 hash function or a hashing function from one of the SHA-2 family of functions such as the SHA-256 hash function.

As previously discussed, the first node 101A (e.g., the perception device 102 or the mobile device 103) can call an insert API 134 to insert or add the first package digest 128A as a ledger entry 132 in the distributed ledger 105 on the blockchain network 104 (see FIG. 1B).

The insert API 134 can be used to execute certain application code or invoke chaincode (e.g., chaincode 308 or chaincode 320) for interacting with the distributed ledger 105. The chaincode can also be referred to as smart contract code.

The chaincode (e.g., chaincode 308 or chaincode 320) can be the software code that governs how package digests are inserted, validated, or updated by the nodes 101 of the blockchain network 104. As a more specific example, the chaincode (e.g., chaincode 308 or chaincode 320) can be chaincode of the Hyperledger Fabric blockchain framework.

For example, the first node 101A (e.g., the perception device 102 or the mobile device 103) can call the insert API 134 to cause each node 101 of the blockchain network 104 to insert, add, or log the first package digest 128 as a ledger entry 132 in its own instance of the distributed ledger 105. As a more specific example, each node 101 of the blockchain network 104 can execute its own chaincode to insert or add the first package digest 128 as a ledger entry 132 in its own instance of the distributed ledger 105.

In some embodiments, a new distributed ledger 105 is created each time a digital evidence package 111 is generated. In these embodiments, the first package digest 128A can serve as the first or initial ledger entry 132 of the distributed ledger 105 or the first block of the blockchain.

As shown in FIG. 3A, the first node 101A (e.g., the perception device 102 or the mobile device 103) can transmit the digital evidence package 111 to the second node 101B (e.g., the server 106). The first node 101A can transmit the digital evidence package 111 to the second node 101B after or around the same time that the first package digest 128A is added as a ledger entry 132 to the distributed ledger 105.

FIG. 3A also illustrates that the second node 101B (e.g., the server 106) can comprise a post-processing engine 322, a map module 324, a package digest generation engine 326, and certain chaincode 328 for running, implementing, or maintaining the distributed ledger 105. As previously discussed, the second node 101B (e.g., the server 106) can receive a digital evidence package 111 from the first node 101A (e.g., the perception device 102 or the mobile device 103).

The second node 101B can validate the digital evidence package 111 received from the first node 101A by using the package digest generation engine 326 to generate an unverified instance of a first package digest based on the digital evidence package 111. For example, the package digest generation engine 326 can apply the same hash function 130 used by the first node 101A to the digital evidence package 111 received from the first node 101A to generate the unverified instance of the first package digest.

The second node 101B can then call the validate API 136 to compare the unverified instance of the first package digest against the first package digest 128A stored as part of the distributed ledger 105 (see FIG. 1B). For example, the second node 101B can call the validate API 136 to cause each node 101 of the blockchain network 104 to compare the unverified instance of the first package digest generated by the second node 101B against the first package digest 128A stored as part of its own instance of the distributed ledger 105. By calling the validate API 136, the second node 101B can execute certain application code or invoke the chaincode 328. The chaincode 328 can be smart contract code for interacting with the other nodes 101 of the blockchain network 104 concerning updates to the distributed ledger 105 or assets stored as part of the distributed ledger 105.

If the unverified instance of the first package digest generated by the second node 101B matches the first package digest 128A stored as part of the distributed ledger 105, then the digital evidence package 111 received from the first node 101A is validated. At this point, the post-processing engine 322 of the second node 101B (e.g., the server 106) can post-process or otherwise modify certain of the contents of the digital evidence package 111 received from the first node 101A.

The post-processing engine 322 can conduct post-processing on the images or videos 112 contained within the digital evidence package 111. For example, the second node 101B (e.g., the server 106) can call a plurality of functions from a computer vision library 330 to read or otherwise obtain video frames from the videos 112. The second node 101B can also conduct post-processing on images or video frames by resizing, cropping, and/or rotating the video frames or images from the digital evidence package 111 to enhance the images or video frames. In some embodiments, the computer vision library 330 can be the OpenCV® library maintained and operated by the Open Source Vision Foundation. In other embodiments, the computer vision library 330 can be or comprise functions from the TensorFlow® software library, the SimpleCV® library, or a combination thereof.

The post-processing engine 322 can also combine multiple images into one composite image or multiple videos into one compilation video. For example, the post-processing engine 322 can stitch a plurality of shorter videos from the digital evidence package 111 into one longer video.

The post-processing engine 322 can also overlay critical information 716 (see FIGS. 7A-7B) concerning the traffic violation on one or more images or video frames. For example, the critical information 716 can comprise the geolocation 120 of the vehicle 114 and one or more timestamps 122 used to mark the time of the traffic violation.

In some embodiments, the post-processing engine 322 can also pass or feed images or video frames to an object-detection neural network 332 running on the server 106. By passing and feeding images or video frames to the object-detection neural network 332, the post-processing engine 322 of the server 106 can obtain as outputs from the object-detection neural network 332 predictions concerning the objects shown in the images or video frames. For example, the post-processing engine 322 can obtain, as outputs, an object class and a confidence score for the object detected.

As shown in FIG. 3A, the server 106 can also comprise a license plate recognition engine 334. The license plate recognition engine 334 can be configured to recognize hard to recognize license plate numbers from the images or video frames. For example, the license plate recognition engine 334 running on the server 106 can be configured to recognize license plate numbers from images or video frames where the license plates shown in such images or video frames are too distorted or unclear to be recognized by the license plate recognition engines (e.g., the license plate recognition engine 304 or the license plate recognition engine 316) running on the first node 101A.

The license plate recognition engine 334 can pass video frames or images captured by the first node 101A to a license plate recognition (LPR) neural network 336 running on the server 106. In some embodiments, the LPR neural network 336 can be an open-source neural network trained for license plate recognition. In certain embodiments, the LPR neural network 336 can be a version of the OpenALPR™ license plate recognition model or a modified version of the OpenALPR™ license plate recognition model.

The license plate recognition engine 334 can compare the recognized license plate number 126 against at least a license plate whitelist 338 stored on the server 106. The license plate whitelist 338 can be a digital repository of license plate numbers of vehicles that are allowed to travel, be stopped, otherwise be in motion within the restricted area 116 such as public transportation vehicles and municipal or governmental vehicles.

In some embodiments, a privacy module 340 of the post-processing engine 322 can apply an obfuscating filter 708 (see FIG. 7A) or a blurring filter of a preconfigured filter level to objects automatically detected in the one or more images or videos 112 that are not the vehicle 114. This can be done to protect the privacy of other vehicles or pedestrians captured in the images or videos 112.

In some embodiments, the second node 101B (e.g., the server 106) can also comprise a map module 324. The map module 324 can comprise a geometric map layer and a semantic map layer comprising a number of semantic annotated maps 342. The semantic map layer can be built on top of the geometric map layer.

The geometric map layer can comprise a plurality of geometric maps. The geometric maps can be georeferenced maps obtained from one or more mapping databases or mapping services. For example, the geometric maps can be obtained from a web mapping server along with data from a geographic information system (GIS) database. For example, the geometric map layer can comprise geometric maps obtained from an open-source mapping database or server or a proprietary mapping service. For example, the geometric maps can comprise one or more maps provided by Google Maps™, Esri™ ArcGIS maps, or a combination thereof. The geometric maps can also be obtained from one or more government mapping databases or government GIS maps. The geometric maps of the geometric map layer can comprise a plurality of high-definition (HD) maps, traditional standard-definition maps, or a combination thereof.

The semantic map layer can be built on top of the geometric map layer. The semantic map layer can add semantic objects to the geometric maps to create a number of semantic annotated maps 342 stored as part of the semantic map layer. The semantic objects, in this context, can refer to 2D and 3D objects such as curbs, intersections, sidewalks, lane markings or boundaries, traffic signs, traffic lights, and other curbside municipal assets (e.g., fire hydrants, parking meters, etc.) with semantic labels associated therewith.

In some embodiments, the map module 324 can receive the semantic objects or labels from the perception devices 102. For example, the map module 324 can receive the semantic objects or labels from at least one of the event detection engine 300 and the localization mapping engine 302 of the perception devices 102. The event detection engine 300 can apply one or more semantic segmentation functions from the computer vision library 301 to automatically annotate video images captured by the perception device 102 at a pixel-level with semantic labels.

The semantic map layer can also take into account sensor data obtained from the sensors of the perception devices 102 including video images, GPS coordinates, and IMU data. In this manner, the semantic annotated maps 342 of the semantic map layer can be accurate to within a few centimeters rather than a few meters.

The semantic annotated maps 342 can be updated periodically or continuously as the map module 324 receives new mapping data, positioning data, and/or semantic labels from the various perception devices 102. The server 106 can also transmit or deploy new semantic maps or transmit semantic map updates 344 to the first nodes 101A. For example, the server 106 can transmit or deploy new semantic maps or transmit semantic map updates 344 periodically or when a revision has been made to any of the existing semantic annotated maps 342. The new semantic maps or the semantic map updates 344 can be used by the first node 101A (e.g., the perception device 102 or the mobile device 103) to more accurately localize itself and/or to identify restricted areas 116 (e.g., bus lanes, bike lanes, etc.) to ensure accurate detection. Ensuring that the first nodes 101A have access to updated semantic annotated maps is important for determining the geolocation 120 of the vehicle 114 and reduces the likelihood of false-positive detections.

As previously discussed, when the contents of the digital evidence package 111 received from the first node 101A have been modified by the second node 101B (for example, by conducting post-processing on the images or video frames within the digital evidence package 111), the resulting evidence package can be considered a modified digital evidence package 138 (represented in FIG. 3A as "EP+").

The package digest generation engine 326 of the second node 101B can then generate a second package digest 128B of the modified digital evidence package 138 using the same hash function 130 (see FIG. 1B). The second node 101B can update the distributed ledger 105 to add the second package digest 128B as another ledger entry 132 in the distributed ledger 105. For example, the second node 101B can call an update API 140 to cause each node 101 to insert, add, or log the second package digest 128B as a ledger entry 132 in its own instance of the distributed ledger 105 (see FIG. 1B). By calling the update API 140, the second node 101B can execute certain application code or invoke the chaincode 328 to update the distributed ledger 105.

In certain embodiments, an ordering node (not shown) in the blockchain network 104 can facilitate the synchronization and update of the distributed ledgers 105 among the various peer nodes 101.

As shown in FIG. 3A, the second node 101B can then transmit the modified digital evidence package 138 to the third node 101C. The second node 101B can transmit the modified digital evidence package 138 to the third node 101C after or around the same time that the second package digest 128B is added as a ledger entry 132 to the distributed ledger 105.

The modified digital evidence package 138 can be transmitted over one or more secure network channels or secure connections. As will be discussed in more detail in relation to FIG. 3B, the modified digital evidence package 138 can be encrypted using a symmetric encryption algorithm such as AES-256 prior to transmission.

The third node 101C (e.g., the server 107) can be configured or otherwise used to review the processed/post-processed evidence received from the second node 101B. For example, the server 107 can be a server of a governmental agency (e.g., a department of motor vehicles or a department of transportation) responsible for reviewing and making decisions on traffic violations. In other embodiments, the server 107 can be a server of a third-party entity (e.g., a violation processor) hired by a governmental agency to review and make decisions on traffic violations.

For example, a violation reviewer such as an employee of the governmental agency or law enforcement personnel can interface with the server 107 via an online dashboard or web portal to approve or reject the traffic violation based on the evidence included as part of the modified digital evidence package 138. The violation reviewer can then add a review decision to the modified digital evidence package 138. In addition, the violation reviewer can also add certain data or information from a Department of Motor Vehicles database concerning the registered owner of the vehicle 114 to the modified digital evidence package 138. Moreover, the violation reviewer can cause a flag to be added to the modified digital evidence package 138 to indicate that the violation reviewer has validated certain vehicle registration information concerning the vehicle 114 captured in the images or videos 112.

The third node 101C (e.g., the server 107) can comprise a package digest generation engine 346 and certain chaincode 348 or application code. The package digest generation engine 346 of the third node 101C can validate the modified digital evidence package 138 received from the second node 101B based on the second package digest 128B stored as part of the distributed ledger 105. For example, the package digest generation engine 346 can validate the modified digital evidence package 138 by applying the same hash function 130 used by the first node 101A and the second node 101B to the modified digital evidence package 138 received from the second node 101B to generate an unverified instance of the second package digest.

The third node 101C can then call the validate API 136 to compare the unverified instance of the second package digest against the second package digest 128B stored as part of the distributed ledger 105 (see FIG. 1B). For example, the third node 101C can call the validate API 136 to cause each node 101 to compare the unverified instance of the second package digest generated by the third node 101C against the second package digest 128B stored as part of its own instance of the distributed ledger 105. By calling the validate API 136, the third node 101C (e.g., the server 107) can execute certain application code or invoke the chaincode 348 to validate the modified digital evidence package 138.

If the unverified instance of the second package digest generated by the third node 101C matches the second package digest 128B stored as part of the distributed ledger 105, then the modified digital evidence package 138 received from the second node 101B is validated. At this point, the third node 101C (e.g., the server 107) can review and modify the contents of the modified digital evidence package 138 to yield a reviewed digital evidence package 142.

When the violation reviewer has finished reviewing the contents of the modified digital evidence package 138 and has added additional data or information to the modified digital evidence package 138, the resulting evidence package can be considered a reviewed digital evidence package 142 (represented in FIG. 1B as "EP #").

The package digest generation engine 346 of the third node 101C can then generate a third package digest 128C of the reviewed digital evidence package 142 using the same hash function 130 (see FIG. 1B). For example, the third package digest 128C can be a 128-bit digest, a 224-bit digest, a 256-bit digest, a 384-bit digest, or a 512-bit digest.

The package digest generation engine 346 of the third node 101C can update the distributed ledger 105 to add the third package digest 128C as another ledger entry 132 in the distributed ledger 105. For example, the third node 101C can call the update API 140 to cause each node 101 to insert, add, or log the third package digest 128C as a ledger entry 132 in its own instance of the distributed ledger 105. By calling the update API 140, the third node 101C can execute certain application code or invoke the chaincode 348 to update the distributed ledger 105.

In certain embodiments, an ordering node (not shown) in the blockchain network 104 can facilitate the synchronization and update of the distributed ledgers 105 among the various peer nodes 101.

In some embodiments, at least one of the nodes 101 (for example, the third node 101C or the second node 101B) can determine that a traffic violation has not occurred based on a review of the digital evidence package 111 or the modified digital evidence package 138. Moreover, a municipality or government department may be required to delete certain evidence related to traffic violations after a set period of time. In these cases, the node 101 (e.g., the third node 101C or the second node 101B) can generate a package delete digest to mark as removed or to document a deletion of any digital evidence packages generated in connection with the traffic violation (e.g., the digital evidence package 111 and/or the modified digital evidence package 138). The node 101 (e.g., the third node 101C or the second node 101B) can also call certain APIs (for example, a delete API) to invoke chaincode (e.g., the chaincode 328 or the chaincode 348) to add the delete digest as another entry in the distributed ledger 105.

The distributed ledger 105 can be terminated or concluded after receiving the package delete digest or adding the package delete digest as a ledger entry 132. For example, each node 101 of the blockchain network 104 can be instructed to add the package delete digest as a final ledger entry to an instance of the distributed ledger 105 running on the node 101.

In some embodiments, all nodes 101 of the blockchain network 104 can also be instructed to delete the contents of the digital evidence packages 111 or modified digital evidence packages 138 stored as part of their own instances of the distributed ledger 105 and their own local memories or local storage units. However, in these embodiments, the distributed ledgers 105 comprising the package digests 128 would not be deleted and the distributed ledgers 105 can be kept as a transaction record of how the digital evidence packages were handled by the various nodes 101.

As shown in FIG. 3A, the third node 101C can then transmit the reviewed digital evidence package 142 to a web server 108 configured to present certain contents from the reviewed digital evidence package 142 to an infractor via a review website 109 (see FIG. 1B). The third node 101C can transmit the reviewed digital evidence package 138 to the web server 108 after or around the same time that the third package digest 128C is added as a ledger entry 132 to the distributed ledger 105.

The reviewed digital evidence package 142 can be transmitted over one or more secure network channels or secure connections. As will be discussed in more detail in relation to FIG. 3B, the reviewed digital evidence package 142 can be encrypted using a symmetric encryption algorithm such as AES-256 prior to transmission.

The web server 108 can only allow the infractor (e.g., the registered owner of the vehicle 114) to view evidence of the traffic violation if the web server 108 determines that the reviewed digital evidence package 142 received from the third node 101C is valid. For example, the web server 108 can validate the reviewed digital evidence package 142 received from the third node 101C based on the third package digest 128C stored as part of the distributed ledger 105.

The web server 108 can comprise a package digest generation engine 350 and certain chaincode 352 for interacting with the distributed ledger 105 to validate the reviewed digital evidence package 142.

The package digest generation engine 350 of the web server 108 can validate the reviewed digital evidence package 142 by applying the same hash function 130 used by the first node 101A, the second node 101B, and the third node 101C to the reviewed digital evidence package 142 received from the third node 101C to generate an unverified instance of the third package digest. The package digest generation engine 350 of the web server 108 can then call the validate API 136 to compare the unverified instance of the third package digest against the third package digest 128C stored as part of the distributed ledger 105.

For example, the web server 108 can call the validate API 136 to cause each node 101 to compare the unverified instance of the third package digest generated by the web server 108 against the third package digest 128C stored as part of its own instance of the distributed ledger 105. By calling the validate API 136, the web server 108 can execute certain application code or invoke the chaincode 352 to validate the reviewed digital evidence package 142.

If the unverified instance of the third package digest generated by the web server 108 matches the third package digest 128C stored as part of the distributed ledger 105, then the reviewed digital evidence package 142 received from the third node 101C is validated. At this point, the web server 108 can present certain contents from the reviewed digital evidence package 142 such as at least some of the images or clips of the videos captured by the first node 101A to the infractor via the review website 109.

The web server 108 is configured to only allow the infractor to review the contents of the reviewed digital evidence package 142 if the reviewed digital evidence package 142 received from the third node 101C is validated based on the third package digest 128C included as part of the distributed ledger 105. If the unverified instance of the third package digest generated by the web server 108 does not match the third package digest 128C stored as part of the distributed ledger 105, the reviewed digital evidence package 142 received from the third node 101C is considered invalid and the contents of the reviewed digital evidence package 142 are not shown to the infractor.

Although FIG. 3A illustrates the various modules, engines, and libraries as being separate blocks or structures it is contemplated by this disclosure and it should be understood by one of ordinary skill in the art that any of the modules, engines, or libraries can be merged into one another or separated into further smaller modules, engines, or libraries.

Figure 3B:
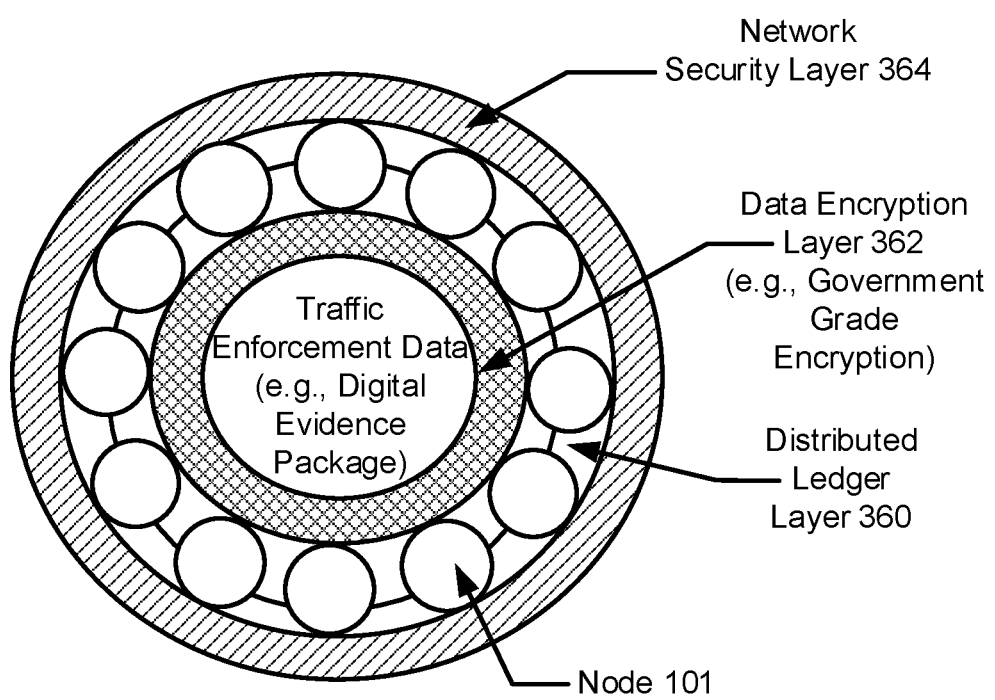
FIG. 3B illustrates that the distributed ledger layer can exist in between a traditional data encryption layer and a network security layer.

FIG. 3B illustrates that a distributed ledger layer 360 of the system 100, also referred to as a distributed data chain layer, can exist in an intermediate layer in between a data encryption layer 362 and a network security layer 364 or network security stack. In some embodiments, the digital evidence packages 111 or the contents of the digital evidence packages 111 can be encrypted using a government-grade encryption algorithm in a data encryption layer 362. For example, the data encryption layer 362 can use a symmetric encryption algorithm such as the Advanced Encryption Standard (AES) with 256-bit keys (also referred to as AES-256). In these and other embodiments, the data encryption layer 362 can also use an asymmetric encryption algorithm such as the Rivest-Shamir-Adleman (RSA) encryption algorithm using 2048-bit private keys (also referred to as RSA-2048 encryption). More specifically, the data encryption layer 362 can use RSA-2048 encryption to encrypt certain passphrases or passwords.

In certain embodiments, the network security layer 364 can comprise one or more cryptographic protocols for encrypting and securing communications between nodes 101 of the system 100. For example, the network security layer 364 can comprise the Secure Sockets Layer (SSL) protocol, the Transport Layer Security (TLS) protocol, the Secure Shell Protocol (SSH), the Internet Protocol Security (IPsec) suite of protocols, a virtual private network (VPN) protocol, or a combination thereof.

The objective of the distributed ledger layer 360 can be to secure or protect the authenticity or integrity of transactions involving the traffic enforcement data (e.g., the digital evidence packages 111). For example, any authorized access, modification, and eventual removal of the digital evidence package 111 is logged and validated by all nodes 101 of the system 100.

Figure 4:
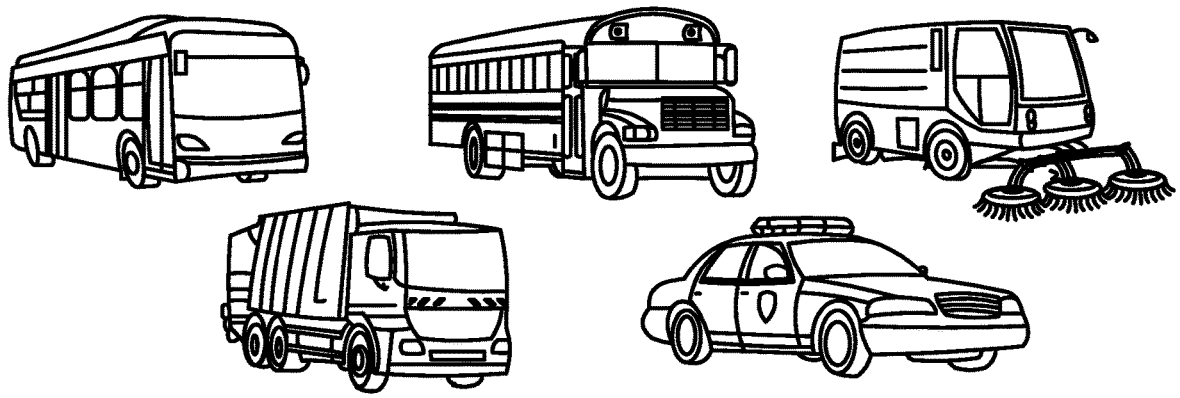
FIG. 4 illustrates different examples of carrier vehicles that can be used to carry the perception device.
Figure 4:
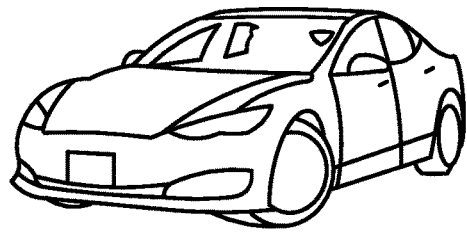
Figure 4:
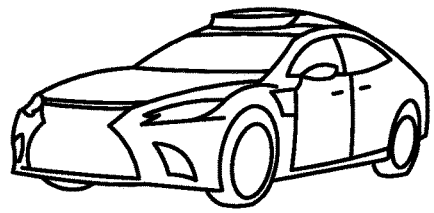

FIG. 4 illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

As will be discussed in more detail in the following sections, the perception device 102 can be detachably or removably coupled to the carrier vehicle 110. For example, the perception device 102 can comprise an attachment arm 502 (see FIGS. 5A, 5B, 5D, and 5E) for securing or otherwise coupling the perception device 102 to a window or dashboard of the carrier vehicle 110. As a more specific example, the perception device 102 can be coupled to a front windshield, a rear windshield, a side window, a front dashboard, or a rear deck or dashboard of the carrier vehicle 110.

In some embodiments, the perception device 102 can be coupled to an exterior surface or side of the carrier vehicle 110 such as a front, lateral, or rear exterior surface or side of the carrier vehicle 110. In additional embodiments, the perception device 102 can be coupled to a component or arm extending from the carrier vehicle 110. For example, the perception device 102 can be coupled to a stop arm (i.e., an arm carrying a stop sign) of a school bus.

As previously discussed, the system 100 can comprise perception devices 102 installed in or otherwise coupled to carrier vehicles 110 deployed within a geographic area or municipality. For example, a perception device 102 can be coupled to a front windshield or dash/deck of a bus driving around a city on its daily bus route. Also, for example, a perception device 102 can be coupled to a front windshield or dash/deck of a street sweeper on its daily sweeping route or a garbage/recycling truck on its daily collection route.

It is also contemplated by this disclosure that the perception device 102 can be carried by or otherwise coupled to a micro-mobility vehicle (e.g., an electric scooter). In other embodiments contemplated by this disclosure, the perception device 102 can be carried by or otherwise coupled to a UAV or drone.

Figure 5A:
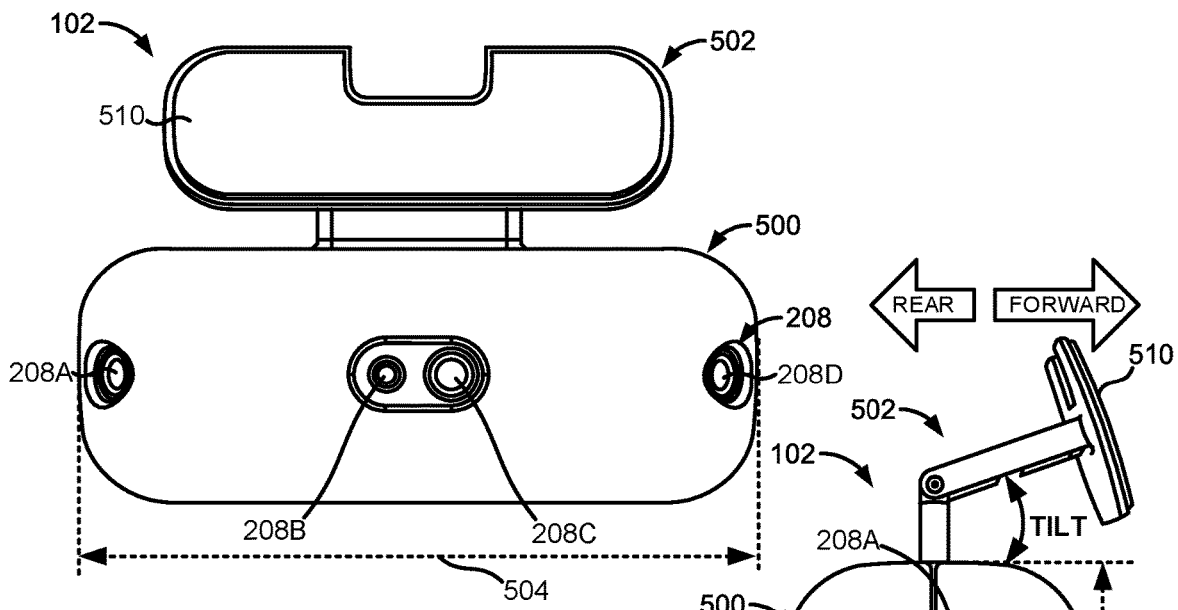
FIG. 5A illustrates a front view of one embodiment of the perception device.
Figure 5B:
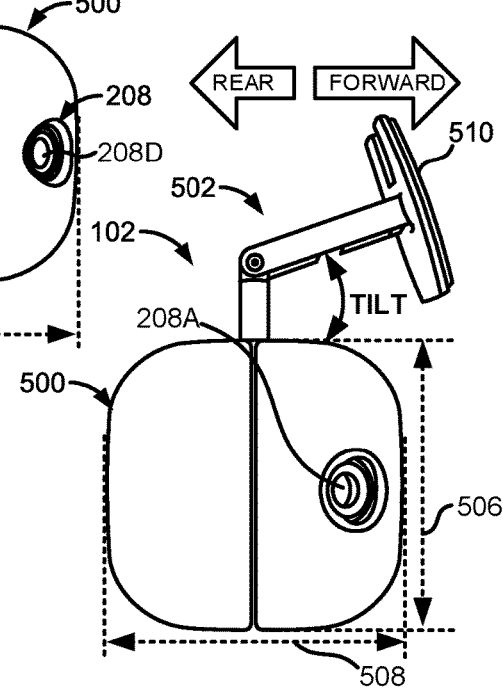
FIG. 5B illustrates a right-side view of the embodiment of the perception device shown in FIG. 5A.

FIGS. 5A and 5B illustrate front and right side views, respectively, of one embodiment of the perception device 102. The perception device 102 can comprise a device housing 500 and an attachment arm 502.

The device housing 500 can be substantially shaped as an elongate cuboid having rounded corners and edges. In other embodiments, the device housing 500 can be substantially shaped as a rectangular box, an ovoid, a truncated pyramid, a sphere, or any combination thereof.

In some embodiments, the device housing 500 can be made in part of a polymeric material, a metallic material, or a combination thereof. For example, the device housing 500 can be made in part of a rigid polymeric material such as polycarbonate, acrylonitrile butadiene styrene (ABS), or a combination thereof. The device housing 500 can also be made in a part of an aluminum alloy, stainless steel, titanium, or a combination thereof. In some embodiments, at least portions of the device housing 500 can be made of glass (e.g., the parts covering the image sensor lenses).

As shown in FIGS. 5A and 5B, when the device housing 500 is implemented as an elongate cuboid, the device housing 500 can have a housing length 504, a housing height 506, and a housing depth 508. In some embodiments, the housing length 504 can be between about 150 mm and about 250 mm. For example, the housing length 504 can be about 200 mm. The housing height 506 can be between about 50 mm and 100 mm. For example, the housing height 506 can be about 75 mm. The housing depth 508 can be between about 50 mm and 100 mm. For example, the housing depth 508 can be about 75 mm.

In some embodiments, the attachment arm 502 can extend from a top of the device housing 500. In other embodiments, the attachment arm 502 can also extend from a bottom of the device housing 500. As shown in FIG. 5B, at least one of the linkages of the attachment arm 502 can rotate with respect to one or more of the other linkage(s) of the attachment arm 502 to tilt the device housing 500. The device housing 500 can be tilted to allow a driver of the carrier vehicle 110 or an installer of the perception device 102 to obtain better camera angles or account for a slant or angle of the vehicle's windshield.

The attachment arm 502 can comprise a high bonding adhesive 510 at a terminal end of the attachment arm 502 to allow the attachment arm 502 to be adhered to a windshield (e.g., a front windshield or a rear windshield), window, or dashboard of the carrier vehicle 110. In some embodiments, the high bonding adhesive 510 can be a very high bonding (VHB) adhesive layer or tape, an ultra-high bonding (UHB) adhesive layer or tape, or a combination thereof. As shown in FIGS. 5B and 5E, in one example embodiment, the attachment arm 502 can be configured such that the adhesive 510 faces forward or in a forward direction above the device housing 500. In other embodiments not shown in the figures but contemplated by this disclosure, the adhesive 510 can face downward below the device housing 500 to allow the attachment arm 502 to be secured to a dashboard or deck of the carrier vehicle 110.

In other embodiments contemplated by this disclosure but not shown in the figures, the attachment arm 502 can be detachably or removably coupled to a windshield, window, or dashboard of the carrier vehicle 110 via a suction mechanism (e.g., one or more releasable high-strength suction cups), a magnetic connector, or a combination thereof with or without adhesives. In additional embodiments, the device housing 500 can be fastened or otherwise coupled to an exterior surface or interior surface of the carrier vehicle 110 via screws or other fasteners, clips, nuts and bolts, adhesives, suction cups, magnetic connectors, or a combination thereof.

In further embodiments contemplated by this disclosure but not shown in the figures, the attachment arm 502 can be detachably or removably coupled to a micro-mobility vehicle or a UAV or drone. For example, the attachment arm 502 can be detachably or removably coupled to a handrail/handlebar of an electric scooter. Also, for example, the attachment arm 502 can be detachably or removably coupled to a mount or body of a drone or UAV.

FIGS. 5A–5D illustrate that the device housing 500 can house or contain all of the electronic components (see, e.g., FIG. 2A) of the perception device 102 including the plurality of video image sensors 208. For example, the video image sensors 208 can comprise a first video image sensor 208A, a second video image sensor 208B, a third video image sensor 208C, and a fourth video image sensor 208D.

As shown in FIG. 5A, one or more of the video image sensors 208 can be angled outward or oriented in one or more peripheral directions relative to the other video image sensors 208 facing forward. The perception device 102 can be positioned such that the forward facing video image sensors (e.g., the second video image sensor 208B and the third video image sensor 208C) are oriented in a direction of forward travel of the carrier vehicle 110. In these embodiments, the angled video image sensors (e.g., the first video image sensor 208A and the fourth video image sensor 208D) can be oriented such that the environment surrounding the carrier vehicle 110 or to the periphery of the carrier vehicle 110 can be captured by the angled video image sensors. The first video image sensor 208A and the fourth video image sensor 208D can be angled with respect to the second video image sensor 208B and the third video image sensor 208C.

In the example embodiment shown in FIG. 5A, the device housing 500 can be configured such that the camera or sensor lenses of the forward-facing image video sensors (e.g., the second video image sensor 208B and the third video image sensor 208C) are exposed along the length or long side of the device housing 500 and each of the angled video image sensors (e.g., the first video image sensor 208A and the fourth video image sensor 208D) is exposed along an edge or side of the device housing 500.

When in operation, the forward-facing video image sensors can capture videos of the environment (e.g., the roadway, other vehicles, buildings, or other landmarks) mostly in front of the carrier vehicle 110 and the angled video image sensors can capture videos of the environment mostly to the sides of the carrier vehicle 110. As a more specific example, the angled video image sensors can capture videos of adjacent lane(s), vehicle(s) in the adjacent lane(s), a sidewalk environment including people or objects (e.g., fire hydrants or other municipal assets) on the sidewalk, and buildings facades.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 MP). The LPR camera can also capture video at a frame rate of between 1 frame per second and 120 FPS. In some embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light HDR image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors distributed by Sony Semiconductor Solutions Corporation.

Figure 5C:
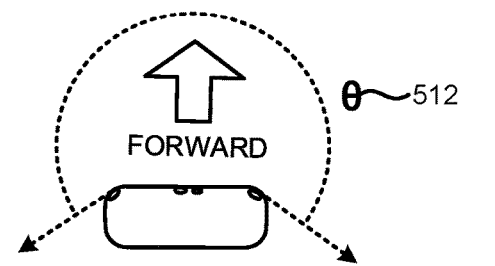
FIG. 5C illustrates a combined field of view of cameras housed within the embodiment of the perception device shown in FIG. 5A.

FIG. 5C illustrates that the video image sensors 208 housed within the embodiment of the perception device 102 shown in FIG. 5A can have a combined field of view 512 of greater than 180 degrees. For example, the combined field of view 512 can be about 240 degrees. In other embodiments, the combined field of view 512 can be between 180 degrees and 240 degrees.

Figure 5D:
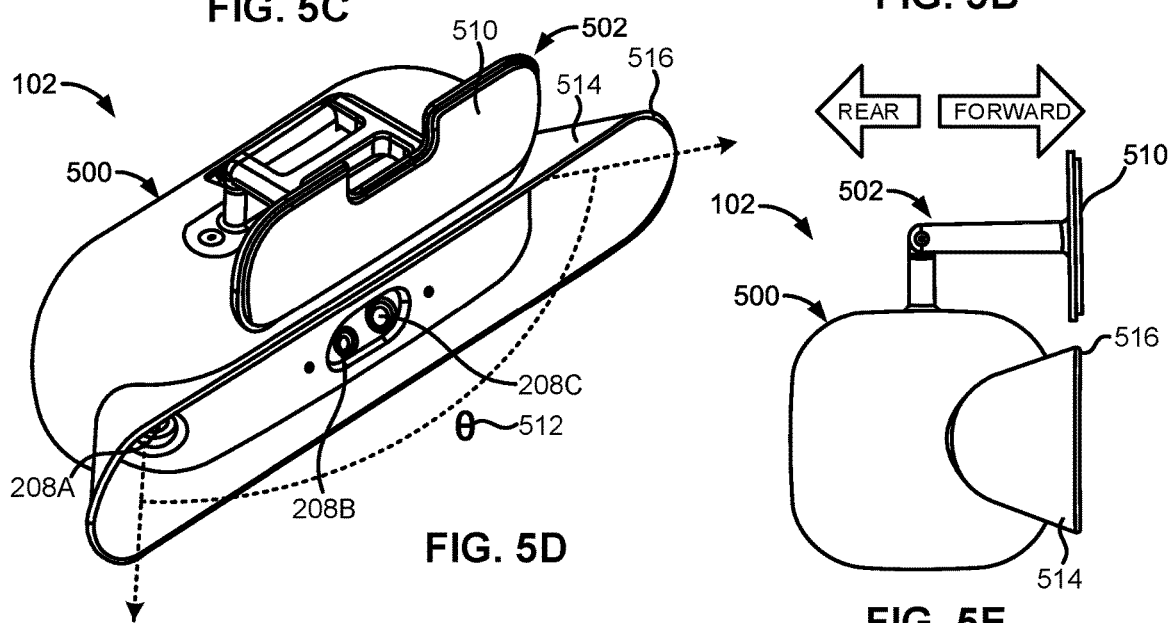
FIG. 5D illustrates a perspective view of another embodiment of the perception device having a camera skirt.
Figure 5E:
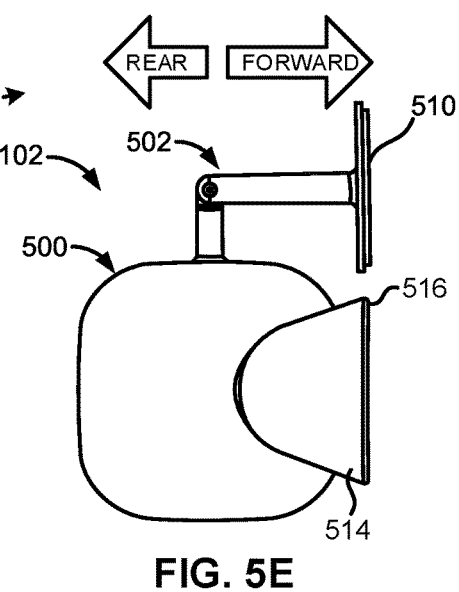
FIG. 5E illustrates a right-side view of the embodiment of the perception device shown in FIG. 5D.

FIGS. 5D and 5E illustrate perspective and right side views, respectively, of another embodiment of the perception device 102 having a camera skirt 514. The camera skirt 514 can block or filter out light emanating from an interior of the carrier vehicle 110 to prevent the lights from interfering with the video image sensors 208. For example, when the carrier vehicle 110 is a municipal bus, the interior of the municipal bus can be lit by artificial lights (e.g., fluorescent lights, LED lights, etc.) to ensure passenger safety. The camera skirt 514 can block or filter out such excess light to prevent the excess light from degrading the video footage captured by the video image sensors 208.

As shown in FIG. 5D, the camera skirt 514 can comprise a tapered or narrowed end and a wide flared end. The tapered end of the camera skirt 514 can be coupled to a front portion of the device housing 500. The camera skirt 514 can also comprise a skirt distal edge 516 defining the wide flared end. The skirt distal edge 516 can be configured to contact or press against one portion of the windshield or window of the carrier vehicle 110 when the perception device 102 is adhered or otherwise coupled to another portion of the windshield or window via the attachment arm 502.

As shown in FIG. 5D, the skirt distal edge 516 can be substantially elliptical-shaped or stadium-shaped. In other embodiments, the skirt distal edge 516 can be substantially shaped as a rectangle or oval. For example, at least part of the camera skirt 514 can be substantially shaped as a flattened frustoconic or a trapezoidal prism having rounded corners and edges.

FIG. 5D also illustrates that the combined field of view 512 of the video image sensors 208 housed within the embodiment of the perception device 102 shown in FIG. 5D can be less than 180 degrees. For example, the combined field of view 512 can be about 120 degrees or between about 90 degrees and 120 degrees.

Figure 6A:
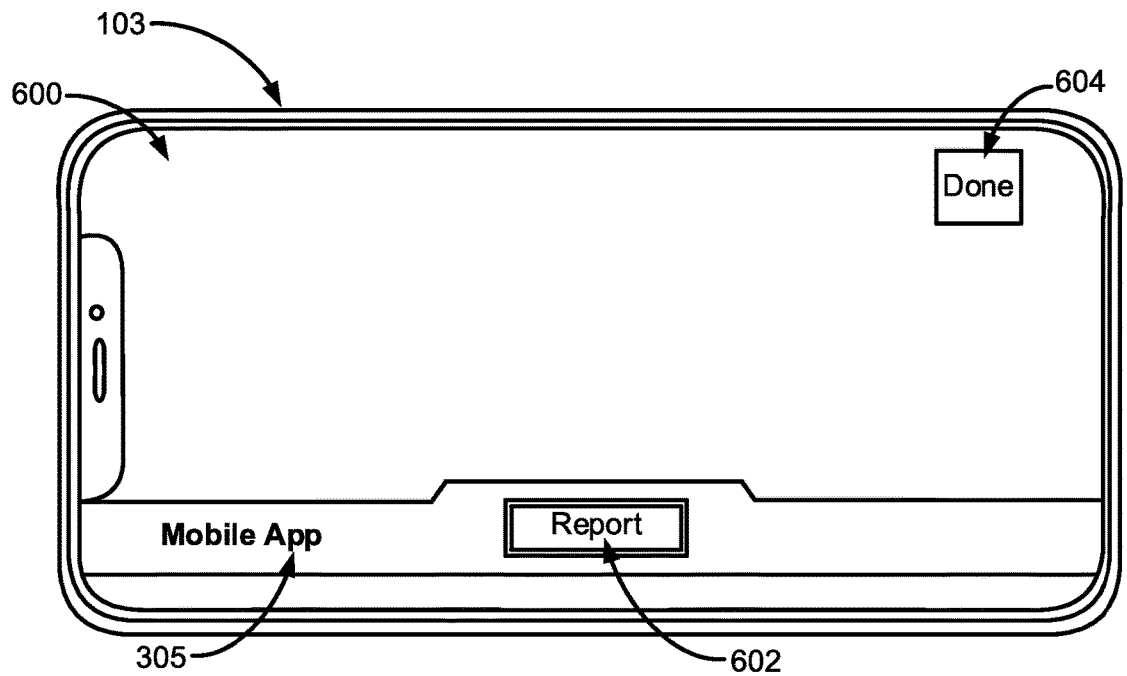
FIG. 6A illustrates one embodiment of a violation reporting graphical user interface configured to be displayed on the mobile device as part of a traffic violation reporting mobile application running on the mobile device.

FIG. 6A illustrates one embodiment of a violation reporting GUI 600 configured to be displayed on the mobile device 103 as part of a traffic violation reporting mobile application 305 running on the mobile device 103. A user carrying the mobile device 103 having an instance of the mobile application 305 downloaded on the mobile device 103 can open the mobile application 305 when the user sees a vehicle 114 committing a traffic violation. For example, the vehicle 114 can be driving, parked, or idling in a restricted area 116 when the vehicle 114 is not permitted to do so at a particular time. The user can open the mobile application 305 and apply a user input (e.g., a touch input) to a camera user interface (UI) icon to bring up the violation reporting GUI 600.

The user can then apply another user input to a report UI icon 602 to begin capturing image(s) or video(s) 112 of the vehicle 114 within the restricted area 116. The mobile application 305 can use the video image sensors or cameras 228 of the mobile device 103 to capture the image(s) or video(s) 112 of the vehicle 114 within the restricted area 116.

In some embodiments, the mobile device 103 can automatically begin to capture or record a video of the vehicle 114 committing the traffic violation in response to a user applying a user input to the report UI icon 602. In certain embodiments, the mobile application 305 can inform the user (e.g., through text prompts, audio instructions, or haptics) to continue capturing the video while moving the mobile device 103 to different locations around the vehicle 114. For example, the mobile application 305 can inform the user to capture the video while walking in a circle or semicircle around the vehicle 114. This can be done so that the video captures the vehicle 114 and at least part of the restricted area 116 from different viewing angles or vantage points. In certain embodiments, the license plate recognition engine 316 can pass video frames from the captured video in real-time to the LPR neural network 317 and the mobile application 305 can inform the user to continue moving the mobile device 103 around the vehicle 114 until the license plate number 126 of the vehicle 114 is recognized or detected by the license plate recognition engine 316.

In other embodiments, the mobile device 103 can automatically capture one or more images of the vehicle 114 committing the traffic violation in response to a user applying a user input to the report UI icon 602. In these embodiments, the mobile application 305 can inform the user (e.g., through text prompts, audio instructions, or haptics) to move to different locations around the vehicle 114 and apply a user input to the report UI icon 602 at each of the different locations to capture the vehicle 114 from different viewing angles or vantage points. For example, the mobile application 305 can inform the user to take pictures of the vehicle 114 from at least three different viewing angles such that three different sides of the vehicle 114 are captured. In certain embodiments, the license plate recognition engine 316 can pass the captured images in real-time to the LRP neural network 317 and the mobile application 305 can inform the user to continue taking pictures of the vehicle 114 from different viewing angles until the license plate number 126 of the vehicle 114 is recognized or detected by the license plate recognition engine 316.

Once the user has finished capturing image(s) or video(s) 112 of the vehicle 114 committing the traffic violation, the user can apply a user input to an end capture UI icon 604 to terminate the capture session and exit the violation reporting GUI 600. At this point, the mobile device 103 can automatically generate metadata 118 associated with the one or more images or videos 112 captured by the mobile device 103. The user can also apply a user input to the end capture UI icon 604 to exit the violation reporting GUI 600 even when no image(s) or video(s) have been captured.

In some embodiments, the violation reporting GUI 600 can also allow a user to upload previously captured image(s) or video(s) 112 to the mobile application 305 via the violation reporting GUI 600. For example, in response to a user applying a user input to the report UI icon 602, the mobile application 305 can present the user with an option to upload a previously captured image or video in lieu of capturing new image(s) or video(s) in real-time.

Figure 6B:
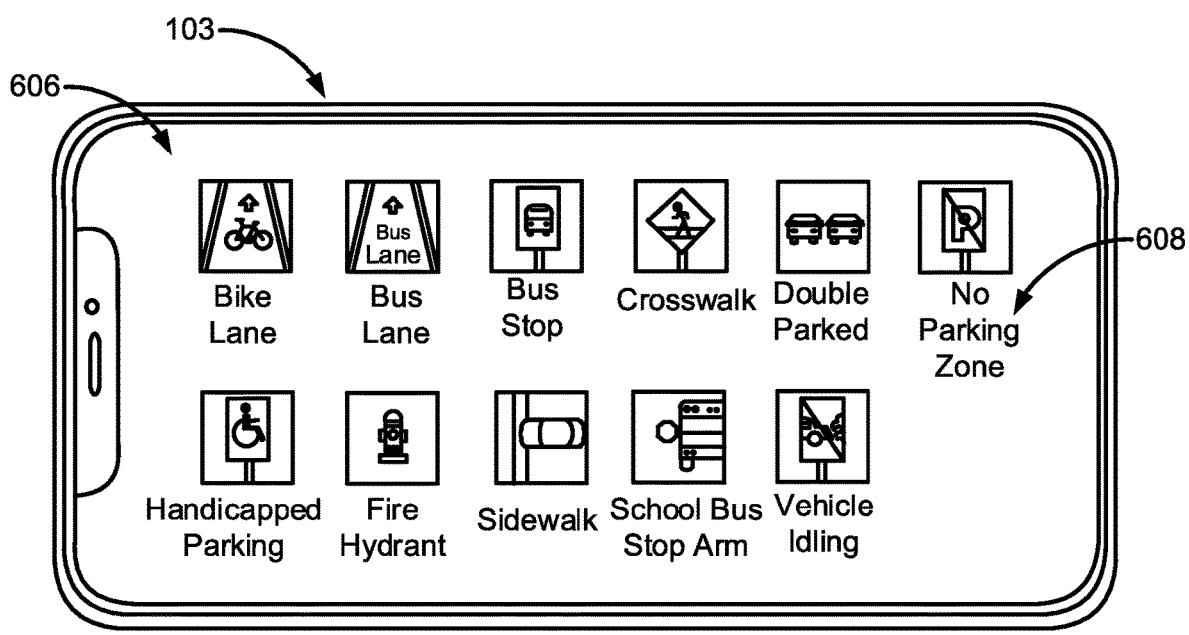
FIG. 6B illustrates one embodiment of a violation selection graphical user interface configured to be displayed on the mobile device as part of the traffic violation reporting mobile application running on the mobile device.

FIG. 6B illustrates one embodiment of a violation selection GUI 606 configured to be displayed on the mobile device 103 as part of the traffic violation reporting mobile application 305 running on the mobile device 103. In some embodiments, the violation selection GUI 606 can be displayed in response to the user applying a user input to the end capture UI icon 604 (see FIG. 6A). In other embodiments, the violation selection GUI 606 can be displayed automatically once the mobile application 305 has processed the image(s) or video(s) captured by the mobile device 103.

The violation selection GUI 606 can allow a user to manually select or provide input concerning a violation type 608 of the traffic violation. As shown in FIG. 6B, the violation type 608 can comprise a bike lane violation, a bus lane violation, a bus stop parking violation, a crosswalk obstruction violation, a double-parking violation, a no-parking zone violation, a handicapped parking violation, a blocked fire hydrant violation, a sidewalk obstruction violation, a school bus stop arm violation, and a vehicle idling violation.

The user can manually select the violation type 608 by applying a user input to a UI icon representing the violation type 608. In some embodiments, the mobile device 103 can use the selection made by the user to create a metadata tag concerning the violation type 608 and include the metadata tag as part of the extended metadata tag 118. In other embodiments, the mobile device 103 can confirm the selection made by the user by using certain image recognition or computer vision tools to recognize text on traffic-related or parking-related signs detected within a vicinity of the vehicle 114.

In further embodiments, the mobile device 103 can pass image(s) or video(s) captured by the cameras 228 to the object-detection neural network 315 to detect objects or roadway markings of interest such as fire hydrants, lane markers, crosswalk markings, sidewalks, or school bus stop signs to confirm the selection made by the user. In additional embodiments, the mobile device 103 can determine the violation type 608 exclusively based on the image(s) or video(s) 112 captured by the cameras 228 without any input from the user.

Figure 7A:
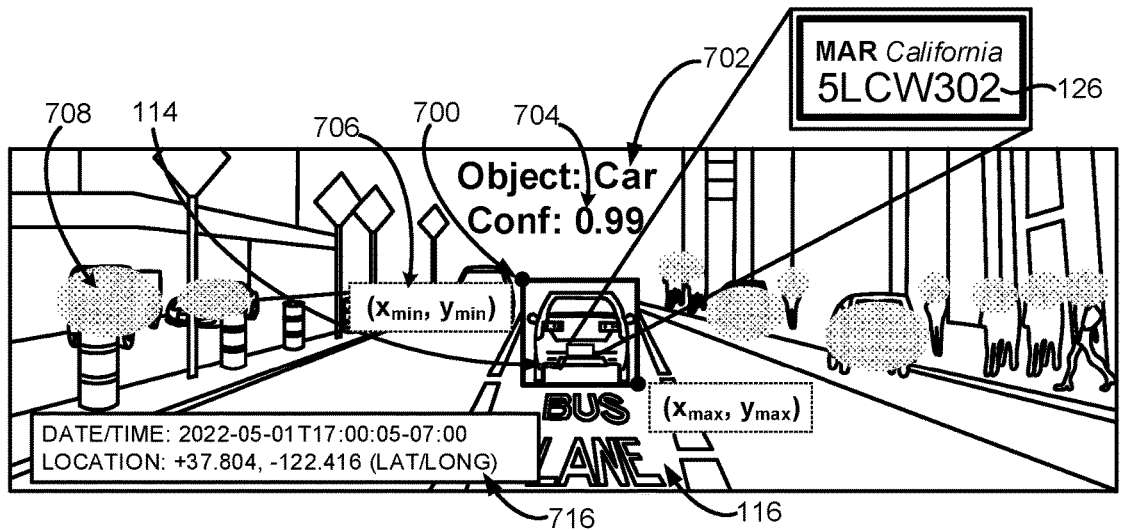
FIG. 7A illustrates an example of a video frame showing a vehicle bounded by a vehicle bounding box.

FIG. 7A illustrates an example of a video frame showing a vehicle 114 bounded by a vehicle bounding box 700. The video frame can be one of the video frames grabbed or otherwise retrieved from the videos 112 captured by the one or more video image sensors 208 of the perception device 102. As previously discussed, the event detection engine 300 of the perception device 102 can periodically or continuously pass video frames from the videos 112 to a plurality of deep learning models including at least the object-detection neural network 303 and the LPR neural network 307 running on the perception device 102 (see FIG. 3A).

The object-detection neural network 303 can bound the vehicle 114 in the vehicle bounding box 700. The event detection engine 300 can obtain as outputs from the object-detection neural network 303, predictions concerning the objects detected within the video frame including at least an object class 702, a confidence score 704 related to the object detected, and a set of image coordinates 706 for the vehicle bounding box 700.

The confidence score 704 can be between 0 and 1.0. In some embodiments, the object-detection neural network 303 can bound a vehicle within a vehicle bounding box 700 only if the confidence score 704 is above a preset confidence threshold. For example, the confidence threshold can be set at between 0.65 and 0.90 (e.g., at 0.70). The confidence threshold can be adjusted based on an environmental condition (e.g., a lighting condition), a location, a time-of-day, a day-of-the-week, or a combination thereof.

The event detection engine 300 can also obtain a set of image coordinates 706 for the vehicle bounding box 700. The image coordinates 706 can be coordinates of corners of the vehicle bounding box 700. For example, the image coordinates 706 can be x- and y-coordinates for an upper left corner and a lower right corner of the vehicle bounding box 700. In other embodiments, the image coordinates 706 can be x- and y-coordinates of all four corners or the upper right corner and the lower-left corner of the vehicle bounding box 700.

In some embodiments, the vehicle bounding box 700 can bound the entire two-dimensional (2D) image of the vehicle 114 captured in the video frame. In other embodiments, the vehicle bounding box 700 can bound at least part of the 2D image of the vehicle 114 captured in the video frame such as a majority of the pixels making up the 2D image of the vehicle 114.

The event detection engine 300 can also obtain as an output from the object-detection neural network 303 predictions concerning a set of vehicle attributes 124 such as a color, make and model, and vehicle type of the vehicle shown in the video frames. The vehicle attributes 124 can be used by the event detection engine 300 to make an initial determination as to whether the vehicle shown in the video frames is subject to the traffic congestion pricing policy (i.e., whether the vehicle is exempt or non-exempt).

The perception device 102 can also pass the video frame to the LPR neural network 307 running on the perception device 102. The LPR neural network 307, can be specifically trained to recognize license plate numbers from video frames or images. By feeding the video frame into the LPR neural network 307, the perception device 102 can obtain as an output from the LPR neural network 307, a prediction concerning the license plate number 126 of the vehicle 114. The prediction can be in the form of an alphanumeric string representing the license plate number 126.

The perception device 102 can then compare the recognized license plate number 126 against a license plate whitelist 309 stored on the perception device 102 to determine if the vehicle captured in the video frame is allowed to drive or be stopped within the restricted area 116. As previously mentioned, the perception device 102 can also use the vehicle attributes 124 outputted by the object-detection neural network 303 to determine if the vehicle captured in the video frame is allowed to drive or be stopped within the restricted area 116.

FIG. 7A also illustrates that certain objects detected within the video frame can be blurred by an obfuscating filter 708. The obfuscating filter 708 or blurring filter can be applied to certain objects (including vehicles or pedestrians) automatically detected in the one or more images or videos 112 that are not the vehicle 114. This can be done to protect the privacy of vehicles or pedestrians captured in the images or videos 112.

The obfuscating filter or blurring filter can obfuscate or blur the detected objects to one of several filter levels. The filter levels can be preconfigured by an administrator of the system 100. The filter levels can depend on a pixel size of the obfuscating filter or blurring filter and the obfuscating algorithm used to generate the obfuscating/blurring effect. The pixel size of the obfuscating or filter can be expressed as "n×n" and can range from a 3×3 filter (a small amount of blurring) to a 11×11 filter (a large amount of blurring). For example, a filter of size n×n pixels can move as a rolling window or kernel over each pixel of the part of the image or video frame to be blurred and output a blurred pixel with a new color value or pixel intensity value that replaces the old pixel. The new color value or pixel intensity value of the blurred pixel can be calculated using a number of obfuscating or blurring algorithms including a Gaussian-distribution blurring algorithm or a weighted-average blurring algorithm that takes as inputs the color values or pixel intensity values of all of the surrounding n×n pixels.

Figure 7B:
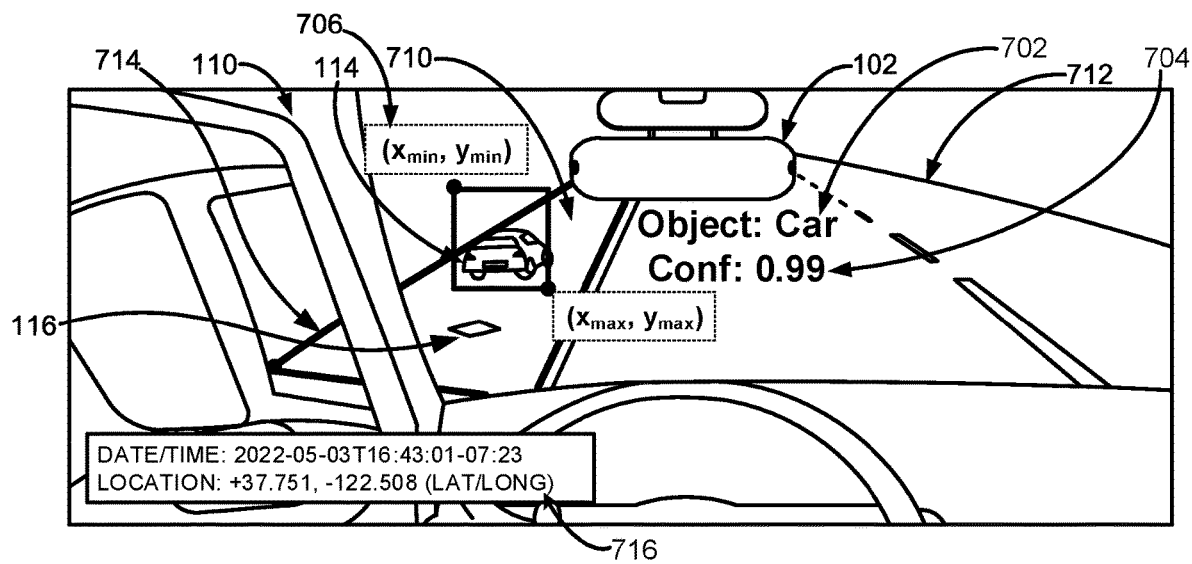
FIG. 7B illustrates an example of a video frame showing a vehicle bounded by a vehicle bounding box and a lane of a roadway bounded by a polygon.

FIG. 7B illustrates another example of a video frame showing a vehicle 114 bounded by a vehicle bounding box 700 and a lane 710 of a roadway 712 bounded by a polygon 714. The video frame can be one of the video frames grabbed or otherwise retrieved from the videos 112 captured by the one or more video image sensors 208 of the perception device 102. The event detection engine 300 of the perception device 102 can periodically or continuously pass video frames from the videos 112 to a plurality of deep learning models including at least the object-detection neural network 303, the LPR neural network 307, and the lane detection neural network 311 running on the perception device 102 (see FIG. 3A). As discussed above in relation to FIG. 7A, the object-detection neural network 303 can bound the vehicle 114 in the vehicle bounding box 700 and can obtain as outputs from the object-detection neural network 303, predictions concerning the object class 702, the confidence score 704 related to the object detected, and a set of image coordinates 706 for the vehicle bounding box 700.

The event detection engine 300 can also pass or feed video frames to the lane detection neural network 311 to detect one or more lanes 710 shown in the video frames. Lane detection is needed when the restricted area 116 includes one or more lanes 710 of a roadway 712 but not all lanes of the roadway 712. For example, the user can set one or more bus lanes, bike lanes, fire lanes, toll lanes, high-occupancy vehicle (HOV) lanes, or carpool lanes as the restricted area 116.

The one or more lanes 710 can be marked by certain insignia, text, nearby signage, road or curb coloration, or a combination thereof. In other embodiments, the one or more lanes 710 can be designated or indicated in a private or public database (e.g., a municipal GIS database) accessible by the perception device 102, the server 106, or a combination thereof.

As shown in FIG. 7B, the lane detection neural network 311 can bound the lane 710 in a polygon 714. The lane detection neural network 311 can also output image coordinates 706 associated with the polygon 714.

In some embodiments, the polygon 714 can be a quadrilateral. More specifically, the polygon 714 can be shaped substantially as a trapezoid.

The event detection engine 300 can determine that the vehicle 114 is in motion or parked in the restricted area 116 (e.g., a bus lane) based on the amount of overlap between the vehicle bounding box 700 bounding the vehicle 114 and the polygon 714 bounding the lane 710. The image coordinates 706 associated with the vehicle bounding box 700 can be compared with the image coordinates 706 associated with the polygon 714 to determine an amount of overlap between the vehicle bounding box 700 and the polygon 714. As a more specific example, the event detection engine 300 can calculate a lane occupancy score to determine whether the vehicle 114 is driving in the lane 710. A higher lane occupancy score can be equated with a higher degree of overlap between the vehicle bounding box 700 and the polygon 714.

Although FIGS. 7A and 7B illustrate only one instance of a vehicle bounding box 700 and one instance of a polygon 714, it is contemplated by this disclosure that multiple vehicles can be bounded by vehicle bounding boxes 700 and multiple lanes 710 can be bounded by polygons 714 in the same video frame. Moreover, although FIGS. 7A and 7B illustrate a visual representation of the vehicle bounding box 700 and the polygon 714, it should be understood by one of ordinary skill in the art that the image coordinates 706 of the vehicle bounding box 700 and the polygon 714 and can be used as inputs for further processing by the perception device 102 or the server 106 or stored in a database without the actual vehicle bounding box 700 or polygon 714 being visualized.

FIG. 7B also illustrates that certain critical information 716 (see FIGS. 7A and 7B) concerning the traffic violation can be overlaid by the second node 101B (e.g., the server 106) on one or more images or video frames included as part of the digital evidence package 111 received from the first node 101A. The critical information 716 can be overlaid as part of the post-processing performed by the second node 101B on the images or videos 112 included as part of the digital evidence package 111 received from the first node 101A. For example, the critical information 716 can include the location of the traffic violation and when the violation occurred. As a more specific example, the server 106 can overlay the critical information 716 based on one or more timestamps 122 recorded by the first node 101A and the geolocation 120 of the vehicle 114 as determined by the first node 101A.

Figure 8B:
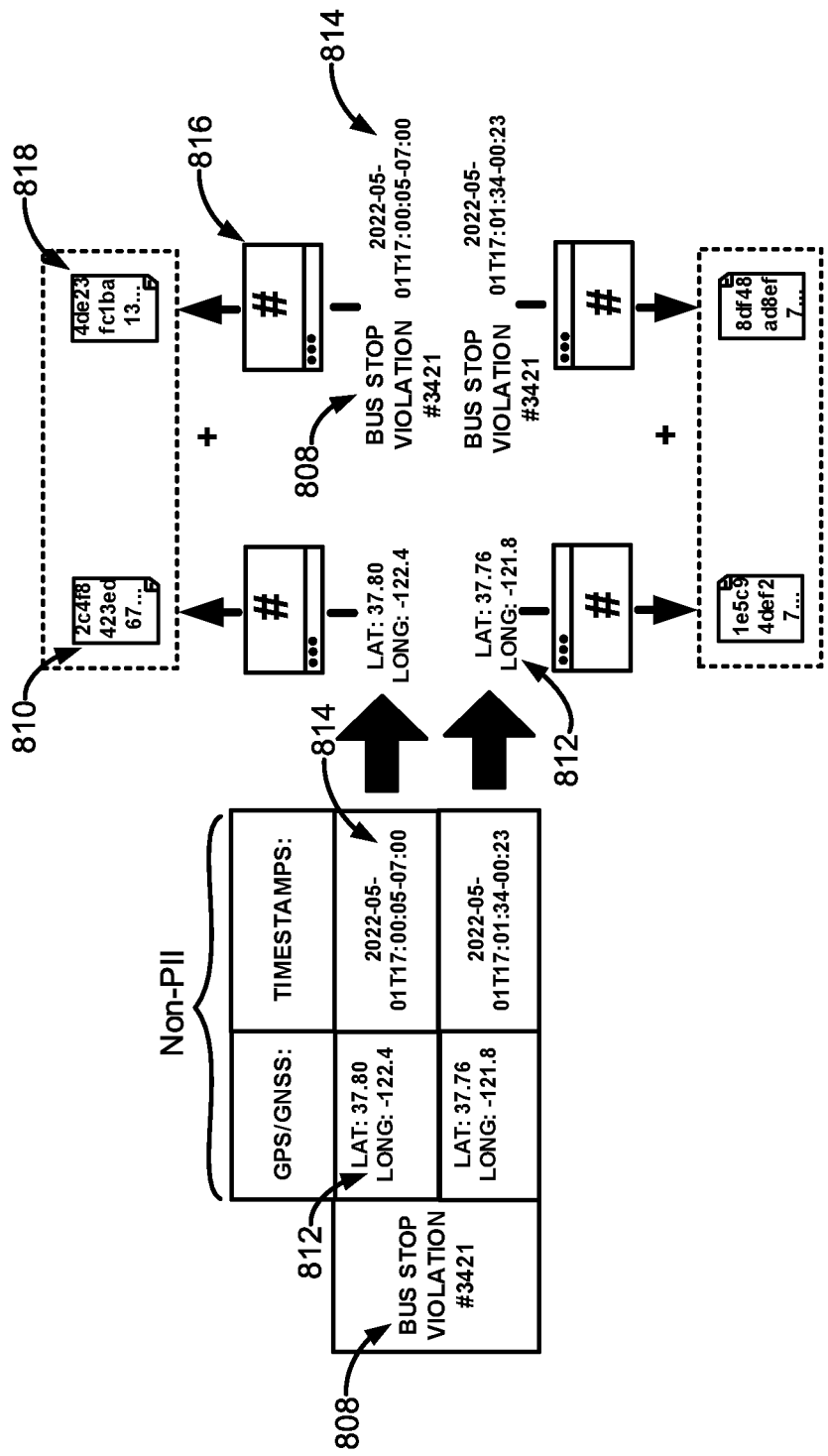
FIG. 8B is a schematic diagram illustrating an example of data detracing to further maintain the confidentiality of traffic violation data.

FIGS. 8A-8B illustrate that the system 100 can have built-in data privacy features that maintain the confidentiality of sensitive traffic violation data or traffic enforcement data stored as part of the system 100 through certain data sharding techniques (i.e., breaking/partitioning data up into "shards") such as data decoupling and data detracing.

One technical problem faced by the applicants is how to prevent the traffic violation/enforcement data from being compromised through data snooping or unauthorized location tracking. For example, a sequence of location coordinates of an offending vehicle can result in the identity of the registered owner of the offending vehicle (i.e., the infractor) from being inadvertently revealed or deciphered by a nefarious actor. One technical solution discovered and developed by the applicants is the data sharding techniques disclosed herein including breaking up data/information stored as part of the distributed ledger into smaller micro-ledgers and flattening attribute information logged in the distributed ledger or micro-ledgers.

FIG. 8A illustrates that data or information included as part of the digital evidence package 111 can be divided into at least three categories: (1) personal identifiable information (PII) 802, (2) non-PII 804, and (3) sensitive-PII 806 or more sensitive PII such as an infractor's criminal record. For example, data, information, or files contained within the digital evidence packages 111 can be tagged as PII 802, non-PII 804, or sensitive-PII 806.

Non-PII 804 can comprise: (i) images or videos obtained from a video image sensor 208 of a perception device 102 or a camera 228 of a mobile device 103, (ii) GPS/GNSS geolocation coordinates or location information concerning the vehicle 114, (iii) one or more timestamps 122 from a plurality of sources, (iv) data or information concerning the speed or vehicle orientation of the vehicle 114, or a combination thereof.

PII 802 can comprise data or information obtained from certain deep learning models (e.g., neural networks) of the system 100. For example, PII 802 can comprise: (i) an automatically recognized license plate number 126 of the vehicle 114 or a (ii) detected vehicle attribute 124 such as the vehicle 114 such as a detected vehicle type. Based on the recognized license plate number 126, the following PII can also be obtained including the vehicle's (iii) VIN number, (iv) color, (v) year, or (vi) make/model and (vii) whether the vehicle is stolen or not.

Moreover, based on the recognized license plate number 126, the following sensitive-PII 806 can also be obtained: the (i) name of the registered owner of the vehicle 114 (i.e., the infractor), the (ii) infractor's address, the (iii) infractor's birthdate, the (iv) infractor's insurance claim history, and the (v) infractor's criminal record or history, if any.

As previously discussed, the digital evidence package 111 can be stored as part of the distributed ledger 105 along with the package digests 128. For example, the digital evidence package 111 can be stored as another ledger entry 132 in the distributed ledger 105.

As shown in FIG. 8A, the system 100 can be designed such that the (1) PII 802, (2) non-PII 804, and (3) sensitive-PII 806 included as part of the digital evidence package 111 can each be stored in its own distributed micro-ledger 800 or micro-chain. For example, the PII 802 can be stored in a PII micro-ledger 800A, the non-PII 804 can be stored in a non-PII micro-ledger 800B, and the sensitive-PII 806 can be stored in a sensitive-PII micro-ledger 800C.

This can also be referred to as data decoupling. In these embodiments, the same procedures disclosed herein pertaining to the distributed ledger 105 can also be applied to each of the distributed micro-ledgers 800.

For example, a split API can be called by a node 101 of the blockchain network 104 to split the distributed ledger 105 into multiple distributed micro-ledgers 800. In some embodiments, only nodes 101 that have access to the digital evidence package 111 stored as part of the distributed ledger 105 can split the distributed ledger 105.

For example, the distributed ledger 105 can be split into at least a PII micro-ledger 800A, a non-PII micro-ledger 800B, and a sensitive-PII micro-ledger 800C. In certain embodiments, splitting the distributed ledger 105 into multiple distributed micro-ledgers 800 can be done only if the digital evidence package 111 comprises sensitive-PII 806. In other embodiments, splitting the distributed ledger 105 into multiple distributed micro-ledgers 800 can be done only if the digital evidence package 111 comprises PII 802 and sensitive-PII 806.

The node 101 that split the distributed ledger 105 can then generate a plurality of digests of the PII 802, the non-PII 804, and the sensitive-PII 806 using a hash function (e.g., the hash function 130). For example, the node 101 can generate a PII digest of the PII 802, a non-PII digest of the non-PII 804, and a sensitive-PII digest of the sensitive-PII 806. The node can then call an insert API to insert or add the PII digest as a ledger entry in the PII micro-ledger 800A, the non-PII digest as a ledger entry in the non-PII micro-ledger 800B, and/or the sensitive-PII digest as a ledger entry in the sensitive-PII micro-ledger 800C.

In certain embodiments, the system 100 is configured such that the PII digests stored as part of the PII micro-ledger 800A, the non-PII digests stored as part of the non-PII micro-ledger 800B, and the sensitive-PII digests stored as part of the sensitive-PII micro-ledger 800C is accessible to all nodes 101 of the blockchain network 104. This can be the case even if some of the nodes 101 of the blockchain network 104 do not have access to the PII 802 or the sensitive-PII 806. In some embodiments, only some of the nodes 101 of the blockchain network 104 are able to split the distributed ledger 105 into the PII micro-ledger 800A, the non-PII micro-ledger 800B, and the sensitive-PII micro-ledger 800C.

Once a node 101 is in a trusted environment, the multiple distributed micro-ledgers 800 (e.g., the PII micro-ledger 800A, the non-PII micro-ledger 800B, and the sensitive-PII micro-ledger 800C) can be merged back together by calling a merge API. This can allow different constituents of one digital evidence package 111 to be brought back together such that a full picture is formed of the traffic violation. In certain embodiments, merging the distributed micro-ledgers 800 back together is only allowed to be performed by nodes 101 that have the highest authority or permission level.

FIG. 8B illustrates that de-coupled data or information (data or information stored in separate distributed micro-ledgers 800) can further undergo a data detracing procedure to further protect the privacy of the data or information and prevent unauthorized tracing or reverse association of sensitive information. For example, even without information (e.g., PII 802 or sensitive-PII 806) identifying a vehicle 114, a sequence of location coordinates (e.g., non-PII 804) belonging to the vehicle 114 can still reveal certain sensitive information concerning the vehicle 114 and, by extension, the identity of the registered owner of the vehicle 114 (i.e., the infractor).

For example, even with PII 802, sensitive-PII 806, and non-PII 804 separated, there can still be situations where tracking of the non-PII 804 over time can reveal certain PII 802 or even sensitive-PII 806 concerning a vehicle 114. The system 100 can prevent this by terminating the connection between certain data or information within each of the distributed micro-ledgers 800.

This can be achieved by one of the nodes 101 calling a flatten API to flatten all attribute information logged in each of the distributed micro-ledgers 800. In some embodiments, any of the nodes 101 within the blockchain network 104 can call the flatten API. In other embodiments, only some of the nodes 101 within the blockchain network 104 can call the flatten API.

In some embodiments, all types of users can call the flatten API. In alternative embodiments, only some types of users can call the flatten API. The types of users can include users with different authority levels including regular users, users with admin privileges, or super (root-level) users.

In general, for any key-value pair stored as part of a distributed micro-ledger 800, a key 808 can be an identifier of a value 810 and the value 810 can be a hashed output of one attribute 812. For example, the key 808 can be an event ID (e.g., bus stop violation #3421) and the value 810 can be a hashed output of a location coordinate (e.g., lat/long coordinates) associated with the event ID. As a more specific example the value 810 can be obtained when the hash function 130 is applied to the attribute 812 as part of generating a package digest 128.

In response to a node 101 calling the flatten API, the key 808 (e.g., the event ID) can be concatenated with another attribute 814 other than the attribute 812 (e.g., the location coordinate). For example, the key 808 (e.g., the event ID) can be concatenated with a timestamp (e.g., one of the timestamps 122) serving as the other attribute 814. Once the key 808 (e.g., the event ID) is concatenated with the other attribute 814 (e.g., one of the timestamps 122), a hash function 816 can be used to generate a hashed output 818 or digest of the key 808 concatenated with the other attribute 812. This way, a user who only has access to the key 808 (e.g., the event ID) would not be able to decipher or derive the value 810 (e.g., the location coordinates) associated with the key 808.

In some embodiments, the hash function 816 can be the same hash function as the hash function 130. In other embodiments, the hash function 816 can be a different hash function from the hash function 130.

The system 100 is also designed to defend against certain blockchain threats such as Sybil attacks, routing attacks, and phishing attacks. Sybil attacks are where attackers use multiple identities to flood and crash a network that is similar to a blockchain DDoS attack. Routing attacks are where hackers intercept "data in transit" as the data is transferred between ISPs. Finally, a phishing attack is where attackers steal a user's credentials such as a user's wallet key. The system 100 can mitigate the risk of such attacks by giving root users and administrators limited access to sensitive information. Access control to the system 100 is built on the "least privilege" principle and partial zero trust. The integrity and authenticity of the digital evidence packages 111 will be maintained through numerous validation procedures as nodes 101 interact with the digital evidence packages. The system 100 will also guard encryption keys by deploying strong key management protection protocols.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense. This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method of managing traffic enforcement data, comprising:
generating, at a first node of a plurality of nodes, a digital evidence package related to a traffic violation;
generating, at the first node, a first package digest of the digital evidence package using a hash function;
adding the first package digest as a ledger entry in a distributed ledger, wherein the distributed ledger is synchronized across the plurality of nodes;
transmitting the digital evidence package from the first node to a second node of the plurality of nodes;
validating, at the second node, the digital evidence package received from the first node based on the first package digest added to the distributed ledger; and
modifying evidence captured by the first node that is included as part of the digital evidence package at the second node resulting in a modified digital evidence package in response to the digital evidence package being validated based on the first package digest added to the distributed ledger.

2. The method of claim 1, further comprising:
generating, at the second node, a second package digest of the modified digital evidence package using the hash function;
updating the distributed ledger to add the second package digest as another ledger entry in the distributed ledger; and
transmitting the modified digital evidence package to a third node of the plurality of nodes.

3. The method of claim 2, further comprising:
validating, at the third node, the modified digital evidence package received from the second node based on the second package digest added to the distributed ledger;
reviewing the modified digital evidence package at the third node resulting in a reviewed digital evidence package in response to the modified digital evidence package being validated based on the second package digest added to the distributed ledger; and
generating, at the third node, a third package digest of the reviewed digital evidence package using the hash function and adding the third package digest as an additional ledger entry in the distributed ledger.

4. The method of claim 3, further comprising:
generating, at the second node or the third node, a package delete digest to document a deletion of the digital evidence package; and
adding the package delete digest as another ledger entry in the distributed ledger, wherein the distributed ledger is terminated after receiving the package delete digest.

5. The method of claim 1, wherein inserting the first package digest in the distributed ledger further comprises calling, at the first node, an insertion application programming interface (API) to cause each node to insert the first package digest as a ledger entry in an instance of the distributed ledger maintained by each node.

6. The method of claim 1, wherein the first node is a mobile device, wherein the method further comprises capturing images or videos of the traffic violation, and wherein the digital evidence package comprises at least some of the images or videos captured by the mobile device.

7. The method of claim 1, wherein the first node is a perception device mounted or otherwise coupled to a carrier vehicle, wherein the method further comprises the perception device capturing images or videos of the traffic violation while the carrier vehicle is in motion, and wherein the digital evidence package comprises at least some of the images or videos captured by the perception device.

8. The method of claim 1, wherein the second node is a server configured to post-process one or more images or video frames included as part of the digital evidence package as part of modifying the digital evidence package, and wherein post-processing the one or more images or video frames further comprises applying an obfuscating filter of a preconfigured privacy filter level to an object automatically detected in the one or more images or videos and overlaying data or information related to the traffic violation on the one or more images or video frames included as part of the digital evidence package.

9. The method of claim 1, wherein the hash function is a message digest algorithm or a secure hashing algorithm.

10. The method of claim 1, wherein the digital evidence package comprises data or information concerning a location of the traffic violation, a timestamp recorded by the first node, and a license plate number of a vehicle automatically detected by a license-plate recognition neural network running on the first node.

11. A system for managing traffic enforcement data, comprising:
   a first node comprising one or more processors coupled to a memory, wherein the one or more processors are programmed to:
      generate a digital evidence package related to a traffic violation,
      generate a first package digest of the digital evidence package using a hash function, and
      add the first package digest as a ledger entry in a distributed ledger, wherein the distributed ledger is synchronized across a plurality of nodes including the first node; and
   a second node comprising one or more processors coupled to a memory, wherein the one or more processors are programmed to:
      receive the digital evidence package from the first node, wherein the plurality of nodes comprises the second node,
      validate the digital evidence package based on the first package digest added to the distributed ledger, and
      modify evidence captured by the first node that is included as part of the digital evidence package resulting in a modified digital evidence package in response to the digital evidence package being validated based on the first package digest added to the distributed ledger.

12. The system of claim 11, wherein the one or more processors of the second node are further programmed to:
   generate a second package digest of the modified digital evidence package using the hash function;
   update the distributed ledger to add the second package digest as another ledger entry in the distributed ledger; and
   transmit the modified digital evidence package to a third node of the plurality of nodes.

13. The system of claim 12, further comprising a third node comprising one or more processors coupled to a memory, wherein the one or more processors are programmed to:
   receive the modified digital evidence package from the second node, wherein the plurality of nodes comprises the third node;
   validate the modified digital evidence package received from the second node based on the second package digest added to the distributed ledger;
   review the modified digital evidence package at the third node resulting in a reviewed digital evidence package in response to the modified digital evidence package being validated based on the second package digest added to the distributed ledger; and
   generate a third package digest of the reviewed digital evidence package using the hash function and adding the third package digest as an additional ledger entry in the distributed ledger.

14. The system of claim 11, wherein the first node is at least one of a perception device mounted or otherwise coupled to a carrier vehicle and a mobile device, wherein the perception device configured to capture images or videos of the traffic violation while the carrier vehicle is in motion, wherein the digital evidence package comprises at least some of the images or videos captured by at least one of the perception device and the mobile device.

15. The system of claim 11, wherein the second node is a server configured to post-process one or more images or video frames included as part of the digital evidence package as part of modifying the digital evidence package, and wherein post-processing the one or more images or video frames further comprises applying an obfuscating filter of a preconfigured privacy filter level to an object automatically detected in the one or more images or videos and overlaying data or information related to the traffic violation on the one or more images or video frames included as part of the digital evidence package.

16. One or more non-transitory computer-readable media comprising instructions stored thereon, that when executed by one or more processors, cause the one or more processors to perform operations comprising:
   generating, at a first node of a plurality of nodes, a digital evidence package related to a traffic violation;
   generating, at the first node, a first package digest of the digital evidence package using a hash function;
   adding the first package digest as a ledger entry in a distributed ledger, wherein the distributed ledger is synchronized across the plurality of nodes;
   transmitting the digital evidence package from the first node to a second node of the plurality of nodes;
   validating, at the second node, the digital evidence package received from the first node based on the first package digest added to the distributed ledger; and
   modifying evidence captured by the first node that is included as part of the digital evidence package at the second node resulting in a modified digital evidence package in response to the digital evidence package being validated based on the first package digest added to the distributed ledger.

17. The one or more non-transitory computer-readable media of claim 16, further comprising instructions stored thereon, that when executed by the one or more processors, cause the one or more processors to perform operations comprising:
   generating, at the second node, a second package digest of the modified digital evidence package using the hash function;
   updating the distributed ledger to add the second package digest as another ledger entry in the distributed ledger; and
   transmitting the modified digital evidence package to a third node of the plurality of nodes.

18. The one or more non-transitory computer-readable media of claim 17, further comprising instructions stored thereon, that when executed by the one or more processors, cause the one or more processors to perform operations comprising:
- validating, at the third node, the modified digital evidence package received from the second node based on the second package digest added to the distributed ledger;
- reviewing the modified digital evidence package at the third node resulting in a reviewed digital evidence package in response to the modified digital evidence package being validated based on the second package digest added to the distributed ledger; and
- generating, at the third node, a third package digest of the reviewed digital evidence package using the hash function and adding the third package digest as an additional ledger entry in the distributed ledger.

19. The one or more non-transitory computer-readable media of claim 18, further comprising instructions stored thereon, that when executed by the one or more processors, cause the one or more processors to perform operations comprising:
- generating, at the second node or the third node, a package delete digest to document a deletion of the digital evidence package; and
- adding the package delete digest as another ledger entry in the distributed ledger, wherein the distributed ledger is terminated after receiving the package delete digest.

20. The one or more non-transitory computer-readable media of claim 16, wherein the digital evidence package comprises data or information concerning a location of the traffic violation, a timestamp recorded by the first node, and a license plate number of a vehicle automatically detected by a license-plate recognition neural network running on the first node.

* * * * *